US010597327B2

(12) United States Patent
Dubey

(10) Patent No.: US 10,597,327 B2
(45) Date of Patent: *Mar. 24, 2020

(54) DIMENSIONALLY STABLE GEOPOLYMER COMPOSITION AND METHOD

(71) Applicant: UNITED STATES GYPSUM COMPANY, Chicago, IL (US)

(72) Inventor: Ashish Dubey, Grayslake, IL (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/244,689

(22) Filed: Jan. 10, 2019

(65) Prior Publication Data

US 2019/0161407 A1 May 30, 2019

Related U.S. Application Data

(63) Continuation of application No. 15/452,110, filed on Mar. 7, 2017, now Pat. No. 10,221,096, which is a continuation of application No. 15/071,529, filed on Mar. 16, 2016, now Pat. No. 9,643,888, which is a continuation of application No. 13/841,279, filed on Mar. 15, 2013, now Pat. No. 9,321,681.

(60) Provisional application No. 61/639,825, filed on Apr. 27, 2012.

(51) Int. Cl.
C04B 28/00 (2006.01)
C04B 28/18 (2006.01)
C04B 12/00 (2006.01)
C04B 7/32 (2006.01)
C04B 22/10 (2006.01)
C04B 111/00 (2006.01)
C04B 111/34 (2006.01)
C04B 111/62 (2006.01)
C04B 111/72 (2006.01)
C04B 103/22 (2006.01)
C04B 103/32 (2006.01)

(52) U.S. Cl.
CPC .............. C04B 28/006 (2013.01); C04B 7/32 (2013.01); C04B 12/005 (2013.01); C04B 22/10 (2013.01); C04B 28/003 (2013.01); C04B 28/008 (2013.01); C04B 28/18 (2013.01); C04B 2103/22 (2013.01); C04B 2103/32 (2013.01); C04B 2111/0075 (2013.01); C04B 2111/00482 (2013.01); C04B 2111/00586 (2013.01); C04B 2111/34 (2013.01); C04B 2111/343 (2013.01); C04B 2111/346 (2013.01); C04B 2111/62 (2013.01); C04B 2111/72 (2013.01); Y02P 40/165 (2015.11); Y02W 30/92 (2015.05)

(58) Field of Classification Search
CPC ......... C04B 7/32; C04B 12/005; C04B 22/10; C04B 28/003; C04B 28/006; C04B 28/008; C04B 28/18; C04B 2103/22; C04B 2103/32; C04B 2111/00482; C04B 2111/00586; C04B 2111/0075; C04B 2111/34; C04B 2111/343; C04B 2111/346; C04B 2111/62; C04B 2111/72
See application file for complete search history.

(56) References Cited

U.S. PATENT DOCUMENTS

| 2,248,032 | A | 7/1941 | Stanley et al. |
| 3,147,129 | A | 9/1964 | Armstrong et al. |
| 3,251,701 | A | 5/1966 | Klein |
| 3,819,393 | A | 6/1974 | Ono et al. |
| 3,854,968 | A | 12/1974 | Minnick et al. |
| 3,857,714 | A | 12/1974 | Mehta |
| 3,997,353 | A | 12/1976 | Chervenka, Jr. et al. |
| 4,302,251 | A | 11/1981 | Udagawa et al. |
| 4,350,533 | A | 9/1982 | Galer et al. |
| 4,404,031 | A | 9/1983 | Sudoh et al. |
| 4,488,909 | A | 12/1984 | Galer et al. |
| 4,655,979 | A | 4/1987 | Nakano et al. |
| 4,659,385 | A | 4/1987 | Costopoulos et al. |
| 4,661,159 | A | 4/1987 | Ortega et al. |
| 4,842,649 | A | 6/1989 | Heitzmann et al. |
| 5,109,030 | A | 4/1992 | Chao et al. |
| 5,273,580 | A | 12/1993 | Totten et al. |
| 5,374,308 | A | 12/1994 | Kirkpatrick et al. |
| 5,387,283 | A | 2/1995 | Kirkpatrick et al. |
| 5,439,518 | A | 8/1995 | Francis et al. |
| 5,536,310 | A | 7/1996 | Brook et al. |
| 5,556,458 | A | 9/1996 | Brook et al. |
| 5,714,003 | A | 2/1998 | Styron |
| 5,763,508 | A | 6/1998 | Hess et al. |
| 6,149,724 | A | 11/2000 | Ulibarri et al. |
| 6,554,894 | B2 | 4/2003 | Styron et al. |

(Continued)

FOREIGN PATENT DOCUMENTS

CN 101134892 A 3/2008
CN 101508557 A 8/2009

(Continued)

OTHER PUBLICATIONS

Christine Angos, "A Guide to Understanding and Mixing Thickeners", Charles Ross & Son Company, New York, Mar. 20, 2013.

(Continued)

Primary Examiner — Anthony J Green
(74) Attorney, Agent, or Firm — Vorys, Sater, Seymour and Pease LLP; Pradip Sahu; Philip Petti

(57) ABSTRACT

A method for making geopolymer cementitious binder compositions for cementitious products such as concrete, precast construction elements and panels, mortar and repair materials, and the like is disclosed. The geopolymer cementitious compositions of some embodiments are made by mixing a synergistic mixture of thermally activated aluminosilicate mineral, calcium aluminate cement, a calcium sulfate and a chemical activator with water.

17 Claims, 22 Drawing Sheets

(56) References Cited

U.S. PATENT DOCUMENTS

| | | |
|---|---|---|
| 6,572,698 B1 | 6/2003 | Ko |
| 6,620,487 B1 | 9/2003 | Tonyan et al. |
| 6,641,658 B1 | 11/2003 | Dubey |
| 6,730,162 B1 | 5/2004 | Li et al. |
| 6,827,776 B1 | 12/2004 | Boggs et al. |
| 6,869,474 B2 | 3/2005 | Perez-Pena et al. |
| 6,923,857 B2 | 8/2005 | Constantinou et al. |
| 7,288,148 B2 | 10/2007 | Hicks et al. |
| 7,326,290 B2 | 2/2008 | Guinot et al. |
| 7,326,478 B2 | 2/2008 | Bouscal et al. |
| 7,618,490 B2 | 11/2009 | Nakashima et al. |
| 7,651,564 B2 | 1/2010 | Francis |
| 7,670,427 B2 | 3/2010 | Perez-Pena et al. |
| 7,892,351 B1 | 2/2011 | Kirkpatrick et al. |
| 7,956,113 B2 | 6/2011 | Killat et al. |
| 8,016,937 B2 | 9/2011 | Schumacher et al. |
| 8,038,790 B1 | 10/2011 | Dubey et al. |
| 8,070,878 B2 | 12/2011 | Dubey |
| 8,298,332 B2 | 10/2012 | Dubey |
| 8,366,823 B2 | 2/2013 | Perez-Pena |
| 8,519,016 B2 | 8/2013 | Perez-Pena |
| 8,551,241 B2 | 10/2013 | Perez-Pena |
| 8,747,547 B1 | 6/2014 | Peters et al. |
| 8,795,428 B1 | 8/2014 | Hill et al. |
| 8,864,901 B2 | 10/2014 | Lloyd et al. |
| 8,999,057 B2 | 4/2015 | Clodic et al. |
| 9,643,888 B2 * | 5/2017 | Dubey ............... C04B 7/32 |
| 9,656,916 B2 * | 5/2017 | Dubey ............... C04B 11/28 |
| 10,221,096 B2 * | 3/2019 | Dubey ............... C04B 7/32 |
| 10,392,307 B2 * | 8/2019 | Dubey ............... C04B 7/32 |
| 2006/0269752 A1 | 11/2006 | Holland et al. |
| 2007/0079733 A1 | 4/2007 | Crocker |
| 2007/0144404 A1 | 6/2007 | Sorrentino et al. |
| 2008/0134943 A1 | 6/2008 | Godfrey et al. |
| 2010/0071597 A1 | 3/2010 | Perez-Pena |
| 2010/0089293 A1 | 4/2010 | Guynn et al. |
| 2010/0310846 A1 | 12/2010 | Berke et al. |
| 2011/0259228 A1 | 10/2011 | Mills et al. |
| 2012/0024196 A1 | 2/2012 | Gong et al. |
| 2012/0167804 A1 | 7/2012 | Perez-Pena |
| 2012/0172469 A1 | 7/2012 | Perez-Pena |
| 2013/0054694 A1 | 2/2013 | Maeng et al. |
| 2013/0087076 A1 | 4/2013 | Hill et al. |
| 2013/0087078 A1 | 4/2013 | Hill et al. |
| 2013/0139729 A1 | 6/2013 | Ong et al. |
| 2013/0284070 A1 | 10/2013 | Dubey |
| 2014/0371351 A1 | 12/2014 | Dantin et al. |
| 2015/0000568 A1 | 1/2015 | Bescher et al. |
| 2015/0141554 A1 | 5/2015 | Mikaelsson |
| 2016/0214897 A1 | 7/2016 | Dubey |

FOREIGN PATENT DOCUMENTS

| | | |
|---|---|---|
| CN | 101712546 A | 5/2010 |
| CN | 101786854 A | 7/2010 |
| CN | 101921548 A | 12/2010 |
| CN | 102007085 A | 4/2011 |
| CN | 102159516 A | 8/2011 |
| CN | 102173711 A | 9/2011 |
| CN | 102180626 A | 9/2011 |
| CN | 102770388 A | 11/2012 |
| FR | 2940275 A1 | 6/2010 |
| FR | 2952050 A1 | 5/2011 |
| FR | 2955102 A1 | 7/2011 |
| GB | 2166430 A | 5/1986 |
| JP | 07305827 A | 11/1955 |
| JP | 58110451 A | 7/1983 |
| JP | S5957934 A | 4/1984 |
| JP | S60127252 A | 7/1985 |
| JP | 62179903 A | 8/1987 |
| JP | 01299913 A | 12/1989 |
| JP | H04270157 A | 9/1992 |
| JP | H05229864 A | 9/1993 |
| JP | H0986979 A | 3/1997 |
| JP | 2002226251 A | 8/2002 |
| JP | 2002316860 A | 10/2002 |
| KR | 549958 B1 | 2/2006 |
| KR | 100549958 B1 | 2/2006 |
| KR | 826258 B1 | 1/2007 |
| KR | 2009025683 A | 9/2007 |
| KR | 100814962 B1 | 3/2008 |
| KR | 100826258 | 4/2008 |
| KR | 20090025683 A | 3/2009 |
| KR | 2010129104 A | 6/2009 |
| KR | 100909997 B1 | 7/2009 |
| KR | 2009085451 A | 8/2009 |
| KR | 959587 B1 | 10/2009 |
| KR | 100959587 | 5/2010 |
| RU | 2268148 C2 | 1/2006 |
| RU | 2365548 C2 | 8/2009 |
| TW | 201139322 A | 11/2011 |
| WO | 2011131998 A1 | 10/2011 |

OTHER PUBLICATIONS

Personal Care, "ACULYN™ 22 Rheology Modifier/Stabilizer a Very Efficient Thickener for Difficult to Thicken Surfactant Systems", Rohm and Haas Company, Sep. 2002.

"Air-Entrainment", U.S. Department of Transportation—Federal Highway Administration, [online], [retrieved on Sep. 28, 2015]. Retrieved from the Internet: <http://www.fhwa.dot.gov/infrastructure/materialsgrp/airentr.htm>, pp. 1-3 (last modified Feb. 24, 2015).

Designation: C666/C666M-15, "Standard Test Method for Resistance of Concrete to Rapid Freezing and Thawing", ASTM International, West Conshohocken, PA, [online], [retrieved on Oct. 21, 2015], Retrieved from the Internet: <www.astm.org>, Feb. 1, 2015.

ASTM C672/C672M-12, "Standard Test Method for Scaling Resistance of Concrete Surfaces Exposed to Deicing Chemicals", ASTM International, West Conshohocken, PA, [online], [retrieved on Oct. 21, 2015], Retrieved from the Internet: <www.astm.org>.

"Freeze Thaw and ASTM C-672", US Spec Engineered Concrete Products, posted on May 21, 2010, [online], [retrieved on Sep. 28, 2015], Retrieved from the Internet: <http://www.usspec.com/blog/detail/freeze-thaw-and-astm-c-672/8/>, May 2012.

"Acronal® acrylic resins", BASF Corporation, Dispersion & Pigments North America, [online], [retrieved on Sep. 17, 2015], Retrieved from the Internet: <http://www.dispersions-pigments.basf.us/p02/USWeb-Internet/pigments/en_GB/content/microsites/pigmentsdispersions/products/Acronal>.

Adhesives, Technical Data Sheet, "Acronal® S 695 P", BASF Corporation, Rev 3, pp. 1-2, Mar. 2015.

Construction, Technical Data Sheet, "Acronal® S 695 P", BASF Corporation, Rev 3, pp. 1-3, Apr. 2015.

Construction Polymers, Technical Data Sheet, "Castament® FS 20", BASF Corporation, Rev 1, pp. 1-3, Oct. 2011.

A. Buchwald et al., "The suitability of thermally activated illite/smectite clay as raw material for geopolymer binders", Applied Clay Science 46 (2009), pp. 300-304.

"5.3 The Hydration Reactions", [online], [retrieved on Aug. 28, 2015], Retrieved from the Internet: <http://www.iti.northwestern.edu/cement/monograph/Monograph5_3.html>.

Technical Datasheet, "Bentone® CT", SpecialChem 2015, Elementis, [online], [retrieved on Sep. 17, 2015], Retrieved from the Internet: <http://adhesives.specialchem.com/product/a-elementis-bentone-ct>.

"Extracellular polymeric substance", From Wikipedia, the free encyclopedia, [online], [retrieved on Sep. 18, 2015], Retrieved from the Internet: <http://en.wikipedia.org/wiki/Extracellular_polymeric_substance>.

ASTM, C 666/C 666M-03, "Standard Test Method for Resistance of Concrete to Rapid Freezing and Thawing", ASTM International, West Conshohocken, PA, [online], [retrieved on Nov. 25, 2008], Retrieved from the Internet: <www.astm.org>.

"Methyl cellulose", From Wikipedia, the free encyclopedia, [online], [retrieved on Sep. 18, 2015], Retrieved from the Internet: <http://en.wikipedia.org/wiki/Methyl_cellulose>.

(56) References Cited

OTHER PUBLICATIONS

Product Bulletin, Building and Construction, "AXILAT Redispersible Powders, Dispersions and Additives", Momentive Specialty Chemicals Inc., 2012.
"Air-Entrainment", U.S. Department of Transportation—Federal Highway Administration, [online], [retrieved on Feb. 18, 2001]. Retrieved from the Internet: <http://www.fhwa.dot.gov/infrastructure/materialsgrp/airentr.htm>, pp. 1-3 (2001 edition).
"5.3 The Hydration Reactions", [online], [retrieved on Jun. 11, 2010], Retrieved from the Internet: <http://www.iti.northwestern.edu/cement/monograph/Monograph5_3.html> (2010 edition).
English Translation of CN 102173711 A published Sep. 7, 2011.
"The Worlds Only Commercially Available, High Performance & Sustainable Alternative to Traditional Portland Cement", www.ceratechinc.com, May 22, 2012.
Collepardi, M.M. "Water Reducers/Retarders" in "The Concrete Admixtures Handbook" edited by V.S. Ramachandran. Noyes Publications, New Jersey, 1995. pp. 286-297.
Kearsley, E.P.; Wainwright, P.J. The effect of high fly ash content on the compressive strength of foamed concrete. Cement and Concrete Research 31 (2001) pp. 105-112.
Tzouvalas, G, Dermatas, N, Tsimas, S, "Alternative Calcium Sulfate-Bearing Materials as Cement Retarders. Part I. Anhydrite", Cement and Concrete Research, Feb. 8, 2005, pp. 2113-2118, vol. 34, Elsevier, Orlando, FL.
Wayne S. Adaska et al., "Beneficial Uses of Cement Kiln Dust", May 19-22, 2008.
"Redispersible Powders, Dispersions and Additives for Building and Construction", 2009, Hexion.
Wikipedia, "Ye'elimite", http://en.wikipedia.org/wiki/Ye%27elimite, Apr. 12, 2012.
Machine Translation of JPH0986979, published Mar. 31, 1997 for Chichibu Onoda Cement Corp.
Machine Translation of KR100814962, published Mar. 19, 2008 for Refresh Technology Co Ltd et al.
Machine Translation of KR20100129104 A, published Dec. 8, 2010 for Korea Institute of Construction Technology et al.
Machine Translation of KR100909997 B1, published Jul. 29, 2009 for Samwon Inst of Construction SY et al.
Machine Translation of CN102173711 A, published Sep. 7, 2011 for Wuhan Iron & Steel Group Corp.
Machine Translation of JPS58110451, published Jul. 1, 1983 for Nippon Sheet Glass Co Ltd et al.
Machine Translation of CN102180626, published Sep. 14, 2011 for Shanghai Sunrise Chemical Co Ltd.
C. Costa, C. Ferreira, M. Filipa Ribeiro, A. Fernandes. "Alkali-Activated Binders Produced from Petrochemical Fluid Catalytic Cracking Catalyst Waste" IJRET: Int 1 Journal of Research in Engineering and Technology 3(13) (2014) 114-122.
I. Garcia-Lodeiro, A. Palomo, A Fernandez-Jimenez, D.E. Macphee. "Compatibility studies between N-A-S-H and C-A-S-H gels. Study in the ternary diagram Na2O—CaO—Al2O3—SiO2—H2O" Cement and Concrete Research 41 (2011) 923-931.
Geopolymers: Structure, Processing, Properties and Industrial Applications, Edited by J. L. Provis and J. S.J. van Deventer, CRC Press, Woodhead Publishing Limited, Cambridge, UK, 2009, pp. 96-97 and 365-367.
International Search Report dated Jan. 10, 2017 for International Application No. PCT/US2016/056720 to United States Gypsum Company filed Oct. 13, 2016.
Office Action with a search report dated Feb. 16, 2017 from Taiwanese Patent Application No. 102114041 to United States Gypsum Company.
Notice of Allowance with a Search Report dated Feb. 6, 2017 from Russian Patent Application No. 2014146785 to United States Gypsum Company.
Notice of Allowance with a Search Report dated Feb. 6, 2017 from Russian Patent Application No. 2014146124 to United States Gypsum Company.
Office Action dated Jan. 17, 2017 from Japanese Patent Application No. 2015-509035 to United States Gypsum Company.
Office Action dated Jan. 17, 2017 from Japanese Patent Application No. 2015-509036 to United States Gypsum Company.

\* cited by examiner

FIG. 1B– Prior Art
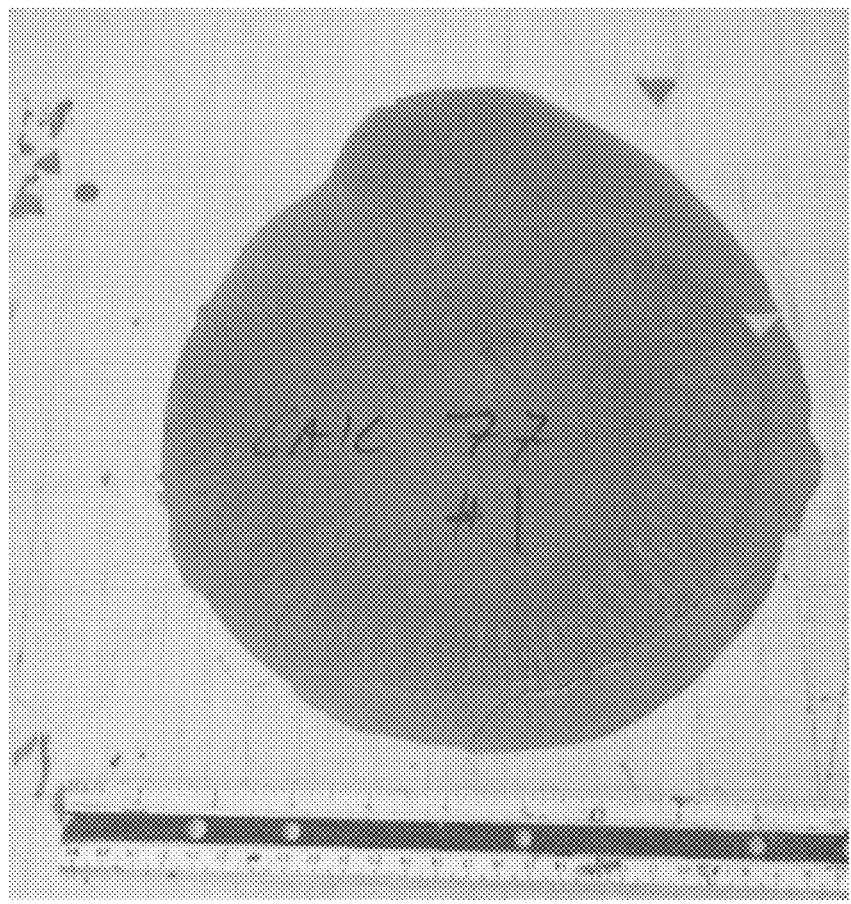

FIG. 2 – PRIOR ART
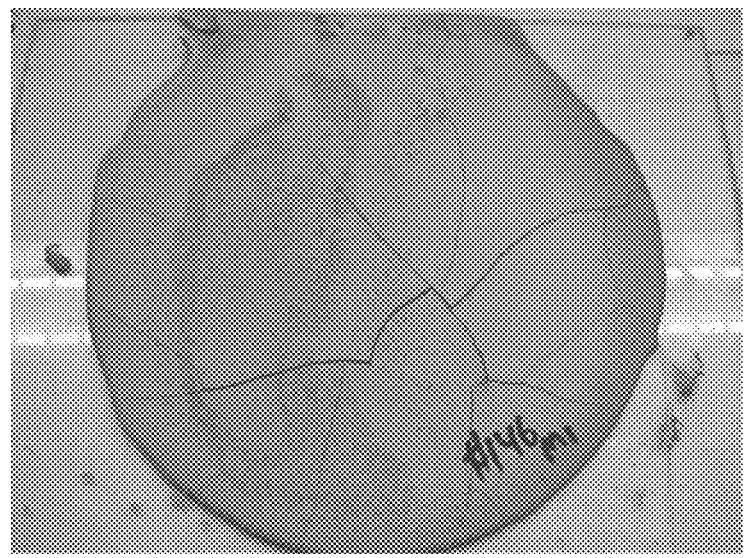
FIG. 3A- PRIOR ART
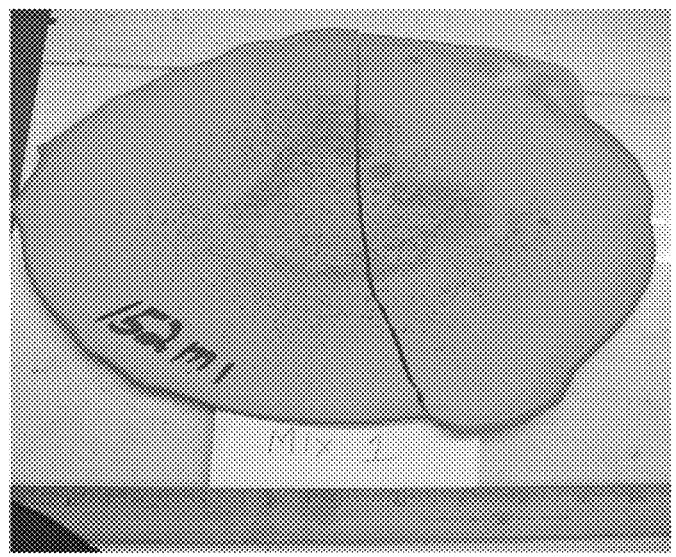

DIMENSIONALLY STABLE GEOPOLYMER COMPOSITION AND METHOD

CROSS-REFERENCE TO RELATED APPLICATIONS

This is a continuation of U.S. patent application Ser. No. 15/452,110, filed Mar. 7, 2017, now U.S. Pat. No. 10,221,096, which is a continuation of U.S. patent application Ser. No. 15/071,529, filed Mar. 16, 2016, now U.S. Pat. No. 9,643,888, which is a continuation of U.S. patent application Ser. No. 13/841,279, filed Mar. 15, 2013 now U.S. Pat. No. 9,321,681, which claims the benefit of U.S. Provisional Application No. 61/639,825, filed Apr. 27, 2012, each incorporated herein by reference.

FIELD OF THE INVENTION

This invention relates generally to cementitious compositions containing aluminosilicate based geopolymers that can be used for a variety of applications. In particular, the invention generally relates to such cementitious compositions which offer properties that are desirable in terms of setting times, dimensional stability and reduced overall material shrinkage upon curing, and other desirable properties.

BACKGROUND OF THE INVENTION

U.S. Pat. No. 6,572,698 to Ko discloses an activated aluminosilicate composition containing aluminosilicates, calcium sulphate and an activator containing alkali metal salts is disclosed. The aluminosilicates are selected from a group consisting of blast furnace slag, clay, marl and industrial by-products, such as fly ash, and has an $Al_2O_3$ content greater than 5% by weight. Blast furnace slag is present in an amount less than 35% by weight, and cement kiln dust (CKD), in an amount of from 1 to 20% by weight, is added to the mixture as an activator.

U.S. Pat. No. 4,488,909 to Galer et al discusses cementitious compositions capable of rapid setting. The cementitious composition includes portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement. Galer et al provided aluminates using high alumina cement (HAC) and sulfate ions using gypsum to form ettringite and achieve rapid setting of their cementitious mixture.

U.S. Pat. No. 6,869,474 to Perez-Pena et al, discusses cementitious compositions for producing cement-based products such as cement boards. This is achieved by adding an alkanolamine to hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash.

U.S. Pat. No. 7,670,427 of Perez-Pena et al, discusses cementitious compositions with early-age compressive strength for producing cement-based products such as cement boards achieved by adding an alkanolamine and a phosphate to hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash.

US published patent application No. US 2010-0071597 A1 of Perez-Pena discloses formulations using fly ash and alkali metal salts of citric acid such as sodium citrate to form concrete mixes with fast setting time and relatively high early age compressive strength. Hydrolaulic cement and gypsum can be used up to 25 wt % of the formulation, although their use is not preferred. The activated fly ash compositions described in this application may interact with the traditional foaming systems used to entrain air and thereby make lightweight boards.

U.S. Pat. No. 5,536,310 to Brook et al disclose a cementitious composition containing 10-30 parts by weight (pbw) of a hydraulic cement such as portland cement, 50-80 pbw fly ash, and 0.5-8.0 pbw expressed as a free acid of a carboxylic acid such as citric acid or alkali metal salts thereof, e.g., tripotassium citrate or trisodium citrate, with other conventional additives, including retarder additives such as boric acid or borax.

U.S. Pat. No. 6,641,658 to Dubey discloses a Portland cement based cementitious composition which contains 35-90% Portland cement, 0-55% of a pozzolan, 5-15% of high alumina cement and 1 to 8% of insoluble anhydrite form of calcium sulfate in place of the soluble conventional landplaster/gypsum to increase the release of heat and decrease setting time despite the use of high amounts of pozzolan, e.g., fly ash. The cementitious composition can include lightweight aggregates and fillers, superplasticizers and additives such as sodium citrate.

U.S. Pat. No. 7,618,490 B2 to Nakashima et al. discloses a quick setting spraying material comprising one or more of calcium sulfoaluminate, calcium aluminosilicate, calcium hydroxide, a source of fluorine and Portland cement concrete. Calcium sulfate may be added as anhydrous or as a hemihydrate.

U.S. Pat. No. 4,655,979 to Nakano et al. discloses a process for making a cellular concrete using calcium silicate based cement, alkali metal retarder, calcium sulfo-aluminate (CSA) cement and an optional calcium sulfate that can be added to the concrete composition.

US 2008/0134943 A1 to Godfrey et al. discloses a waste encapsulation material composed of at least one sulphoaluminate salt of an alkaline earth metal with calcium sulphate, and optional inorganic filler such as blast furnace slag, pulverized fuel ash, finely divided silica, limestone, and organic and inorganic fluidizing agents. Preferably at least one sulphoaluminate salt of an alkaline earth metal comprises calcium sulphoaluminate (CSA). A suitable composition may, for example, comprise at least one sulphoaluminate salt of an alkaline earth metal in combination with gypsum and pulverized fuel ash (PFA), wherein about 86% of the gypsum particles have a particle size of less than 76 um, and roughly 88% of the PFA particles have a particle size below 45 um. One example comprises 75% (70:30CSA:CaSO4.2H2O), 25% Pulverized Fuel Ash; water/solids ratio 0.65.

U.S. Pat. No. 6,730,162 to Li et al. discloses dual cementitious compositions including a first hydraulic binder having 2.5% to 95 wt. % $C_4A_3S$ which is chemical notation wherein C=CaO, S=$SiO_2$, A=$Al_2O_3$ (in other words calcium sulfo-alumina) and 2.5 to 95 wt. % a hemihydrate and/or an anhydrite of calcium sulfate. Sulfoalumina cements or ferroalumina cements are examples of cements that contain $C_4A_3S$. It may also include mineral filler additives selected from the group consisting of slag, fly ash, pozzolan, silica soot, limestone fines, lime industrial by-products and wastes.

Chinese published application CN 101921548 A to Deng et al. discloses a composition of sulfoaluminate cement made from 90-95 wt % sulfoaluminate clinker and anhydrous gypsum, quartz sand, fly ash from waste incineration, hydroxypropyl methylcellulose ether, redispersible glue powder and fiber. The sulfoaluminate clinker and anhydrous gypsum meets the standard of sulfoaluminate cement, i.e. GB20472-2006.

Korean published application KR 549958 B1 to Jung et al. discloses a composition of alumina cement, CSA, gypsum, calcium citrate, and hydroxyl carboxylic acid.

Korean published application KR 2009085451 A to Noh, discloses a composition of powdered blast furnace slag, gypsum and CSA. The gypsum can have an average particle size of 4 micron or less.

KR 2009025683 A discloses powder type waterproof material used for concrete and mortar, is obtained by pulverizing cement, anhydrous gypsum, silica powder, waterproof powder, fly ash, calcium sulfoaluminate type expansion material and inorganic compostion.

Korean published application KR 2010129104 A to Gyu et al. discloses composition for blending shotcrete, comprises (in wt. %): metakaolin (5-20), calcium sulfoaluminate (5-20), anhydrous gypsum (20-45), and fly ash (30-50).

There is a need for a dimensionally stable fly ash based geopolymeric compositions and method to reduce the amount of shrinkage, initial and final temperature behavior and reduce setting time of fly ash based compositions mixes so these formulations can be used to manufacture cementitious concrete products with improved strength.

SUMMARY OF THE INVENTION

The present invention provides improved geopolymer cementitious compositions and methods for making such compositions having at least one, and in many instances more than one, highly desirable property such as significantly improved dimensional stability during and after curing; improved and modifyable initial and final setting times; extended working times; modified temperature generation during mixing, setting and curing; and other improved properties as discussed herein. In many, if not all, of such embodiments, the improved properties are provided without significant (if any) loss in early age compressive strength, final compressive strength or other strength properties. Some embodiments, in fact, provide a surprising increase in early age and final compressive strength.

The improved properties of those and other embodiments of the invention provide distinct advanatages over prior geopolymeric binders, such as fly ash based binders, as well as other cementitious binders that may contain a significant geopolymer content. In some preferred embodiments, the geopolymer cementitious compositions of the invention are formed from solutions or slurries of at least water and one or more cementitious reactive components in a dry or powder form. The cementitious reactive components comprise effective amounts of thermally activated geopolymer aluminosilicate materials, such as fly ash; calcium aluminate cements; and calcium sulfates. One or more alkali metal chemical activator, such as an alkali metal salt of citric acid, or an alkali metal base, also is added to the solutions, either in a dry form to the reactive powder, or as a liquid addition to the slurry. Optionally, the slurry or solution may incorporate other additives such as water reducing agents, set accelerating or retarding agents, air-entraining agents, foaming agents, wetting agents, lightweight or other aggregates, reinforcing materials, or other additives to provide or modify the properties of the slurry and final product.

In many preferred compositions of the invention, the cementitious reactive components in their dry or powder form comprise about 65 to about 97 weight percent thermally activated aluminosilicate mineral such as fly ash, about 2 to about 30 weight percent calcium aluminate cement, and about 0.2 to about 15 weight percent calcium sulfate, based upon the total dry weight of all the cementitious reactive components. In preferred compositions of invention, the cementitious reactive components comprise calcium aluminate cement in about 1 to about 200 parts by weight relative to 100 parts by weight of thermally activated aluminosilicate mineral.

In other embodiments, a blend of two or more types calcium aluminate cements and calcium sulfoaluminate cements may be used, and the amounts and types of calcium aluminate cements and calcium sulfoaluminate cements can vary depending upon their chemical composition and particle size (Blaine fineness). The Blaine fineness of calcium aluminate cement in such embodiments and other embodiments preferably is greater than about 3000, more preferably greater than about 4000, and most preferably greater than 5000. The Blaine fineness of calcium sulfoaluminate cement in such embodiments and other embodiments preferably is greater than about 3000, more preferably greater than about 4000, even more preferably greater than 5000, and most preferably greater than about 6000.

In some preferred embodiments, the amount of alkali metal chemical activator is from about 0.5% to about 10% by weight based upon the total dry weight of the cementitious reactive materials. More preferably, the range of alkali metal chemical activator about 1% to about 6% by total weight of the cementitious reactive materials, preferably about 1.25% to about 4%, more preferably about 1.5% to about 3.5%, and most preferably about 1.5% to 2.5%. Sodium citrate and potassium citrate are preferred alkali metal acid activators, although a blend of sodium and potassium citrate can also be used. Alkali metal bases, such as alkali metal hydroxides, and alkali metal silicates also may be used depending on the application and the needs of that application.

These and other preferred embodiments of the invention, unlike prior fly ash geopolymer compositions, are formulated to provide geopolymer cementitious compositions that are dimensionally stable and resistant to cracking upon setting and hardening under both unrestrained and restrained conditions. For example, the short term free shrinkage of certain preferred embodiments of the invention typically is less than about 0.3%, preferably less than about 0.2%, and more preferably less than about 0.1%, and most preferably less than about 0.05% (measured after initial set and within 1 to 4 hours of mixing). In such preferred embodiments, the long term shrinkage of the compositions during curing also typically is less than about 0.3%, more preferably less than about 0.2%, and most preferably less than about 0.1%.

For additional control regarding the dimensional stability and shrinkage in those embodiments, the amount of calcium aluminate cement is about 2.5 to about 100 parts by weight relative to 100 parts by weight of the thermally activated aluminosilicate mineral, more preferably about 2.5 to about 50 parts by weight relative to 100 parts by weight of the thermally activated aluminosilicate mineral, and most preferably about 5 to about 30 parts by weight relative to 100 parts by weight of thermally activated aluminosilicate mineral. For embodiments where the control on dimensional stability as indicated by the material shrinkage is of importance, the amount of alkali metal activator more preferably ranges from about 1 to about 3% by total dry weight of the cementitious reactive materials (i.e., thermally activated aluminosilicate mineral such as fly ash, calcium aluminate cement and calcium sulfate), even more preferably from about 1.25% to about 2.75% by total dry weight of the cementitious reactive materials, and most preferably from about 1.5% to about 2.5% by total dry weight of the cementitious reactive materials.

The dimensionally stable geopolymer compositions of preferred embodiments of the invention further evidence a surprising reduction in the maximum temperature rise during curing of the composition relative to prior geopolymer cementitious products. For this and related reasons, these embodiments resist thermal cracking to an unexpected degree. For example, in some preferred embodiments, the temperature rise typically is less than about 50° F. (28° C.), more preferably less than about 40° F. (22° C.), and most preferably less than about 30° F. (17° C.).

These and other preferred embodiments of the invention also exhibit an unexpected rate of early age strength development. For example, in some such embodiments, their 4-hour compressive strength may exceed about 1000 psi (6.9 MPa), preferably exceeding about 1500 psi (10.3 MPa), most preferably exceeding about 2500 psi (17.2 MPa). In such embodiments, their 24-hour compressive strength development may exceed about 1500 psi (10.3 MPa), more preferably exceeding about 2500 psi (17.2 MPa), and most preferably exceeding about 3500 psi (24.1 MPa). In those and other preferred embodiments, the 28-day compressive strength further may exceed about 3500 psi (24.1 MPa), more preferably exceeding about 4500 psi (31.0 MPa), and most preferably exceeding about 5500 psi (37.9 MPa). In yet other embodiments, the compositions are capable of developing compressive strength after 1 to 4 hours from about 500 psi (3.5 MPa) to about 4000 psi (27.6 MPa), more preferably from about 1500 to about 5000 psi (10.3 to 34.5 MPa) after 24 hours, and most preferably from about 3500 to about 10000 psi (24.1 to 70 MPa) after 28 days.

Furthermore, the geopolymer cementitious compositions of certain of the preferred embodiments of the invention also have extremely good durability under wet conditions, with ultimate wet compressive strengths similar to dry compressive strengths. For example, in certain embodiments, their water saturated compressive strength at 28-days typically may exceed about 3500 psi (24.1 MPa), more preferably exceeding about 4500 psi (31.0 MPa), and most preferably exceeding about 5500 psi (37.9 MPa).

Because the set times from slurry to solid state for alkali metal activated geopolymers, as well as the combined calcium aluminate cements and calcium sulfates, typically are relatively short, it was expected that the preferred embodiments combining all of these components also would have short set times and limited working times. Surprisingly, however, the set times provided by the preferred embodiments of the invention are not limited to short set times (often less than 15 minutes), but provide significant control over the slurry setting reactions allowing significant extensions of the slurry set and working times.

For example, in some embodiments, the composition may be formulated for a short setting time, such as less than about 10 minutes. In other preferred embodiments, the composition may be formulated for an extended setting of between about 10 to about 30 minutes. In yet other more preferred embodiments, the composition formulation is preferably selected to provide a setting time of about 30 to about 60 minutes. In still other most preferred embodiments, the composition may be formulated for setting times as long as about 60 to about 120 minutes, about 120 to about 240 minutes, or longer times if desired.

The setting times of such embodiments, in addition, can be selected, and if desired extended, without significant (if any) loss in shrink resistance properties, compressive strength and other strength properties. As a result, such embodiments unexpectedly can be used in applications where prior geopolymer based products and cementitious products with geopolyemer components could not be used due to a need for extended set and working times without unacceptable shrinkage or strength loss.

In certain preferred embodiments, the compositions of the invention also develop exceptional tensile bond strength with an underlying substrate. For example, the preferable tensile bond strength between such embodiments and a concrete substrate preferably exceeds about 200 psi (1.4 MPa) and most preferably exceeds about 300 psi (2.1 MPa). In some embodiments, the surface pH of the fully cured and hardened dimensionally stable geopolymer cementitious compositions of the invention also are improved relative to Portland cement based materials and products, which typically have a surface pH of greater than 12 and more typically greater than 13. In certain preferred embodiments, such compositions are measured 16 hours after installation and preferably have a pH less than about 11, more preferably less than about 10.5, and most preferably less than about 10. In this context, surface pH is measured using the ASTM F-710 (2011) testing standard.

In many preferred embodiments, the geopolymer cementitious compositions of the invention do not require calcium silicate based hydraulic cements, such as Portland cements, for strength development and dimensional stability. In other embodiments, Portland cements can be incorporated to provide specific desired properties. However, it was surprisingly found that, depending on the specific composition of the embodiment, an excess amount of Portland cement actually decreased the composition's dimensional stability during and after curing, instead of increasing its dimensional stability.

For preferred embodiments of the invention incorporating calcium silicate based hydraulic cements, the limit on such hydraulic cements may vary depending on the specific composition of the embodiment, but can be identified by an increase in shrinkage relative to the shrinkage of the same embodiment with a reduced amount of the calcium silicate hydraulic cement. In certain of such embodiments the Portland cement content should not exceed about 15 weight % of the weight of reactive powder componentsin another preferred embodiment, it should not exceed 10 weight % of the weight of reactive powder components, and in yet another preferred it should not exceed about 5 weight % of the weight of reactive powder components and yet another preferred embodiment, there is no substantial amount of Portland cement in the reactive powder components.

It also has surprisingly been found in some embodiments that an excess amount of calcium aluminate cement can cause a loss of dimensional stability, as indicated by an increase in shrinkage after the initial set of the composition. For applications requiring significant degree of dimensional stability and/or shrinkage control to prevent cracking, delamination and other modes of failure, the amount of calcium aluminate cement is preferably about 10 to about 60 parts by dry weight relative to 100 parts by dry weight of thermally activated aluminosilicate mineral.

In other preferred embodiments, it also has been unexpectedly found that the amount of calcium sulfate present in proportion to calcium aluminate cement in the composition can moderate potential adverse effects, such as shrinkage, caused by the calcium aluminate cement content. In such embodiments, the calcium sulfate amount is preferably about 2 to about 200 parts by weight relative to 100 parts by weight of calcium aluminate cement.

For the most effective control of material shrinkage of those embodiments, the amount of calcium sulfate is about 10 to about 100 parts by dry weight relative to 100 parts by dry weight of calcium aluminate cement, more preferably about 15 to about 75 parts by dry weight relative to 100 parts by dry weight of calcium aluminate cement, and most preferably about 20 to about 50 parts by dry weight relative to 100 parts by dry weight of calcium aluminate cement. In embodiments where an increase in early age compressive strength is important, it is preferred amount of calcium sulfate amount is about 10 to about 50 parts to about 100 parts by dry weight of calcium aluminate cement.

In yet other embodiments of the invention, the type of calcium sulfate (primarily dihydrate, hemihydrate, or anydrite) added to the composition can have a significant influence on the development of the early age compressive strength of the partially cured composition (i.e. at less than about 24 hours). Surprisingly, it has been found that various embodiments using primarily anhydrous calcium sulfate (anhydrite) have a greater early compressive strength than embodiments using primarily the dihydrate form and, in some embodiments, can have early compressive strengths comparable to those using primarily calcium sulfate hemihydrate. In other embodiments, two or more of the calcium sulfate types (dihydrate, hemihydrate, or anydrite) can be employed together, and the amounts of the different types adjusted to provide improved control of the composition's compressive strength. Similarly, the different types and amounts of calcium sulfate can be employed alone or in combination to adjust the desired shrinkage and other properties of the composition.

Where shrinkage performance is of central concern, other embodiments of the invention incorporate calcium sulfates with average particle sizes preferably from about 1 to about 100 microns, about 1 to about 50 microns, and about 1 to about 20 microns. These embodiments provide a surprising improvement in shrinkage resistance, and in other embodiments, the calcium sulfate particle sizes in at least the preferred ranges can provide an important contribution to improved rates of strength development during curing of the compositions.

In yet other embodiments, it was surprisingly found that substantially water insoluble anhydrous calcium sulfate (anhydrite) can provide important benefits, notwithstanding its low water solubility and previously presumed limited, if any, reactivity in the composition. For example, it was unexpectedly found that anhydrite provided significant improved dimensional stability control by reducing the shrinkage during curing of those and other embodiments relative to prior art compositions. Anhydrite also provided significantly improved early and long term compressive strength relative to prior art compositions, and, in some instances, early and long term compressive strengths comparable to or better than compositions utilizing calcium sulfate hemihydrate or dihydrate as the calcium sulfate source. The selection of the type of calcium sulfate used in a particular embodiment will depend on the desired rate of early age strength development in combination with a balance of other properties, such as set time and shrinkage resistance for a particular end application.

In other embodiments, the particle size and morphology of calcium sulfate provides a significant and surprising influence on development of early age strength (less than about 24 hours) of the compositions. In such embodiments, the use of a relatively a small particle size calcium sulfate provides a more rapid development in early age compressive strength. In those embodiments, the preferred average particle size of calcium sulfate ranges from about 1 to 100 microns, more preferably from about 1 to 50 microns, and most preferably from about 1 to 20 microns.

In certain embodiments, the compositions also exhibit a self-leveling behavior after initial mixing while providing one or more of the aforementioned surprising performance characteristics. The self-leveling aspect of material is useful in a variety of situations and applications such as self-leveling underlayments for floors, concrete toppings, manufacturing of precise concrete products and panels, placement of slurry in heavily reinforced construction elements, etc. The compositions of those embodiments are self-leveling after initial mixing with water to the reactive powder of the invention at a weight ratio of about 0.15 to about 0.4, more preferably, 0.17 to 0.35, yet more preferably 0.20 to 0.30. Alternatively, in other embodiments, the compositions also can be provided in a shapeable, thick paste like consistency after initial mixing while similarly providing one or more improved performance characteristics.

A preferable formulation for self-leveling and patching compositions comprises about 65 to about 95 weight percent fly ash, about 2 to about 30 weight percent calcium aluminate cement, and about 0.2 to about 15 weight percent calcium sulfate. In some embodiments, the geopolymeric cementitious composition of the invention can be spread on a surface of a substrate, wherein the geopolymeric cementitious binder is mixed as a self-leveling product and is poured to an effective thickness of about 0.02 cm to about 7.5 cm.

The physical characteristics of such products provide good examples of benefits of those embodiments, i.e. dimensional stability, resistance to dimensional movement and physical distress, and high surface resistance to abrasion and wear, suitable for use in commercial, industrial, and other high traffic areas. Time consuming and expensive substrate surface preparation measures such as shot-blasting, scarifying, water jetting, scabbing or milling can be minimized or avoided altogether, depending on the application.

In other aspects of the invention, preferred embodiments provide methods for making dimensionally stable, cementitious compositions with setting times adaptable to specific applications, good early age strength development and ultimate compressive and other strength characteristics, improved surface pH, improved tensile bond strength with substrates and other benefits. In certain preferred embodiments, those methods comprise the steps of preparing a surprisingly effective, synergistic mixture of thermally activated aluminosilicates, preferably from Class C fly ash, calcium aluminate cement, a calcium sulfate, and an alkali metal chemical activator.

In certain preferred embodiments of such methods, the preferred mixtures are prepared using components, such as those mentioned above, to form a cementitious reactive powder comprising thermally activated Class C fly ash, calcium aluminate cement, and a calcium sulfate selected from the group consisting of calcium sulfate dihydrate, calcium sulfate hemihydrate, anhydrous calcium sulfate and mixtures thereof (preferably in a fine grain form with particle size less than about 300 microns).

In those embodiments, a chemical activator further is added to the mixture either in dry or liquid form comprising an alkali metal salt or base preferably selected from the group consisting of alkali metal salts of organic acids, alkali metal hydroxides, and alkali metal silicates. In subsequent steps, water is added and optionally a superplasticizer, particularly a carboxylated plasticizer material, to form stable slurry mixtures that can be used in applications suitable for geopolymeric cementitious products.

In the preferred methods, the mixtures are prepared at an initial temperature of about 0° C. to about 50° C., more preferably an initial temperature of about 5° C. to about 40° C., even more preferably an initial temperature of about 10° C. to about 35° C., most preferably ambient temperature of about 25° C. In such embodiments, the initial temperature of the overall mixture is measured during the first minute after the cementitious reactive powder; activator and water are first all present in the mixture. Of course the temperature of the overall mixture can vary during this first minute but in such preferred embodiments; the temperature of the slurry preferably remains within the listed range.

In some preferred embodiments, the slurry can be mixed using relatively low energies, while still achieving a well-mixed composition. In some of such preferred methods, the slurry is mixed with energies equivalent to those provided by low speed hand drill mixers or equivalent mixers having a rating of about 250 RPM or greater. Accordingly, the geopolymer compositions of such preferred embodiments are easy to mix despite the use of the relatively small amounts of water used to make the slurry used to form the final composition.

In many embodiments, other additives which are not considered cementitious reactive powder may be incorporated into the slurry and overall geopolymeric cementitious composition. Such other additives, for example, water reducing agents such as the above mentioned superplasticizers, set accelerating agents, set retarding agents, air-entraining agents, foaming agents, wetting agents, shrinkage control agents, viscosity modifying agents (thickeners), film-forming redispersible polymer powders, film-forming polymer dispersions, coloring agents, corrosion control agents, alkali-silica reaction reducing admixtures, discrete reinforcing fibers, and internal curing agents. Other additives may include fillers, such as one or more of sand and/or other aggregates, lightweight fillers, pozzolanic mineral, mineral fillers, etc.

While separately discussed above, each of the preferred geopolymeric compositions and mixtures of the invention has at least one, and can have a combination of two or more of the above mentioned distinctive advantages (as well as those apparent from the further discussion, examples and data herein) relative to prior art geopolymeric cementitious compositions.

Many, if not most, of the embodiments of the invention are environmentally sustainable, utilizing fly ash geopolymers that comprise post industrial waste as a primary raw material source. This significantly reduces the life cycle carbon footprint and the life cycle embodied energy of the manufactured product.

The geopolymer cementitious compositions of preferred embodiments of the present invention can be used where other cementitious materials are used, particularly applications where setting and working time flexibility, dimensional stability, compressive strength and/or other strength properties are important or necessary. For example, in various concrete product applications including structural concrete panels for floors, slabs, and walls, wall and floor underlayment for installation of floor-finish materials such as ceramic tiles, natural stones, vinyl tiles, VCTs and carpet, highway overlays and bridge repair, sidewalks and other slabs-on-ground, exterior stucco and finish plasters, self-leveling topping and capping underlayments, guniting and shotcrete for stabilization of earth and rocks in foundations, mountain slopes and mines, patching repair mortars for filling and smoothing cracks, holes and other uneven surfaces, statuary and murals for interior and exterior applications, as well as pavement materials for roads, bridge decks and other traffic and weight bearing surfaces.

Other examples include uses for precast concrete articles, as well as building products such as cementitious boards, masonry blocks, bricks, and pavers with excellent moisture durability. In some applications, such precast concrete products such as cement boards are preferably made under conditions which provide setting times appropriate for pouring into a stationary or moving form or over a continuously moving belt.

The geopolymer compositions of some embodiments of the invention can be used with different fillers and additives including foaming agents and air entraining agents for adding air in specific proportions to make lightweight cementitious products, including precast construction elements, construction repair products, traffic bearing structures such as road compositions with good expansion properties and no shrinkage.

The invention includes an aluminosilicate geopolymer cementitious composition comprising a reaction product of:
a cementitious reactive powder comprising:
about 35 to about 85% by weight a thermally activated aluminosilicate mineral;
about 9 to about 45% by weight a calcium aluminate cement in an amount of 1-100 parts by weight per 100 parts by weight of thermally activated aluminosilicate mineral; and
about 1 to about 45% by weight a calcium sulfate selected from the group consisting of calcium sulfate dihydrate, calcium sulfate hemihydrate, anhydrous calcium sulfate and mixtures thereof, the calcium sulfate in an amount of 2 to 100 parts by weight per 100 parts by weight of calcium aluminate cement; and
a chemical activator selected from the group consisting of alkali metal salt, alkali metal base, and mixtures thereof in an amount equal to about 1.0 to about 6.0% by weight based on total weight of the cementitious reactive powder; and
at least one member of the group consisting of superplasticizers, air entraining agents, defoaming agents, organic rheology control agents, and film-forming polymers; and water.

The invention also includes a settable composition for forming an aluminosilicate geopolymer cementitious composition when reacted in water, comprising:

a settable mixture of:
a cementitious reactive powder comprising:
about 35 to about 85% by weight of a thermally activated aluminosilicate mineral;
about 9 to about 45% by weight of a calcium aluminate cement;
about 1 to about 45% by weight of a calcium sulfate selected from the group consisting of calcium sulfate dihydrate, calcium sulfate hemihydrate, anhydrous calcium sulfate and mixtures thereof; and
a chemical activator selected from the group consisting of an alkali metal salt and an alkali metal base, or mixtures thereof in an amount equal to about 1.0 to about 6.0% by weight based on total weight of the cementitious reactive powder; and
at least one member of the group consisting of superplasticizers, air entraining agents, defoaming agents, organic rheology control agents, and film-forming polymers.

Other advantages, benefits and aspects of various embodiment of the invention are discussed below, are illustrated in the accompanying figures, and will be understood by those of skill in the art from the more detailed disclosure below. All percentages, ratios and proportions herein are by weight, unless otherwise specified.

BRIEF DESCRIPTION OF THE DRAWINGS

FIG. 1B is a photograph of slump of Example 1.
FIG. 2 is a photograph of slump of Comparative Example 2.
FIG. 3A is a photograph of slump of Comparative Example 3.

DETAILED DESCRIPTION OF THE INVENTION

Figure 1A:
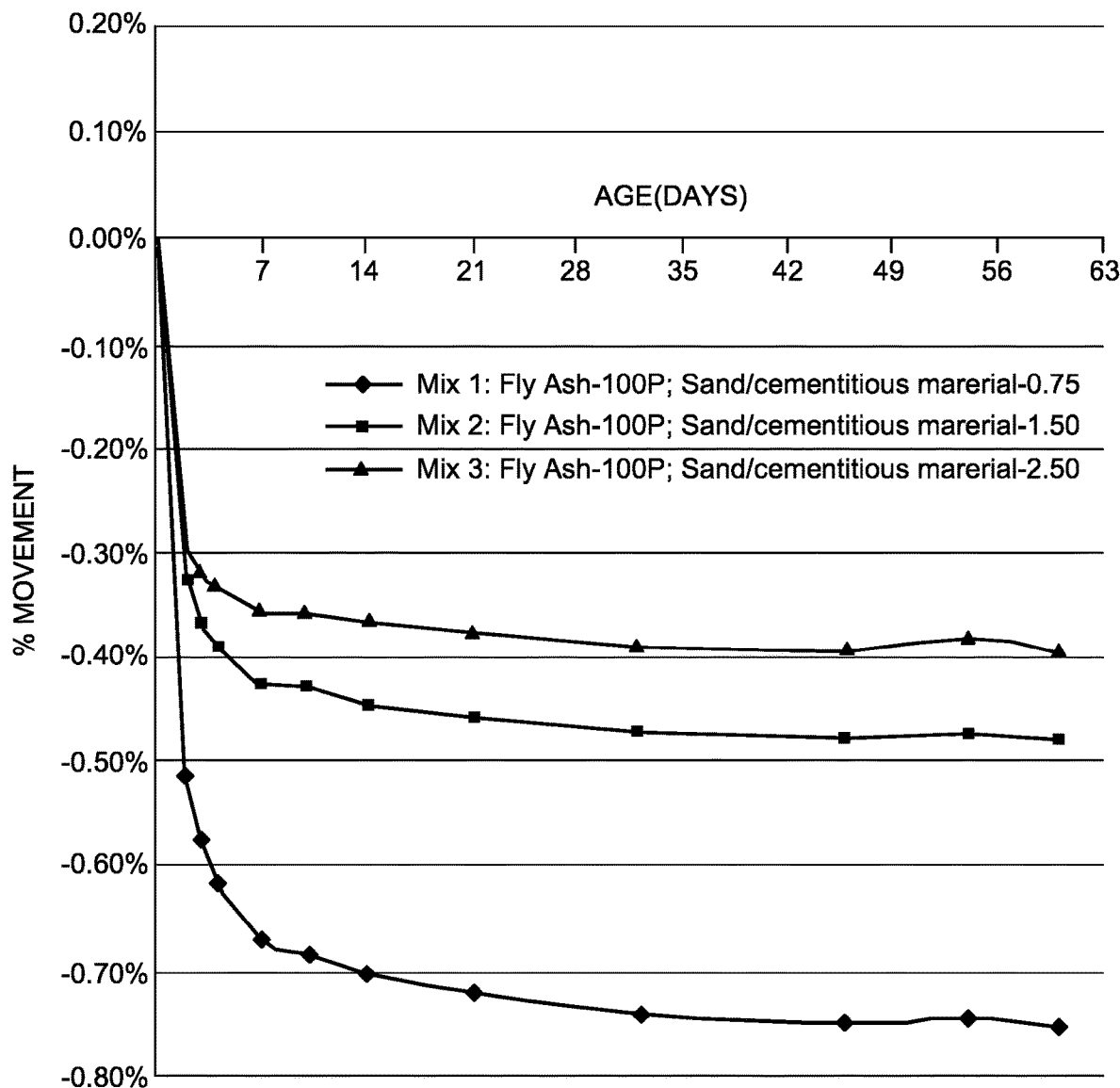
FIG. 1A—Graph of time of shrinkage results of Comparative Example 1.

TABLE A shows the composition of the dimensionally stable geopolymer cementitious compositions of some embodiments of the invention expressed in parts by weight (pbw) of individual or aggregated components.

TABLE A shows the dimensionally stable geopolymer cementitious compositions of some embodiments of the invention are comprised of two components—Reactive Powder Component A (also referred to herein as "Cementitious Reactive Material" and Activator Component B. Cementitious Reactive Material for purposes of this invention is defined as a thermally activated aluminosilicate, calcium aluminate cement, a calcium sulfate, and any additional reactive cement to the extent it is added to the other listed ingredients. In the following TABLES, Reactive Powder Component A is blend of materials comprising thermally activated aluminosilicate mineral comprising Class C fly ash, cement comprising calcium aluminate cement, and calcium sulfate. Activator Component B comprises an alkali metal chemical activator or mixtures thereof, which can be a powder or aqueous solution. Reactive Powder Component A and Activator Component B combined together form the reactive mixture of the geopolymer cementitious compositions of some embodiments of the invention.

TABLE A

Reactive geopolymer cementitious compositions of some embodiments of the invention.

| | Broad | Preferred | More Preferred |
|---|---|---|---|
| Reactive Powder Component A: | | | |
| a. Thermally activated aluminosilicate mineral comprising Class C Fly ash, pbw | 100 | 100 | 100 |
| b. Calcium aluminate cement, pbw per 100 pbw of thermally activated aluminosilicate mineral | 1-100 | 2.5-80 | 5-60 |
| c. Calcium sulfate, pbw per 100 pbw of calcium aluminate cement. | 2-100 | 5-75 | 10-50 |
| Activator Component B: | | | |
| Alkali metal chemical activator, weight % based upon the total weight of Component A (i.e., weight % of total thermally activated aluminosilicate comprising Class C fly ash, calcium aluminate cement, and calcium sulfate). | 1 to 6% | 1.25 to 4% | 1.5 to 2.5% |

TABLE B represents full density (preferably densities in the range of 100 to 160 pounds per cubic foot) formulations incorporating the composition of TABLE A and other ingredients.

TABLE B

| Ingredient | Broad | Preferred | More preferred |
|---|---|---|---|
| Reactive Powder Component A: | | | |
| a. Thermally activated aluminosilicate mineral comprising Class C Fly ash, pbw | 100 | 100 | 100 |
| d. Calcium aluminate cement, pbw per 100 pbw of thermally activated aluminosilicate mineral | 2-100 | 2.5-80 | 5-60 |
| b. Calcium sulfate, pbw per 100 pbw of calcium aluminate cement. | 2-100 | 5-75 | 10-50 |
| Activator Component B: | | | |
| Alkali metal chemical activator, weight % based upon the total weight of Component A | 1 to 6% | 1.25 to 4% | 1.5 to 2.5% |
| Superplasticizer/Reactive Powder Component A (weight %) | 0 to 4.0% | 0.25-2.5% | 0.50-1.5% |
| Sand/Reactive Powder Component A Ratio (by weight) | 0-4 | 0.50-3 | 0.75-1.5 |
| Inorganic Mineral Filler/Reactive Powder Component A Ratio (by weight) | 0-2 | 0-1 | 0-0.5 |
| Defoaming Agent/Reactive Powder Component A (weight %) | 0-1% | 0-0.75% | 0-0.50% |
| Organic Rheology Control Agent/Reactive Powder Component A (weight %) | 0-0.50% | 0-0.25% | 0-0.15% |
| Inorganic Rheology Control Agent/Reactive Powder Component A (weight %) | 0-3% | 0-2% | 0-1% |
| Coloring Pigments/Reactive Powder Component A (weight %) | 0-5% | 0-2.5% | 0-1% |
| Efflorescence Suppression Agent/Reactive Powder Component A (weight %) | 0-3% | 0-2% | 0-1% |
| Film Forming Redispersible Polymer Powder/Reactive Powder Component A (weight %) | 0-20% | 0-10% | 0-5% |
| Film Forming Polymer Dispersion/Reactive Powder Component A (weight %) | 0-40% | 0-20% | 0-10% |
| Water/Reactive Powder Component A Ratio (by weight) | 0.17-0.40 | 0.20-0.35 | 0.22-0.30 |

TABLE C represents lightweight density (preferably densities in the range of 10 to 125 pounds per cubic foot) formulations incorporating the compositions of TABLE A and other ingredients.

TABLE C

| Ingredient | Broad | Preferred | More preferred |
|---|---|---|---|
| Reactive Powder Component A: | | | |
| a. Thermally activated aluminosilicate mineral comprising Class C Fly ash, pbw | 100 | 100 | 100 |
| e. Calcium aluminate cement, pbw per 100 pbw of thermally activated aluminosilicate mineral | 2-100 | 2.5-80 | 5-60 |
| b. Calcium sulfate, pbw per 100 pbw of calcium aluminate cement. | 2-100 | 5-75 | 10-50 |

TABLE C-continued

Ingredient Amounts

| Ingredient | Broad | Preferred | More preferred |
|---|---|---|---|
| Activator Component B: | | | |
| Alkali metal chemical activator, weight %, based upon the total weight of Component A | 1 to 6% | 1.25 to 4% | 1.5 to 2.5% |
| Superplasticizer/Reactive Powder Component A (weight %) | 0 to 4.0% | 0.25-2.5% | 0.50-1.5% |
| Sand/Reactive Powder Component A Ratio (by weight) | 0-4 | 0-2 | 0-1.0 |
| Inorganic Mineral Filler/Reactive Powder Component A Ratio (by weight) | 0-2 | 0-1 | 0-0.5 |
| Defoaming Agent/Reactive Powder Component A (weight %) | 0-1% | 0-0.75% | 0-0.50% |
| Organic Rheology Control Agent/Reactive Powder Component A (weight %) | 0-0.50% | 0-0.25% | 0-0.15% |
| Inorganic Rheology Control Agent/Reactive Powder Component A (weight %) | 0-3% | 0-2% | 0-1% |
| Coloring Pigments/Reactive Powder Component A (weight %) | 0-5% | 0-2.5% | 0-1% |
| Efflorescence Suppression Agent/Reactive Powder Component A (weight %) | 0-3% | 0-2% | 0-1% |
| Film Forming Redispersible Polymer Powder/Reactive Powder Component A (weight %) | 0-20% | 0-10% | 0-5% |
| Film Forming Polymer Dispersion/Reactive Powder Component A (weight %) | 0-40% | 0-20% | 0-10% |
| Lightweight Filler/Reactive Powder Component A Ratio (by weight) | 0-2 | 0.01-1 | 0.02-0.75 |
| Water/Reactive Powder Component A Ratio (by weight) | 0.17-0.40 | 0.20-0.35 | 0.22-0.30 |

TABLE D represents lightweight or full density (preferably densities in the range of 40 to 160 pounds per cubic foot) formulations incorporating the composition of TABLE A, coarse aggregate and other ingredients.

TABLE D

Ingredient Amounts

| Ingredient | | Broad | Preferred | More preferred |
|---|---|---|---|---|
| Reactive Powder Component A: | | | | |
| a. | Thermally activated aluminosilicate mineral comprising Class C Fly ash, pbw | 100 | 100 | 100 |
| b. | Calcium aluminate cement, pbw per 100 pbw thermally activated aluminosilicate mineral | 2-100 | 2.5-80 | 5-60 |
| c. | Calcium sulfate, pbw per 100 pbw of Calcium aluminate cement. | 2-100 | 5-75 | 10-50 |
| Activator Component B: | | | | |
| Alkali metal chemical activator, weight %, based upon the total weight of Component A | | 1 to 6% | 1.25 to 4% | 1.5 to 2.5% |
| Superplasticizer/Reactive Powder Component A (weight %) | | 0 to 4% | 0.25-2.5% | 0.50-1.5% |
| Sand/Reactive Powder Component A Ratio (by weight) | | 0-4 | 0.50-3 | 1-2 |
| Inorganic Mineral Filler/Reactive Powder Component A Ratio (by weight) | | 0-2 | 0-1 | 0-0.5 |
| Defoaming Agent/Reactive Powder Component A (weight %) | | 0-1% | 0-0.75% | 0-0.50% |

TABLE D-continued

Ingredient Amounts

| Ingredient | Broad | Preferred | More preferred |
|---|---|---|---|
| Organic Rheology Control Agent/Reactive Powder Component A (weight %) | 0-0.5% | 0-0.25% | 0-0.15% |
| Inorganic Rheology Control Agent/Reactive Powder Component A (weight %) | 0-3% | 0-2% | 0-1% |
| Coloring Pigments/Reactive Powder Component A (weight %) | 0-5% | 0-2.5% | 0-1% |
| Efflorescence Suppression Agent/Reactive Powder Component A (weight %) | 0-3% | 0-2% | 0-1% |
| Film Forming Redispersible Polymer Powder/Reactive Powder Component A (weight %) | 0-20% | 0-10% | 0-5% |
| Film Forming Polymer Dispersion/Reactive Powder Component A (weight %) | 0-40% | 0-20% | 0-10% |
| Coarse Aggregate/Reactive Powder Component A Ratio (by weight) | 0.5-5 | 0.5-4 | 1-3 |
| Lightweight Filler/Reactive Powder Component A Ratio (by weight) | 0-2 | 0-1 | 0-0.50 |
| Water/Reactive Powder Component A Ratio (by weight) | 0.2-0.4 | 0.225-0.35 | 0.25-0.3 |

The long-term free shrinkage of the geopolymer cementitious compositions mixtures of some embodiments of the invention with shrinkage measurements initiated between 1 to 4 hours after mixing to form an aqueous mixture of about 0.3% or less, preferably less than about 0.2%, and more preferably less than about 0.1%, and most preferably less than about 0.05%. As mentioned previously, the synergistic interaction between the thermally activated aluminosilicate mineral, calcium aluminate cement, appropriately selected source and amount of calcium sulfate, and appropriately selected alkali metal activator used at proper amount according to some embodiments of this invention helps to minimize the material shrinkage.

It has been very surprisingly found that the amount of calcium aluminate cement in the geopolymer cementitious compositions of some embodiments of the invention plays an important influence on controlling the degree of material shrinkage measured after the initial setting of the material. It has also been surprisingly been found that beyond a some amount of calcium aluminate cement in a given embodiment, the amount of material shrinkage occurring after the initial set of the material begins to increase.

TABLE D1 shows ingredient amounts.

TABLE D1

| Ingredient | Broad | Preferred | More preferred |
|---|---|---|---|
| In general the amount of calcium aluminate cement per 100 parts by weight thermally activated aluminosilicate mineral. | 1-200 parts by weight | 2.5 to 100 parts by weight | 5 to 50 parts by weight |
| For most effective control on material shrinkage, the amount of calcium aluminate cement per 100 parts by weight thermally activated aluminosilicate mineral. | 2.5 to 75 parts by weight | 3.5 to 50 parts by weight | 5 to 30 parts by weight |
| For applications requiring very high degree of shrinkage control to prevent cracking, delamination and other modes of failure, the amount of calcium aluminate cement per 100 parts by weight thermally activated aluminosilicate mineral. | 5 to 40 parts by weight | 5 to 35 parts by weight | 5 to 30 parts by weight |

It has also been unexpectedly found the amount of calcium sulfate present in proportion to calcium aluminate cement in the mixture has a significant influence on the degree of material shrinkage of geopolymer cementitious compositions of some embodiments of the invention.

TABLE D2 shows ingredient amounts of some embodiments of the invention, the amount of calcium sulfate per 100 parts calcium aluminate cement.

TABLE D2

| Ingredient | Broad | Preferred | More preferred |
|---|---|---|---|
| In general the weight ratio of calcium sulfate per 100 parts by weight calcium aluminate cement. | 2 to 200 parts by weight | 10 to 100 parts by weight | 20 to 75 parts by weight |
| For most effective control on material shrinkage of the geopolymer cementitious compositions of some embodiments of the invention, the amount of calcium sulfate per 100 parts calcium aluminate cement. | 2 to 100 parts by weight | 5 to 75 parts by weight | 10 to 50 parts by weight |

For a given amount of alkali metal activator and other components in the composition of some embodiments of the invention, usage of calcium sulfate dihydrate has been found to provide the most effective control in minimizing the material shrinkage. Usage of anhydrous calcium sulfate (anhydrite) and calcium sulfate hemi-hydrate also provide excellent control in lowering the material shrinkage of the geopolymer cementitious compositions of some embodiments of the invention. Calcium sulfate dihydrate and anhydrous calcium sulfate (anhydrite) are the preferred form of calcium sulfate of some embodiments of this invention. More preferably, the calcium sulfate dihydrate is in the form of fine grain landplaster.

It has been surprisingly found the amount of alkali metal activator has a significant influence on the degree of material shrinkage of geopolymer cementitious compositions of some embodiments of the invention. TABLE D3 shows ingredient amounts for the % amount of alkali metal activator relative to the weight of the cementitious materials (i.e. thermally activated aluminosilicate mineral, calcium aluminate cement, and calcium sulfate) preferred to achieve this.

TABLE D3

| Ingredient | Broad | Preferred | More preferred |
|---|---|---|---|
| For the most effective control on material shrinkage of the geopolymer cementitious compositions of some embodiments of the invention, the weight % of alkali metal activator relative to the total weight of the cementitious materials (i.e., thermally activated aluminosiicate mineral, calcium aluminate cement, and calcium sulfate). | 1 to 6% by weight of the cementitious materials | 1.25% to 4% by weight of the cementitious materials | 1.5% to 2.5% by weight of the cementitious materials |

Preferably, the composition comprises no Portland cement. In fact, it has quite surprisingly been found that incorporation of calcium silicate based hydraulic cements such as Portland cement to the geopolymer compositions of some embodiments of the invention has a negative influence on the dimensional stability of the resulting material. Increase in Portland cement amount added to the geopolymer compositions of some embodiments of the invention increases the shrinkage of the resulting compositions. Increase in material shrinkage in the presence of Portland cement results even when calcium aluminate cement, calcium sulfate and alkali metal chemical activator are present in the composition. For example, it has been surprisingly found incorporation of about 6%, about 14%, and about 25% by weight Portland cement in the reactive powder compositions of some embodiments of the invention, increased the 8-week material free shrinkage, measured after the material initial set, to about 0.1%, 0.16%, and 0.47%, respectively. Thus, addition of Portland cement negatively influences the synergistic interaction between the basic four reactive components (thermally activated aluminosilicate mineral comprising Class C fly ash, calcium aluminate cement, calcium sulfate and alkali metal chemical activator in some embodiments of the invention. Hence, the geopolymer cementitious compositions of some embodiments of the invention preferably do not contain Portland cement.

To form the composition of some embodiments of the invention, the Reactive Powder Component A (thermally activated aluminosilicate mineral, calcium aluminate cement, and calcium sulfate), Activator Component B (alkali metal chemical activator), and water are mixed to form a cementitious slurry at an initial temperature (temperature during the first minute the ingredients are first all present in the mixture) of about 0° C. to about 50° C., and preferably about 10 to about 35° C. As a result, geopolymerization reaction ensues, leading to formation of alumino-silicate geopolymer reaction species and setting and hardening of the resulting material. Simultaneously, hydration reactions of calcium aluminate and calcium silicate phases also occur leading to setting and hardening of the resulting material.

The dimensionally stable geopolymer compositions of some embodiments of the invention have extremely low water demand to achieve a workable mixture in the fresh state and to produce a strong and durable material in the hardened state.

The preferable water/total solids weight ratio of the dimensionally stable geopolymer cementitious compositions of some embodiments of the invention in the absence of coarse aggregate is about 0.04 to about 0.25, preferably about 0.04 to about 0.20, more preferably about 0.05 to about 0.175 and still more preferably about 0.05 to about 0.15. The preferable water/total solids ratio of the dimensionally stable geopolymer compositions of some embodiments of the invention in the presence of coarse aggregate is preferably less than about 0.125, more preferably less than about 0.10 and still more preferably less than about 0.075. Total solids include cementitious materials, aggregate (such as sand or other aggregate), fillers and other solid additives on a water free basis.

A minimum amount of water is provided to accomplish the chemical hydration and alumino-silicate geopolymerization reactions. Preferably, in the slurry of some embodiments of the invention, the weight ratio of the water to cementitious materials is about 0.17 to about 0.4, more preferably about 0.2 to about 0.35, and still more preferably about 0.22 to about 0.3. The amount of water depends on the needs of the individual materials present in the cementitious composition. As used herein, "cementitious materials" is defined as the thermally activated aluminosilicate mineral, calcium aluminate cement, and calcium sulfate and any additional cement which may be added to the reactive mixture.

Setting of the composition is characterized by initial and final set times, as measured using Gilmore needles specified in the ASTM C266 test procedure. The final set time also corresponds to the time when a concrete product, e.g., a concrete panel, has sufficiently hardened so that it can be handled.

Geopolymeric reaction of thermally activated aluminosilicate mineral such as fly ash is an exothermic reaction. It has been unexpectedly found that fly ash, calcium aluminate cement, calcium sulfate, and alkali metal chemical activator synergistically interact with each other in some embodiments of the invention as part of the geopolymerization reaction to very significantly reduce the rate and amount of heat released by the material undergoing exothermic reaction. Appropriate selection of the type of calcium sulfate and its amount, the amount of calcium aluminate cement, and appropriate selection of alkali metal chemical activator and its amount are key and fundamental to reducing and minimizing the rate and amount of heat released due to the ensuing exothermic reaction.

Geopolymeric reaction of thermally activated aluminosilicate mineral such as fly ash proceeds at a very rapid rate and leads to extremely rapid gelation and setting of the material. Typically, when fly ash alone is reacted with an alkali metal chemical activator in accordance with the prior art, the gelation of the material starts within 2 to 3 minutes and the final set is reached in less than 10 minutes after the formation of an aqueous mixture. It has unexpectedly been found that thermally activated aluminosilicate mineral such as Class C fly ash, calcium aluminate cement, calcium sulfate, and alkali metal chemical activator interact synergistically with each other as part of the geopolymerization reaction of some embodiments of the invention to significantly increase the gelation time and final setting time of the resulting material. Appropriate selection of the type of calcium sulfate and its amount, the amount of calcium aluminate cement, and appropriate selection of alkali metal chemical activator and its amount are effective in prolonging the gelation rate and period and the final setting time of the resulting material. For a given amount of alkali metal activator in the composition, increase in calcium sulfate amount has been found to increase the gelation and final setting times of the resulting geopolymer cementitious compositions some embodiments of the invention. Additionally, for a given amount of alkali metal activator in the composition, increase in particle size of calcium sulfate has been found to increase the gelation and final setting times of the resulting geopolymer cementitious compositions of some embodiments of the invention. Furthermore, for a given particle size of calcium sulfate and amount of chemical activator in the composition, calcium sulfate dihydrate leads to highest increase in the gelation and final setting times, and anhydrous calcium sulfate leads to most rapid gelation and final setting times. For the geopolymer cementitious compositions of some embodiments of the invention, the gelation period ranges between 20 to 60 minutes, with final setting times of about 30 to about 120 minutes. The increased gelation and final setting times allow a longer open and working times for the geopolymer cementitious compositions of some embodiments of the invention.

Early age strength of the composition is characterized by measuring the compressive strength after about 3 to about 5 hours of curing. Relatively higher early age compressive strength can be an advantage for a cementitious material because it can withstand higher stresses without excessive deformation. Achieving high early strength allows for ease of handling and use of manufactured products. Further, due to the achievement of high early strength, the material and structures can be opened to traffic and allowed to support non-structural and structural loads at an early age. It will be understood by those skilled in the art that curing reactions continue for extended periods after the final setting time has been reached.

The geopolymer cementitious compositions of some embodiments of the invention are capable of developing extremely high early age and ultimate compressive strength. For example, the geopolymer cementitious compositions of some embodiments of the invention are capable of developing compressive strength after 1 to 4 hours of about 500 psi to about 4000 psi, about 1500 to about 5000 psi after 24 hours, and about 3,500 to about 10000 psi after 28 days.

The type of calcium sulfate has also been surprisingly found to have a very significant influence on the development of early age compressive strength 24 hour) of the geopolymer cementitious compositions of some embodiments of the invention. The highest increase in early age compressive strength results when anhydrous calcium sulfate (anhydrite) is used, followed by calcium sulfate hemihydrate, and that followed by calcium sulfate dihydrate.

In some embodiments, it has been found that a smaller particle size of calcium sulfate leads to a more rapid development in early age 24 hour) strength. When it is desirable to have an extremely rapid rate of strength development, the preferred average particle size of calcium sulfate is about 1 to about 30 microns, more preferably about 1 to about 20 microns, and still more preferably about 1 to about 10 microns.

Cementitious Reactive Mixture

The cementitious reactive mixture of some embodiments of the present invention comprise Reactive Powder Component A (also known herein as Cementitious Reactive Material) and Activator Component B with preferable ranges as shown in TABLE A. The Reactive Powder Component A comprises thermally activated aluminosilicate mineral, calcium aluminate cement, and calcium sulfate. The Activator Component B comprises alkali metal chemical activator.

Preferably, the cementitious reactive mixture contains about 10 to about 40 wt. % lime. However, this lime is does not have to be added lime. Rather it is sometimes included as a chemical component of the thermally activated aluminosilicate mineral.

In addition to the thermally activated aluminosilicate mineral, calcium aluminate cement, and calcium sulfate, the cementitious reactive powder may include about 0 to about 15 wt. % of optional cementitious additives such as Portland cement. However, preferably there is an absence of Portland cement as its incorporation increases the material shrinkage making the material less dimensionally stable.

Class C Fly Ash and Other Thermally Activated Aluminosilicate Mineral

The thermally activated aluminosilicate minerals are in some embodiments selected from a group consisting of fly ash, blast furnace slag, thermally activated clays, shales, metakaolin, zeolites, marl red mud, ground rock, and ground clay bricks. Preferably, they have $Al_2O_3$ content greater than about 5% by weight. Preferably clay or marl is used after thermal activation by heat treatment at temperatures of from about 600° to about 850° C. The preferred thermally activated aluminosilicate minerals of some embodiments of the invention have high lime (CaO) content in the composition, preferably greater than about 10 wt %, more preferably greater than about 15%, and still more preferably greater than about 20%. The most preferred thermally activated alumino-silicate mineral is Class C fly ash, for example, fly ash procured from coal-fired power plants. The fly ash also possesses pozzolanic properties.

ASTM C618 (2008) defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties."

Fly ash is the preferred thermally activated aluminosilicate mineral in the cementitious reactive powder blend of some embodiments of the invention. Fly ashes containing high calcium oxide and calcium aluminate content (such as Class C fly ashes of ASTM C618 (2008) standard are preferred as explained below.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 (2008) standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 (2008) standard differentiates Class F and Class C fly ashes primarily according to their pozzolanic properties. Accordingly, in the ASTM C618 (2008) standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 (2008) standard, Class C fly ashes preferably have high calcium oxide (lime) content.

Class C fly ash usually has cementitious properties in addition to pozzolanic properties due to free lime (calcium oxide). Class F is rarely cementitious when mixed with water alone. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results.

The thermally activated aluminosilicate mineral comprises Class C fly ash, preferably, about 50 to about 100 parts Class C fly ash per 100 parts thermally activated aluminosilicate mineral, more preferably the thermally activated aluminosilicate mineral comprises about 75 parts to about 100 parts Class C fly ash per 100 parts thermally activated aluminosilicate mineral.

Other types of fly ash, such as Class F fly ash, may also be employed. Preferably, at least about 50 wt. % of the thermally activated aluminosilicate mineral in the cementitious reactive powder is Class C fly ash with the remainder Class F fly ash or any other thermally activated aluminosilicate mineral. More preferably, about 55 to about 75 wt. % of the thermally activated aluminosilicate mineral in the cementitious reactive powder is Class C fly ash with the remainder Class F or any other thermally activated aluminosilicate mineral. Preferably the thermally activated aluminosilicate mineral is about 90 to about 100% Class C fly ash, for example 100% Class C Fly ash.

The average particle size of the thermally activated alumino-silicate minerals of some embodiments of the invention is preferably less than about 100 microns, preferably less than about 50 microns, more preferably less than about 25 microns, and still more preferably less that about 15 microns.

Preferably the mixture composition of some embodiments of the invention has at most about 5 parts metakaolin per 100 parts thermally activated aluminosilicate mineral. Preferably, the compositions of some embodiments of the invention has an absence of metakaolin. Presence of metakaolin has been found to increase the water demand of the mixtures hence its use is not desirable in the geopolymer compositions of some embodiments of the invention.

Minerals often found in fly ash are quartz ($SiO_2$), mullite ($Al_2Si_2O_{13}$), gehlenite ($Ca_2Al_2SiO_7$), haematite ($Fe_2O_3$), magnetite ($Fe_3O_4$), among others. In addition, aluminum silicate polymorphs minerals commonly found in rocks such as sillimanite, kyanite and andalusite all three represented by molecular formula of $Al_2SiO_5$ are also often found in fly ash.

Fly ash can also include calcium sulfate or another source of sulfate ions which will be in the mixture composition of some embodiments of the invention.

The fineness of the fly ash is preferably such that less than about 34% is retained on a 325 mesh sieve (U.S. Series) as tested on ASTM Test Procedure C-311 (2011) ("Sampling and Testing Procedures for Fly Ash as Mineral Admixture for Portland Cement Concrete"). The average particle size of the fly ash materials of some embodiments of the invention is preferably less than about 50 microns, preferably less than about 35 microns, more preferably less than about 25 microns, and still more preferably less than about 15 microns. This fly ash is preferably recovered and used dry because of its self-setting nature.

Class C fly ash made from sub-bituminous coal has the following representative composition listed in TABLE E. This fly ash is preferably recovered and used dry because of its self-setting nature.

TABLE E

| An example of suitable Class C fly ash | |
|---|---|
| Component | Proportion (wt. %) |
| $SiO_2$ | 20-45 |
| $Al_2O_2$ | 10-30 |
| $Fe_2O_3$ | 3-15 |
| MgO | 0.5-8 |
| $SO_3$ | 0.5-5 |
| CaO | 15-60 |
| $K_2O$ | 0.1-4 |
| $Na_2O$ | 0.5-6 |
| Loss on Ignition | 0-5 |

A preferable suitable Class F fly ash has the following composition listed in TABLE F.

TABLE F

| An example of suitable Class F fly ash | |
|---|---|
| Component | Proportion (wt. %) |
| $SiO_2$ | 50-70 |
| $Al_2O_2$ | 10-40 |
| $Fe_2O_3$ | 1-10 |
| MgO | 0.5-3 |
| $SO_3$ | 0-4 |
| CaO | 0-10 |
| $K_2O$ | 0.1-4 |
| $Na_2O$ | 0.1-6 |
| Loss on Ignition | 0-5 |

Hydraulic Cements

Hydraulic cements for purposes of this invention is a cement that undergoes a chemical setting reaction when it comes in contact with water (hydration) and which will not only set (cure) under water but also forms a water-resistant product.

Hydraulic cements include, but are not limited to, aluminum silicate cements like Portland cement, calcium aluminate cement, calcium sulfoaluminate cement, and calcium fluoroaluminate cements.

Calcium Aluminate Cement

Calcium aluminate cement (CAC) is a hydraulic cement that forms a component of the reactive powder blend of embodiments of the invention.

Calcium aluminate cement (CAC) is also commonly referred to as aluminous cement or high alumina cement. Calcium aluminate cements have a high alumina content, about 30-45 wt % is preferably. Higher purity calcium aluminate cements are also commercially available in which the alumina content can range as high as about 80 wt %. These higher purity calcium aluminate cements tend to be relatively more expensive. The calcium aluminate cements used in the compositions of some embodiments of the invention are finely ground to facilitate entry of the aluminates into the aqueous phase so that rapid formation of ettringite and other calcium aluminate hydrates can take place. The surface area of the calcium aluminate cement that may is useful in some embodiments of the composition of the invention is greater than about 3,000 cm$^2$/gram and preferably about 4,000 to 6,000 cm$^2$/gram as measured by the Blaine surface area method (ASTM C 204).

Several manufacturing methods have emerged to produce calcium aluminate cement worldwide. Typically, the main raw materials used in the manufacturing of calcium aluminate cement are bauxite and limestone. One manufacturing method that has been used in the US for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Several calcium aluminate compounds are formed during the manufacturing process of calcium aluminate cements. The predominant compound formed is monocalcium aluminate (CaO.Al$_2$O$_3$, also referred to as CA), in one type of calcium aluminate cement. In another type of calcium aluminate cement, 12CaO.7Al$_2$O$_3$ also referred to as C$_{12}$A$_7$ or dodeca calcium hepta aluminate is formed as the primary calcium aluminate reactive phase. The other calcium aluminate and calcium silicate compounds that are formed in the production of calcium aluminate cements include CaO.2Al$_2$O$_3$ also referred as CA$_2$ or calcium dialuminate, dicalcium silicate (2CaO.SiO$_2$, called C$_2$S), dicalcium alumina silicate (2CaO.Al$_2$O$_3$.SiO$_2$, called C$_2$AS). Several other compounds containing relatively high proportion of iron oxides are also formed. These include calcium ferrites such as CaO.Fe$_2$O$_3$ or CF and 2CaO.Fe$_2$O$_3$ or C$_2$F, and calcium alumino-ferrites such as tetracalcium aluminoferrite (4CaO.Al$_2$O$_3$.Fe$_2$O$_3$ or C$_4$AF), 6CaO.Al$_2$O$_3$.2Fe$_2$O$_3$ or C$_6$AF$_2$) and 6CaO.2Al$_2$O$_3$.Fe$_2$O$_3$ or C$_6$A$_2$F). Other minor constituents present in the calcium aluminate cement include magnesia (MgO), titanic (TiO$_2$), sulfates and alkalis. The preferred calcium aluminate cements useful of some embodiments of the invention can have one or more of the aforementioned phases. Calcium aluminate cements having monocalcium aluminate (CaO.Al$_2$O$_3$ or CA) and/or dodeca calcium hepta aluminate (12CaO.7Al$_2$O$_3$ or C$_{12}$A$_7$) as predominant phases are particulary preferred of some embodiments of the present invention. Further, the calcium aluminate phases can be available in crystalline form and/or amorphous form. Ciment Fondu (or HAC Fondu), Secar 51, and Secar 71 are some examples of commercially available calcium aluminate cements that have the monocalcium aluminate (CA) as the primary cement phase. Ternal EV is an example of commercially available calcium aluminate cement that has the dodeca calcium hepta aluminate (12CaO.7Al$_2$O$_3$ or C$_{12}$A$_7$) as the predominant cement phase.

Preferably compositions of some embodiments of the invention comprise about 1-200 parts by weight, preferably about 2 to 100 parts by weight, more preferably about 5-75 parts by weight, and still more preferably about 10-50 parts by weight calcium aluminate cement per 100 pbw of thermally activated aluminosilicate mineral.

Calcium Sulfoaluminate (CSA) Cements

Calcium sulfoaluminate (CSA) cements may be optionally used of some embodiments of the present invention. CSA cements are a different class of cements from calcium aluminate cement (CAC) or calcium silicate based hydraulic cements, for example, Portland cement. CSA cements are hydraulic cements based on calcium sulphoaluminate, rather than calcium aluminates which are the basis of CAC cement or calcium silicates which are the basis of Portland cement. Calcium sulfoaluminate cements are made from clinkers that include Ye'elimite (Ca$_4$(AlO$_2$)$_6$SO$_4$ or C$_4$A$_3$Š) as a primary phase. Other major phases present in the sulfo may include one or more of the following: dicalcium silicate (C$_2$S), tetracalcium aluminoferrite (C$_4$AF), and calcium sulfate (CŠ). The relatively low lime requirement of calcium sulfoaluminate cements compared to Portland cement reduces energy consumption and emission of green house gases from cement production. In fact, calcium sulfoaluminate cements can be manufactured at temperatures approximately 200° C. lower than Portland cement, thus further reducing energy and green house gas emissions. The amount of Ye'elimite phase (Ca$_4$(AlO$_2$)$_6$SO$_4$ or C$_4$A$_3$Š) present in the calcium sulfoaluminate cements useful in some embodiments of this invention is preferably about 20 to about 90 wt % and more preferably 30 to 75 wt %. When calcium sulfoaluminate (CSA) cements are used in the present invention, they may partially substitute calcium aluminate cement. The amount of calcium sulfoaluminate cement substitution in the composition of some embodiments of the invention can be up to about 49 wt % of the aggregated weight of calcium aluminate cement and calcium sulfoaluminate cement.

Portland Cement

The compositions of some embodiments of the invention may have about 0 to about 15 parts by weight total Portland cement relative to 100 parts by weight fly ash.

The low cost and widespread availability of the limestone, shales, and other naturally occurring materials make Portland cement one of the lowest-cost materials widely used over the last century throughout the world. As used herein, "Portland cement" is a calcium silicate based hydraulic cement. ASTM C 150 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." As used herein, "clinkers" are nodules (diameters, about 0.2-about 1.0 inch [5-25 mm]) of a sintered material that are produced when a raw mixture of predetermined composition is heated to high temperature.

However, very surprisingly, it has been discovered that addition of Portland cement to the dimensionally stable compositions of the present invention comprising aluminosilicate mineral, alkali metal chemical activator, calcium aluminate cement and calcium sulfate has a negative influence on the shrinkage behavior of resulting compositions. It has been found that addition of Portland cement to the geopolymer compositions of the present invention increases the shrinkage of the resulting compositions. The magnitude of observed shrinkage increases with increase in the amount of Portland cement in the resulting compositions.

This result is highly unexpected and surprising and it underscores the extremely complex nature of chemical interactions that occur when other types of cements and/or chemical additives are introduced to the dimensionally stable geopolymer binder compositions of the present invention. Based on this understanding, no Portland cement is incorporated in some preferred embodiments of the invention. However, it is contemplated that some amount of Portland cement be used in some embodiments when desired in situations where some increase in shrinkage behavior may be acceptable. The practical limit of amount of Portland cement will depend on the amount of adverse effect on shrinkage behavior that may be acceptable, but in some preferred embodiments of the invention, no more than 15 parts by weight of Portland cement per 100 parts by weight of the thermally activated aluminosilicate mineral is included.

Calcium Fluoroaluminate

Calcium Fluoroaluminate has the chemical formula $3CaO.3Al_2O_3.CaF_2$. The calcium Fluoroaluminate is often produced by mixing lime, bauxite and fluorspar in such an amount that the mineral of the resulting product becomes $3CaO.3Al_2O_3.CaF_2$ and burning the resulting mixture at a temperature of about 1,200°-1,400° C. Calcium fluoroaluminiate cements may optionally be used in the present invention.

Calcium Sulfate

Calcium sulfate forms an ingredient of the geopolymer compositions of some embodiments of the invention. Although calcium sulfate e.g. calcium sulfate dihydrate will react with water, it does not form a water resistant product and it is not considered to be hydraulic cement for purposes of this invention. Calcium sulfate types that are useful of some embodiments of the invention include calcium sulfate dihydrate, calcium sulfate hemihydrate and anhydrous calcium sulfate (anhydrite). These calcium sulfates may be available naturally or produced industrially. Calcium sulfates synergistically interact with the other fundamental components of the cementitious compositions of some embodiments of the invention and thereby help to minimize material shrinkage while imparting other useful properties to the final material.

Different morphological forms of calcium sulfate can be usefully employed in various embodiments of the present invention. The properties of the geopolymer compositions and composites of some embodiments of the invention have been found to depend significantly on the type of calcium sulfate used based on its chemical composition, particle size, crystal morphology, and chemical and thermal treatment. Amongst other properties, the setting behavior, rate of strength development, ultimate compressive strength, shrinkage behavior, and cracking resistance of the geopolymer compositions of some embodiments of the invention can be tailored by selecting a proper source of calcium sulfate in the formulation. Thus, the selection of the type of calcium sulfate used of some embodiments of the invention is based on the balance of properties sought in the end application.

In the geopolymer compositions of some embodiments of the invention, a blend of two or more types of calcium sulfate is employed. When such a blend is used, the types of calcium sulfate utilized can vary depending upon their chemical composition, particle size, crystal shape and morphology, and/or surface treatment.

Particle size and morphology of calcium sulfate have been found to significantly influence the development of early age and ultimate strengths of the geopolymer cementitious compositions of some embodiments of the invention. In general, a smaller particle size of calcium sulfate has been found to provide a more rapid development in early age strength. When it is desirable to have an extremely rapid rate of strength development, the preferred average particle size of calcium sulfate ranges is about 1 to about 100 microns, more preferably about 1 to about 50 microns, and still more preferably about 1 to about 20 microns. Furthermore, calcium sulfates with finer particle size have also been found to result in lower material shrinkage of some embodiments.

It has further been found that for a given amount of calcium aluminate cement and other raw material components present, an increase (but not excessive increase) in the amount of calcium sulfate leads to increase in the early age compressive strength of the geopolymer compositions of some embodiments of the invention. The most dramatic increase in the early age compressive strength results when the calcium sulfate amount is about 10 to about 50% by weight of calcium aluminate cement.

All three forms of calcium sulfate (primarily hemihydrate, dihydrate and anhydrite) are useful in the four-reactive-component mixtures of some embodiments of the invention to afford the benefits of longer setting times and higher compressive strengths than Comparative Examples 1-4 below. The three different calcium sulfate forms have been found to have different and surprising effects relative to each other on setting times and compressive strengths in various embodiments of the invention.

It is well known that the most soluble form of calcium sulfate is the hemihydrate, followed by the relatively lower solubility form of the dihydrate, and then followed by the relatively insoluble form of the anhydrite. All three forms are themselves known to set (form matrices of the dihydrate chemical form) in aqueous media under appropriate conditions, and the setting times and compressive strengths of the set forms are known to follow their order of solubility. For example, all other things being equal, employed alone as the sole setting material, the hemihydrate usually has the shortest set times and the anhydrite the longest set times (typically very long set times).

Quite surprisingly, it has been found that embodiments employing predominately or all calcium sulfate hemihydrate have the longest set times, while those employing predominately or all calcium sulfate anhydrite have the shortest set times. Similarly surprisingly, in various embodiments, it has been found that those employing predominately or all calcium sulfate anhydrite have greater early compressive strengths than those employing the primarily dihydrate form. The embodiments using primarily the hemihydrate form have early compressive strength similar to those using primarily the anhydrite form.

In the geopolymer compositions of other embodiments, a blend of two or more types of calcium sulfate also may be employed to modify the set times and early compressive strength properties of the composition relative to those embodiments using prodiminately or all of a single type of calcium sulfate. When such a blend is used, the types of calcium sulfate utilized may vary depending upon their chemical composition, particle size, crystal shape and morphology, and/or surface treatment.

Particle size and morphology of calcium sulfate used have been found to significantly influence the development of early age and ultimate strengths of the geopolymer cementitious binder compositions of some embodiments of the invention. In general, a smaller particle size of calcium sulfate has been found to provide a more rapid development in early age strength. When it is desirable to have an extremely rapid rate of strength development, the preferred average particle size of calcium sulfate ranges from about 1 to about 100 microns, more preferably from about 1 to about 50 microns, and most preferably from about 1 to about 20 microns. Furthermore, calcium sulfates with finer particle size have also been found to reduce material shrinkage.

It has further been found that for a given amount of calcium aluminate cement and other raw material components present, an increase (but not excessive increase) in the amount of calcium sulfate leads to increase in the early age compressive strength of the geopolymer binders of some embodiments of the present invention. The most dramatic increase in the early age compressive strength results when the calcium sulfate amount is about 10 to about 50% by weight of calcium aluminate cement.

It has also been unexpectedly found the amount of calcium sulfate present in proportion to calcium aluminate cement in the mixture has a significant influence on the degree of material shrinkage of geopolymer compositions of some embodiments of the invention. Preferably, those embodiments have a calcium sulfate amount of about 5 to about 200 parts by weight relative to 100 parts by weight of calcium aluminate cement. For most effective control on material shrinkage of the geopolymer compositions in such embodiments, the amount of calcium sulfate is about 10 to about 100 parts by weight relative to 100 parts by weight of calcium aluminate cement, more preferably about 15 to about 75 parts by weight relative to 100 parts by weight of calcium aluminate cement, and most preferably about 20 to about 50 parts by weight relative to 100 parts by weight of calcium aluminate cement.

For given amounts of alkali metal activator and other raw material components in the composition of some embodiments of the invention, usage of calcium sulfate dihydrate has been found to provide the most effective control in minimizing the material shrinkage. Usage of anhydrous calcium sulfate (anhydrite) and calcium sulfate hemihydrate also provide excellent control in lowering the material shrinkage of the geopolymer cementitious binder compositions of such embodiments.

The selection of the type or types of calcium sulfate employed in the compositions of such embodiments is based on the desired rate of early age strength development, shrinkage control, and balance of other properties sought in the end application.

The type of calcium sulfate has also been found to have a very significant influence on the development of early age compressive strength 24 hour) of the geopolymer compositions of some embodiments of the invention. The highest increase in early age compressive strength results when anhydrous calcium sulfate (anhydrite) is used, followed by calcium sulfate hemihydrate, followed by calcium sulfate dihydrate. The selection of the type of calcium sulfate used of some composition of some embodiments of the invention is based on the desired rate of early age strength development, shrinkage control, and balance of other properties sought in the end application.

A part or the entire amount of calcium sulfate may be added as an additive component of the calcium aluminate cement in the compositions of some embodiments of the invention. When this is the case, the amount of calcium sulfate added separately in the composition is reduced by an equivalent amount included in the calcium aluminate cement.

Calcium sulfate may also be included in the fly ash in some embodiments of the composition. When such is the case, the amount of calcium sulfate added separately in the composition may be reduced. The amount of calcium sulfate added separately to the compositions of some embodiments of the invention may be adjusted based on the availability of the sulfate ions contributed by other ingredients present in the mixture. For enhanced durability of the geopolymer compositions of some embodiments of the invention, it is desirable to keep the calcium sulfate content at relatively low levels. Excess calcium sulfate or other sulfate ions in the mixture can lead to chemical distress due to material expansion caused by precipitation and hydration of the salts present in the material.

Pozzolans

Other optional silicate and aluminosilicate minerals which are pozzolans possessing substantial, little, or no cementing properties on their own in an aqueous media can be included as optional mineral additives in the compositions of some embodiments of the invention. Various natural and man-made materials have been referred to as pozzolanic materials possessing pozzolanic properties. Some examples of pozzolanic materials include silica fume, pumice, perlite, diatomaceous earth, finely ground clay, finely ground shale, finely ground slate, finely ground glass, volcanic tuff, trass, and rice husk. All of these pozzolanic materials can be used either singly or in combined form as part of the cementitious reactive powder of some embodiments of the invention.

Fillers-Aggregates, Inorganic Mineral Fillers and Lightweight Fillers

While the disclosed cementitious reactive powder blend defines the rapid setting component of the cementitious composition of some embodiments of the invention, it will be understood by those skilled in the art that other materials may be included in the composition depending on its intended use and application.

One or more fillers such as sand, fine aggregate, coarse aggregate, inorganic mineral fillers, lightweight fillers may be used as a component in the geopolymeric formulations of some embodiments of the invention. These fillers are preferably not pozzolans or thermally activated aluminosilicate minerals.

Preferably inorganic mineral fillers are dolomite, limestone, calcium carbonate, ground clay, shale, slate, mica and talc. Generally they have a fine particle size with preferably average particle diameter of less than about 100 microns, preferably less than about 50 microns, and more preferably less than about 25 microns in the compositions of some embodiments of the invention. Smectite clays and palygorskite and their mixtures are not considered inorganic mineral fillers in this invention.

Fine aggregate or sand is defined as an inorganic rock material with an average particle size of less than about 4.75 mm (0.195 inches).

Preferable sand in the invention has a mean particle size of 0.1 mm to about 2 mm. Fine sand with a mean particle size of about 1 mm or less is preferred filler in some embodiments of this invention. Sand having a maximum particle diameter of about 0.6 mm, preferably at most about 0.425 mm, a mean particle diameter within a range of about 0.1 to about 0.5 mm, preferably about 0.1 mm to about 0.3 mm are useful in other embodiments of the invention. Examples of preferable fine sand include QUIKRETE FINE No. 1961 and UNIMIN 5030 having a predominant size range of US sieve number #70-#30 (0.2-0.6 mm).

The particle size distribution and amount of sand in the formulation assists in controlling the rheological behavior of the cementitious compositions of some embodiments of the invention. Fine sand may be added in the geopolymeric cementitious compositions of some embodiments of the invention at sand/cementitious materials (reactive powder) ratio of about 0.05 to about 4. When it is desired to achieve self-leveling material rheology, the most desirable sand to cementitious materials ratio in the formulation is about 0.50 to about 2, more preferably about 0.75 to about 1.5.

Coarse aggregate is defined as an inorganic rock material with an average particle size at least 4.75 mm (0.195 inches), for example ¼" to 1½ in." (0.64 to 3.81 cm). Aggregate with size larger than 1½" (3.81 cm) may also be used in some applications for example concrete pavement. The particle shape and texture of the coarse aggregate used can be angular, rough-textured, elongated, rounded or smooth or a combination of these. Preferably coarse aggregate are made of minerals such as granite, basalt, quartz, riolite, andesite, tuff, pumice, limestone, dolomite, sandstone, marble, chert, flint, greywacke, slate, and/or gnessis.

Coarse aggregate useful in some embodiments of the invention preferably meet the specifications set out in ASTM C33 (2011) and AASHTO M6/M80 (2008) standards.

When coarse aggregate are added in the geopolymeric cementitious compositions of some embodiments of the invention, they are preferably employed at an aggregate to cementitious materials (reactive powder) ratio of about 0.25 to about 5. Some embodiments of the invention contain coarse aggregate with coarse aggregate to cementitious materials ratio of about 0.25 to about 1. Some other embodiments of the invention contain coarse aggregate with coarse aggregate to cementitious materials ratio of about 1 to about 3.

Lightweight fillers have a specific gravity of less than about 1.5, preferably less than about 1, more preferably less than about 0.75, and still more preferably less than about 0.5. In some other preferred embodiments of the invention the specific gravity of lightweight fillers is less than about 0.3, more preferably less than about 0.2 and most preferably less than about 0.1. In contrast, inorganic mineral filler preferably has a specific gravity above about 2.0. Examples of useful lightweight fillers include pumice, vermiculite, expanded forms of clay, shale, slate and perlite, scoria, expanded slag, cinders, glass microspheres, synthetic ceramic microspheres, hollow ceramic microspheres, lightweight polystyrene beads, plastic hollow microspheres, expanded plastic beads, and the like. Expanded plastic beads and hollow plastic spheres when used in the composition of some embodiments of the invention are employed in very small quantity on a weight basis owing to their extremely low specific gravity.

When lightweight fillers are utilized to reduce the weight of the material, they may be employed at a filler to cementitious materials (reactive powder) ratio of about 0.01 to about 2, preferably about 0.01 to about 1. A combination of two or more types of lightweight fillers useful in the geopolymer compositions of some embodiments of the invention.

While some embodiments of some embodiments of the invention contain only sand as the added filler, other embodiments can contain sand and inorganic mineral fillers and/or lightweight filler. Other embodiments can contain inorganic mineral filler and lightweight fillers as the added fillers. Some other embodiments of the invention contain sand, inorganic mineral filler and lightweight filler as the added fillers. Some other embodiments of the invention contain only inorganic mineral fillers or lightweight fillers and no sand, fine aggregate or coarse aggregate. Some embodiments of the invention containing coarse aggregate can include or exclude one of more of the following fillers—sand, lightweight filler, and inorganic mineral filler.

Some embodiments of the present invention are completely free of any added fillers.

Alkali Metal Chemical Activators

In some embodiments of the invention, alkali metal salts and bases are useful as chemical activators to activate the Reactive Powder Component A comprising thermally activated aluminosilicate mineral such as fly ash, calcium aluminate cement, and calcium sulfate. The alkali metal activators some embodiments of this invention can be added in liquid or solid form. The preferred alkali metal chemical activators of some embodiments of this invention are metal salts of organic acids. The more preferred alkali metal chemical activators of some embodiments of this invention are alkali metal salts of carboxylic acids. Alkali metal hydroxides and alkali metal silicates are some other examples of alkali metal chemical activator of some embodiments of this invention. Alternatively, alkali metal hydroxides and alkali metal silicates can also be used in combination with carboxylic acids such as citric acid to provide chemical activation of reactive powder blend comprising thermally activated aluminosilicate mineral, calcium aluminate cement, and calcium sulfate.

In some embodiments of the present invention, employing alkali metal salts of citric acid such as sodium or potassium citrate in combination with the reactive powder blend comprising thermally activated aluminosilicate mineral comprising Class C fly ash, calcium aluminate cement, and calcium sulfate, provides mixture compositions with relatively good fluidity and which do not stiffen too quickly, after mixing the raw materials at or around ambient temperatures (about 20-25° C.).

The amount of alkali metal salt of citric acid, e.g. potassium citrate or sodium citrates, is about 0.5 to about 10 wt. %, preferably about 1.0 to about 6 wt. %, preferably about 1.25 to about 4 wt. %, more preferably about 1.5 to about 2.5 wt. % and still more preferably about 2 wt % based on 100 parts of the cementitious reactive components (i.e., Reactive Powder Component A) of some embodiments of the invention. Thus, for example, for 100 pounds of cementitious reactive powder, there may be about 1.25 to about 4 total pounds of potassium and/or sodium citrates. The preferred alkali metal citrates are potassium citrates and sodium citrates and particularly tri-potassium citrate monohydrate, and tri-sodium citrate anhydrous, tri-sodium citrate monohydrate, sodium citrate dibasic sesquihydrate, tri-sodium citrate dihydrate, di-sodium citrate, and mono-sodium citrate.

Preferably the activator does not contain an alkanolamine. Also, preferably the activator does not contain a phosphate.

Set Retarders

Organic compounds such as hydroxylated carboxylic acids, carbohydrates, sugars, and starches are the preferred retarders of some embodiments of the invention. Organic acids such as citric acid, tartaric acid, malic acid, gluconic acid, succinic acid, glycolic acid, malonic acid, butyric acid, malic acid, fumaric acid, formic acid, glutamic acid, pentanoic acid, glutaric acid, gluconic acid, tartronic acid, mucic acid, tridydroxy benzoic acid, etc. are useful as set retarders in the dimensionally stable geopolymer cementitious compositions of some embodiments of the invention. Sodium gluconate is also useful as an organic set retarder in some embodiments of in the present invention. Cellulose based organic polymers such as hydroxyethyl-cellulose (HEC), hydroxypropyl-cellulose (HPC), hydroxypropylmethyl-cellulose (HPMC), ethyl-cellulose (EC), methylethyl-cellulose (MEC), carboxymethyl-cellulose (CMC), carboxymethylethyl-cellulose (CMEC), carboxymethylhydroxyethyl-cellulose (CMHEC) are also useful as retarders in the compositions of some embodiments of the present invention. These cellulose based retarders when added to the compostion of some embodiments of the invention also significantly increase the viscosity of the mix in addition to causing retardation. Preferably inorganic acid based retarders of the type borates or boric acid are not employed in compositions of the present invention because they have been found to hinder mix rheology, cause excessive efflorescence, and reduce material bond strength to other substrates.

Other Optional Set-Control Agents

Other optional set control chemical additives include a sodium carbonate, potassium carbonate, calcium nitrate, calcium nitrite, calcium formate, calcium acetate, calcium chloride, lithium carbonate, lithium nitrate, lithium nitrite, aluminum sulfate, sodium aluminate, alkanolamines, polyphosphates, and the like. These additives when included as a part of the formulation may also influence rheology of the geopolymer compositions of some embodiments of the invention in addition to affecting their setting behavior.

Optional Materials, Fibers, and Scrims

Other optional materials and additives may be included in geopolymer compositions of some embodiments of the invention. These include at least one member selected from the group consisting of film-forming redispersible polymer powders, film-forming polymer latex dispersions, defoaming and antifoaming agents, water retaining additives, set control agents, shrinkage reducing admixtures, foaming and air entraining agents, organic and inorganic rheology control agents, viscosity modifying agents (thickeners), efflorescence control (suppression) agents, corrosion control agents, wetting agents, colorants and/or pigments, discrete fibers, long and continuous fibers and reinforcement, textile reinforcement, polyvinyl alcohol fibers, and/or glass fibers and or other discrete reinforcing fibers.

Discrete reinforcing fibers of different types may also be included in the geopolymer compositions of some embodiments of the invention. Scrims made of materials such as polymer-coated glass fibers and polymeric materials such as polypropylene, polyethylene and nylon can be used to reinforce the cement-based precast products depending upon their function and application.

Preferably the geopolymer compositions of embodiments of the invention has an absence of cement kiln dust. Cement kiln dust (CKD) is created in the kiln during the production of cement clinker. The dust is a particulate mixture of partially calcined and unreacted raw feed, clinker dust and ash, enriched with alkali sulfates, halides and other volatiles. These particulates are captured by the exhaust gases and collected in particulate matter control devices such as cyclones, bag houses and electrostatic precipitators. CKD consists primarily of calcium carbonate and silicon dioxide which is similar to the cement kiln raw feed, but the amount of alkalies, chloride and sulfate is usually considerably higher in the dust. CKD from three different types of operations: long-wet, long-dry, and alkali by-pass with precalcined have various chemical and physical traits. CKD generated from long-wet and long-dry kilns is composed of partially calcined kiln feed fines enriched with alkali sulfates and chlorides. The dust collected from the alkali by-pass of precalcined kilns tend to be coarser, more calcined, and also concentrated with alkali volatiles. However, the alkali by-pass process contains the highest amount by weight of calcium oxide and lowest loss on ignition (LOI). TABLE AA from Adaska et al., Beneficial Uses of Cement Kiln Dust, presented at 2008 IEEE/PCA 50th Cement Industry Technical Conf., Miami, Fla., May 19-22, 2008, provides the composition breakdown for the three different types of operation and includes a preferably chemical composition for Type I portland cement for comparison.

TABLE G

Composition of CKD from Different Operation Sources

| Constituent | Long-wet kiln (% by weight) | Long-dry kiln (% by weight) | Alkali by-pass from preheater/ precalciner (% by weight) | Preferably Type I portland cement (% by weight) |
|---|---|---|---|---|
| $SiO_2$ | 15.02 | 9.64 | 15.23 | 20.5 |
| $AL_2O_3$ | 3.85 | 3.39 | 3.07 | 5.4 |
| $Fe_2O_3$ | 1.88 | 1.10 | 2.00 | 2.6 |
| CaO | 41.01 | 44.91 | 61.28 | 63.9 |
| MgO | 1.47 | 1.29 | 2.13 | 2.1 |
| $SO_3$ | 6.27 | 6.74 | 8.67 | 3.0 |
| $K_2O$ | 2.57 | 2.40 | 2.51 | <1 |
| Loss on Ignition (LOI) | 25.78 | 30.24 | 4.48 | 0-3 |
| Free lime (CaO) | 0.85 | 0.52 | 27.18 | <2 |

Superplasticizers and Air Entraining Agents

Water reducing agents (superplasticizers), are preferably used in the compositions of some embodiments of the invention. They may be added in the dry form or in the form of a solution. Superplasticizers help to reduce water demand of the mixture. Examples of superplasticizers include polynapthalene sulfonates, polyacrylates, polycarboxylates, polyether polycarboxylates, lignosulfonates, melamine sulfonates, caseins, and the like. Depending upon the type of superplasticizer used, the weight ratio of the superplasticizer (on dry powder basis) to the reactive powder blend preferably will be about 5 wt % or less, preferably about 2 wt. % or less, preferably about 0.1 to about 1 wt. %.

Superplasticizers based on polycarboxylate polyether chemistry are the most preferred water reducing chemical admixture of the geopolymeric cementitious compositions of some embodiments of the invention. Polycarboxylate polyether superplasticizers are the most preferred since they facilitate accomplishment of the various objectives of this invention as mentioned earlier.

Air entraining agents are added to the cementitious slurry of some embodiments of the invention to form air bubbles (foam) in situ. Air entraining agents are preferably surfactants used to purposely trap microscopic air bubbles in the concrete. Alternatively, air entraining agents are employed to externally produce foam which is introduced into the mixtures of the compositions of some embodiments of the invention during the mixing operation to reduce the density of the product. Preferably to externally produce foam the air entraining agent (also known as a liquid foaming agent), air and water are mixed to form foam in a suitable foam generating apparatus. A foam stabilizing agent such as polyvinyl alcohol can be added to the foam before the foam is added to the cementitious slurry.

Examples of air entraining/foaming agents include alkyl sulfonates, alkylbenzolfulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl) ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Preferably the air entraining (foaming) agent is about 0.01 to about 1 wt. % of the weight of the overall cementitious composition.

Bio-Polymers and Organic Rheology Control Agents

Succinoglycans, diutan gum, guar gum, wellan gum, xanthan gums and cellulose ether based organic compounds, are bio-polymers that act as hydrocolloids and rheology control agents in some embodiments of the present invention. Synthetic organic polymers such as polyacryl amides, alkali-swellable acrylic polymers, associative acrylic polymers, acrylic/acrylamid copolymers, hydrophobically modified alkali-swellable polymers, highly water-swellable organic polymers can be usefully employed as rheology control agents and thickeners in the geopolymer compositions of some embodiments of the invention.

Both associative and non-associative types of rheology control agents and thickeners can be usefully employed in the geopolymer compositions of some embodiments of the invention.

Examples of cellulose based organic polymers useful for rheology control in the geopolymer compositions of some embodiments of the present invention include hydroxyethyl-cellulose (HEC), hydroxypropyl-cellulose (HPC), hydroxypropylmethyl-cellulose (HPMC), ethyl-cellulose (EC), methylethyl-cellulose (MEC), carboxymethyl-cellulose (CMC), carboxymethylethyl-cellulose (CMEC), and carboxymethylhydroxyethyl-cellulose (CMHEC).

The organic rheology control agents and thickeners mentioned above are soluble both in cold and hot water. These additives also act as water retention agents and thereby minimize material segregation and bleeding in addition to controlling the material rheology.

Inorganic Rheology Control Agents

The geopolymer cementitious compositions of some embodiments of the invention may also include inorganic rheology control agents belonging to the family of phyllosilicates. Examples of inorganic rheology control agents particularly useful in the geopolymer compositions of invention include palygorskite, sepiolite, smectites, kaolinites, and illite. Particularly useful smectite clays in some embodiments of the present invention include hectorite, saponite, and montmorillonite. Different varieties of bentonite clays both natural and chemically treated may also be used to control rheology of the compositions of the present invention. These additives also act as water retention agents and thereby minimize material segregation and bleeding. The inorganic rheology control agents may be added in the absence of or in combination with the organic rheology control agents in some embodiments of the present invention.

Film-Forming Polymer Additives

Preferably film forming redispersible polymer powders in some embodiments of are latex powders. These polymer powders are water-redispersible and produced by spray-drying of aqueous polymer dispersions (latex).

Latex is an emulsion polymer. Latex is a water based polymer dispersion, widely used in industrial applications. Latex is a stable dispersion (colloidal emulsion) of polymer microparticles in an aqueous medium. Thus, it is a suspension/dispersion of rubber or plastic polymer microparticles in water. Latexes may be natural or synthetic.

The latex is preferably made from a pure acrylic, a styrene rubber, a styrene butadiene rubber, a styrene acrylic, a vinyl acrylic or an acrylated ethylene vinyl acetate copolymer and is more preferably a pure acrylic. Preferably latex polymer is derived from at least one acrylic monomer selected from the group consisting of acrylic acid, acrylic acid esters, methacrylic acid, and methacrylic acid esters. For example, the monomers preferably employed in emulsion polymerization include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamid, butadiene, ethylene, vinyl chloride and the like, and mixtures thereof. For example, a latex polymer can be a butyl acrylate/methyl methacrylate copolymer or a 2-ethylhexyl acrylate/methyl methacrylate copolymer. Preferably, the latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

Efflorescence Suppression Agent

Water repelling agents such as silanes, silicones, siloxanes, stearates are added to the cementitious compositions of some embodiments of the invention to reduce efflorescence potential of the material. Selected examples of useful efflorescence suppression agents include octyltriethoxy silane, potassium methyl siliconate, calcium stearate, butyl stearate, polymer stearates. These efflorescence control agents reduce the transport of the water within the hardened material and thereby minimize migration of salts and other soluble chemicals that can potentially cause efflorescence. Excessive efflorescence can lead to poor aesthetics, material disruption and damage from expansive reactions occurring due to salt accumulation and salt hydration, and reduction in bond strength with other substrates and surface coatings.

Defoaming Agents

Defoaming agents can be added to the geopolymer cementitious compositions of some embodiments of the invention to reduce the amount of entrapped air, increase material strength, increase material bond strength to other substrates, and to produce a defect free surface in applications where surface aesthetics is an important criteria. Examples of suitable defoaming agents useful in the geopolymer compositions of some embodiments of the invention include polyethylene oxides, polyetheramine, polyethylene glycol, polypropylene glycol, alkoxylates, polyalkoxylate, fatty alcohol alkoxylates, hydrophobic esters, tributyl phosphate, alkyl polyacrylates, silanes, silicones, polysiloxanes, polyether siloxanes, acetylenic diols, tetramethyl decynediol, secondary alcohol ethoxylates, silicone oil, hydrophobic silica, oils (mineral oil, vegetable oil, white oil), waxes (paraffin waxes, ester waxes, fatty alcohol waxes), amides, fatty acids, polyether derivatives of fatty acids, etc.

Initial Slurry Temperature

In some embodiments of the present invention, forming the slurry under conditions which provide a reduced initial mixture slurry temperature and rise of less than about 50° F. (28° C.) to a final compositions mixture slurry temperature, more preferably a rise of less than about 40° F. (22° C.) and more preferably a rise of less than about 30° F. (17° C.) for improved temperature stability and more importantly, slower gelation and final setting times of from about 10 to about 240 minutes, more preferably about 60 to about 120 minutes and more preferably about 30 to about 90 minutes, allows for more controlled working time for commercial use of the compositions of some embodiments of the invention. The initial slurry temperature is preferably about room temperature.

Increasing the initial temperature of the slurry increases the rate of temperature rise as the reactions proceed and reduces the setting time. Thus, initial slurry temperature of 95° F. (35° C.) to 105° F. (41.1° C.) used in preparing conventional fly ash based geopolymeric compositions for rapid gelation and setting times is preferably avoided since the composition formulation is designed to reduce temperature increase behavior of the mixed composition from the initial slurry temperatures. The benefit of the thermal stability obtained with some embodiments of the present invention for increasing the time for initial gelation and final setting times which, in turn, provides for increased commercially workability may be somewhat lessened if the initial slurry temperature is already relatively high.

The initial temperature is defined as the temperature of the overall mixture during the first minute after the cementitious reactive powder, activator, and water are first all present in the mixture. Of course the temperature of the overall mixture can vary during this first minute but in order to achieve preferred thermal stability it will preferably remain within an range initial temperature range of about 0 to about 50° C., preferably an initial temperature of about 10 to about 35° C., more preferably an initial temperature of about 15 to about 25° C., preferably ambient temperature.

Material Exothermic and Temperature Riser Behavior

Compositions of the present invention advantageously achieve moderate heat evolution and low temperature rise within the material during the curing stage. In such compositions of some embodiments of the invention, the maximum temperature rise occurring in the material is preferably less than about 50° F. (28° C.), more preferably less than about 40° F. (22° C.), and most preferably less than about 30° F. (17° C.). This prevents excessive thermal expansion and consequent cracking and disruption of material. This aspect becomes even more beneficial when the material is utilized in a manner where large thicknesses of material pours are involved in actual field applications. The geopolymer cementitious compositions of the present invention are beneficial in this particular aspect as they exhibit lower thermal expansion and enhanced resistance to thermal cracking in actual field applications.

EXAMPLES

In all the examples, unless otherwise indicated, calcium aluminate cement, knows as Ciment Fondu (also termed here as HAC Fondu), available from Kerneos Inc. was employed as a component of cementitious reactive powder. The oxide composition of calcium aluminate cement (Ciment Fondu) employed was as shown in TABLE AA:

TABLE AA

| Oxide | Weight % in Calcium Aluminate Cement | Weight % in Class C Fly Ash |
|---|---|---|
| CaO | 35.63 | 24.14 |
| SiO$_2$ | 4.35 | 36.90 |
| Al$_2$O$_3$ | 37.71 | 20.12 |
| Fe$_2$O$_3$ | 16.52 | 5.96 |
| SO$_3$ | 0.06 | 1.19 |
| MgO | 1.16 | 5.44 |
| Na$_2$O | 0.05 | 1.73 |
| K$_2$O | 0.06 | 0.52 |
| TiO$_2$ | 1.76 | 1.42 |
| MnO | 0.54 | |
| P$_2$O$_5$ | 0.47 | 1.18 |
| Loss on Ignition | 1.67 | 0.52 |

The main calcium aluminate phase present in the Ciment Fondu (HAC Fondu) in the examples was monocalcium aluminate (CA).

In all of the examples, unless otherwise indicated, the fly ash was Class C Fly Ash from Campbell Power Plant, West Olive, Mich. This fly ash had an average particle size of about 4 microns. The measured Blaine fineness of the fly ash was about 4300 cm$^2$/g. The oxide composition of the Class C fly ash used in these examples was as shown in TABLE AA.

The calcium sulfate used in some embodiments of the invention and in the examples has an average particle size of about 1-200 micros (micrometers) and preferably about 1-20 micros when fine-grained calcium sulfate is used.

In particular, the calcium sulfate dihydrate employed in the examples was a fine-grained calcium sulfate dihydrate, termed here as landplaster, available from United States Gypsum Company. The landplaster is a fine-grained calcium sulfate dihydrate with an average particle size of about 15 microns.

The anhydrous calcium sulfate (anhydrite) included in some of the examples was SNOW WHITE brand filler available from United States Gypsum Company. The USG SNOW WHITE filler is an insoluble form of anhydrite produced by high temperature thermal treatment of calcium sulfate, preferably gypsum. It has a very low level of chemically combined moisture, preferably around 0.35%. The average particle size of the USG SNOW WHITE filler is about 7 microns.

The calcium sulfate hemihydrate used in a number of the examples the examples was USG HYDROCAL C-Base brand calcium sulfate hemihydrate available from United States Gypsum Company. HYDROCAL C-Base is an alpha morphological form of calcium sulfate hemihydrate having blocky crystal microstructure and lower water demand. The USG HYDROCAL C-Base has an average particle size of about 17 microns.

Coarse-grained calcium sulfate dihydrate, otherwise identified here as coarse landplaster, employed in a number of the examples was procured from the USG Detroit Plant and is available from United States Gypsum Company as USG BEN FRANKLIN AG brand Coarse Gypsum. The USG BEN FRANKLIN AG brand gypsum is a coarse grained calcium sulfate dihydrate with an average particle size of about 75-80 microns.

The QUIKRETE Fine-grained No. 1961 Fine Sand and UNIMIN 5030 Sand used in some embodiments of the present invention and in some examples had a particle size as shown in TABLE BB:

TABLE BB

| Sieve Size | QUIKRETE Fine-grained No. 1961 Sand Percent Passing (%) | UNIMIN 5030 Sand Percent Passing (%) |
|---|---|---|
| 30 Mesh | 100 | |
| 40 Mesh | 98 | 100 |
| 50 Mesh | 69 | 73 |
| 70 Mesh | 23 | 22 |
| 100 Mesh | 5 | 4 |
| 140 Mesh | 1 | 0 |
| 200 Mesh | 0 | |

Potassium citrate or sodium citrate was the alkali citrate added to the cementitious compositions of some embodiments of the invention and acted as a chemical activator, rheology modifier, and set control agent.

The time of initial setting and the time of final setting reported in the following examples were measured using the ASTM C266 (2008) standard using the Gilmore needles.

The slump and flow behavior of the cementitious geopolymer compositions of some embodiments of this invention and some of the examples were characterized by a slump test. The slump test used in the following examples utilizes a hollow cylinder about 5.08 cm. (2 in.) In diameter and about 10.16 cm. (4 in.) in length held vertically with one open end resting on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. Compositions with good flow behavior yield a larger slump value. The flow of the slurry is characterized by rating the slurry flowability on a scale of 1 to 10 with a value of 1 representing a very poor flow behavior and a value of 10 representing excellent flow behavior.

Material shrinkage (also referred to herein as "shrinkage") as used herein is characterized by measuring the length change of prism specimen according to the ASTM C928 (2009) test standard. The initial length measurement is taken 4 hours after the individual raw material components including water are brought together. The final measurement is taken 8 weeks after the components including water were brought together. The difference between the initial and final measurements divided by the initial length times 100% gives the shrinkage as a percentage. The 1 in.×1 in. (cross-section) length change prism specimens also referred to herein as bars, are prepared according to the ASTM C157 (2008) standard.

Compressive strength of the material was measured in accordance to the ASTM C109 (2008) test method by testing the 2 in.×2 in.×2 in. cubes to failure under compression. The cubes demolded from the brass molds after hardening and cured in sealed plastic bags until the age of testing. The cubes were tested at the age of 4-hours, 24-hours, 7-days and 28-days after the cast.

The slurry temperature rise behavior of the material was measured in the semi-adiabatic condition by putting the slurry in an insulated container and recording the material temperature using a thermocouple.

Many of the examples show physical properties of the developed geopolymeric cementitious compositions of some embodiments of the invention comprising thermally activated aluminosilicate mineral (fly ash), calcium aluminate cement, calcium sulfate and alkali metal chemical activators. This studied the influence of incorporating calcium aluminate cement in combination with calcium sulfate and alkali metal chemical activator on the material early age and long-term shrinkage behavior (chemical and drying shrinkage), early age compressive strength, ultimate compressive strength, exothermal behavior and setting characteristics of the developed geopolymeric cementitious compositions of some embodiments of the invention.

Many of the examples show physical properties of the developed geopolymer cementitious compositions of some embodiments of the invention comprising thermally activated aluminosilicate mineral (fly ash), calcium aluminate cement, calcium sulfate and alkali metal chemical activators. This illustrates the influence of incorporating calcium aluminate cement in combination with calcium sulfate and alkali metal chemical activator on the material early age and long-term shrinkage behavior (chemical and drying shrinkage), early age compressive strength, ultimate compressive strength, exothermal behavior and setting characteristics of the developed geopolymer cementitious compositions of some embodiments of the invention.

Compositions of some embodiments of the present invention advantageously achieve moderate heat evolution and low temperature rise within the material during the curing stage. In such compositions, the maximum temperature rise occurring in the material is preferably less than about 50° F. (28° C.), more preferably less than about 40° F. (22° C.) and still more preferably less than about 30° F. (17° C.). This prevents excessive thermal expansion and consequent cracking and disruption of material. This aspect becomes even more beneficial when the material is utilized in a manner where large thicknesses of material pours are involved in the actual field applications. The geopolymer cementitious compositions of the present invention investigated as discussed below are beneficial in this particular aspect as they exhibit lower thermal expansion and enhanced resistance to thermal cracking in actual field applications.

The compositions of some embodiments of the invention also achieved sufficiently long setting times to provide good workability. An extremely short setting time is problematic for some applications as a short material working life (pot life) causes significant difficulties with processing of rapid setting material with the equipment and tools used in actual field application.

Example 1—Comparative Example of Current Geopolymeric Cementitious Compositions

The following examples illustrate the physical properties of current geopolymeric cementitious compositions comprising Class C fly ash and a potassium citrate. The test results show the shrinkage behavior, early age and ultimate compressive strength; and the setting behavior of the cementitious compositions shown in TABLE 1. All three mixes were activated with potassium citrate and contained varying amounts of sand aggregate. All three mixes has 100 parts by weight Fly Ash Class C and 100 parts by weight Total Cementitious Materials. All the cementitious material was Fly Ash Class C Campbell Power Plant, West Olive, Mich. and QUIKRETE Commercial Grade Fine Sand No. 1961.

TABLE 1

Current state-of-the-art geopolymeric compositions in Comparative Example 1

| Raw Material | Mix 1 | Mix 2 | Mix 3 |
|---|---|---|---|
| Fly Ash Class C (grams) | 3000 | 2200 | 1800 |
| Total Cementitious Materials (grams) | 3000 | 2200 | 1800 |
| Sand (grams) | 2250 | 3300 | 4500 |
| Water (grams) | 825 | 605 | 495 |
| Potassium Citrate (grams) | 120 | 88 | 72 |

TABLE 1-continued

Current state-of-the-art geopolymeric compositions in Comparative Example 1

| Raw Material | Mix 1 | Mix 2 | Mix 3 |
|---|---|---|---|
| Borax (grams) | 15 | 11 | 9 |
| Water/Cementitious Materials Ratio | 0.275 | 0.275 | 0.275 |
| Sand/Cementitious Materials Ratio | 0.750 | 1.500 | 2.500 |
| Potassium Citrate/Cementitious Materials, wt % | 4% | 4% | 4% |
| Borax Amount/Cementitious Materials, wt % | 0.5% | 0.5% | 0.5% |

FIG. 1A shows the shrinkage behavior of the current state-of-the art geopolymeric cementitious compositions investigated in Comparative Example 1.

The shrinkage measurements were initiated at an age of 4-hours from the time the raw materials were mixed together and cast. It can be observed that the fly ash compositions activated with an alkali citrate demonstrated extremely high amount of shrinkage. The measured maximum shrinkage was found to be as high as 0.75% after 8-weeks of curing at 75° F./50% RH. Increase in sand content decreased the extent of shrinkage but the overall shrinkage still remained very high at unacceptable levels. Such high levels of material shrinkage render the material unsatisfactory for most construction applications. It should be noted that for most construction applications, total magnitude of shrinkage in excess of 0.10% is considered to be extremely high and undesirable.

Initial Flow Behavior, Slump, and Early Age Cracking Behavior of Material

TABLE 2 shows the initial flow behavior and slump of the current state-of-the art geopolymeric cementitious compositions investigated in Comparative Example 1.

TABLE 2

Flow and Slump of Comparative Example 1

| | Flow | Slump (inches) |
|---|---|---|
| Mix 1 (sand/cementitious material = 0.75) | 10 | 9 |
| Mix 2 (sand/cementitious material = 1.5) | 8 | 7.5 |
| Mix 3 (sand/cementitious material = 2.5) | 2 | 2 |

The fly ash composition activated with an alkali citrate had a good flow behavior at sand/cement ratios of 0.75%. The slurry lost its fluidity to a small extent when the sand/cement ratio was increased to 1.50%. Finally, at a sand/cement ratio of 2.50, the mix became extremely stiff and had absolutely no flow characteristics.

FIG. 1B shows photograph of slump patty for Mix #1 investigated in Comparative Example 1. The slump patty developed significant cracking upon drying. The initiation of cracks in the patties occurred in less than 30 minutes of the slump test. The number of cracks and the size of cracks grew with subsequent material drying and hardening.

Time of Setting

TABLE 3 shows the setting behavior of the current state-of-the art geopolymeric cementitious compositions investigated in Comparative Example 1.

TABLE 3

Setting Times of Comparative Example 1

| | Initial Setting Time (hr:min) | Final Setting Time (hr:min) |
|---|---|---|
| Mix 1 | 0:15 | 0:16 |
| Mix 2 | 0:14 | 0:15 |
| Mix 3 | 0:7 | 0:10 |

The cementitious compositions in this Example had extremely rapid setting behavior. All mixes gelled up very quickly and lost flow behavior in less than 5 minutes after the raw materials were blended together to form of an aqueous slurry.

Compressive Strength

TABLE 4 shows the compressive strength behavior of the current state-of-the-art geopolymeric cementitious compositions investigated in Comparative Example 1. All fly ash compositions showed compressive strength development in excess of 7000 psi at 28-days.

TABLE 4

Compressive Strength of Comparative Example 1

| | 8 day (psi) | 28 day (psi) |
|---|---|---|
| Mix 1 (sand/cementitious material = 0.75) | 7215 | 9259 |
| Mix 2 (sand/cementitious material = 1.5) | 6950 | 8069 |
| Mix 3 (sand/cementitious material = 2.5) | 8138 | 7766 |

Example 2—Comparative Example

This example investigates early age dimensional stability and cracking resistance of the preferably current state-of-the art geopolymeric formulations comprising of cementitious compositions comprising fly ash and sodium citrate. TABLE 5 shows the raw material composition of the mixture composition investigated. The mixes were activated with potassium citrate and contained varying amounts of sand aggregate. The mixes had 100 parts by weight Fly Ash Class C and 100 parts by weight Total Cementitious Materials. In other words all the cementitious material was Fly Ash Class C.

The compostion uses QUIKRETE Commercial Grade Fine Sand No. 1961 and BASF CASTAMENT FS20 superplasticizer.

TABLE 5

Mixture composition of Comparative Example 2 and Comparative Example 3

| Raw Material | Comparative Example 2 Mix | Comparative Example 3 Mix |
|---|---|---|
| Fly Ash Class C (grams) | 3000 | 3750 |
| Total Cementitious Materials (grams) | 3000 | 3750 |
| Sand (grams) | 3150 | 3938 |
| Sodium Citrate Dihydrate (grams) | 60 | 75 |
| Superplasticizer (grams) | 15 | 18.75 |
| Water (grams) | 825 | 1031 |
| Water/Cementitious Materials Ratio | 0.275 | 0.275 |
| Sand/Cementitious Materials Ratio | 1.05 | 1.05 |
| Sodium Citrate Dihydrate/Cementitious Materials, wt % | 2% | 2% |
| Superplasticizer/Cementitious Materials, wt % | 0.5% | 0.5% |

Early Age Cracking Behavior of Material

FIG. 2 shows a photograph of the slump patty for the mix investigated in Comparative Example 2. The slump patty developed significant cracking upon drying. The initiation of cracks in the patty occurred in less than 30 minutes of the slump test. The number of cracks and the size of cracks grew significantly with subsequent material drying and hardening.

Compressive Strength Behavior of Composition of Comparative Example 2

Table 5A shows the compressive strength behavior of the mix in Comparative Example 2. The early age compressive strengths of the composition were relatively low, being less than about 500 psi at 4 hours and less than about 2000 psi at 24 hours. As will be shown later in the examples, the geopolymer compositions of embodiments of the invention develop significantly higher compressive strength at these same early ages with equivalent water/cement ratios. As shown in the examples of specific embodiments of the present invention the early age compressive strengths of the can easily be tailored by adjusting the type and amount of calcium sulfate, the amount of calcium aluminate cement, and the type and amount of alkali metal activator used in the compositions of embodiments of the invention.

TABLE 5A

Compressive Strength of Example 2 - (psi)

|  | 4 hour | 24 hour | 7 day | 28 day |
|---|---|---|---|---|
| Mix 1 | 493 | 1749 | 6454 | 8996 |

Example 3: Comparative Example

This example investigated early age dimensional stability and cracking resistance of the comparative cementitious compositions comprising fly ash and alkali metal citrate. TABLE 5 shows the raw material composition of the mixture composition investigated.

Early Age Cracking Behavior of Material

FIG. 3A shows a photograph of the slump patty for the mix investigated in the Comparative Example 3. The slump patty developed significant cracking upon drying. The initiation of cracks in the patty occurred in less than about 30 minutes after the slump test.

Compressive Strength Behavior of Composition of Comparative Example 3

Table 5B shows the compressive strength behavior of the mix in Comparative Example 3. The early age compressive strengths of the composition were relatively low being less than about 500 psi at 4 hours and less than about 1500 psi. As shown in later examples of embodiments of the invention, the early age compressive strengths can be tailored by adjusting the type and amount of calcium sulfate, the amount of calcium aluminate cement, and the type and amount of alkali metal activator used in the compositions of the invention.

TABLE 5B

Compressive Strength of Mixture Compositions of Comparative Example 3 - (psi)

|  | 4 hour | 24 hour | 7 day | 28 day |
|---|---|---|---|---|
| Mix 1 | 484 | 1441 | 6503 | 8492 |

Shrinkage Behavior

Figure 3B:
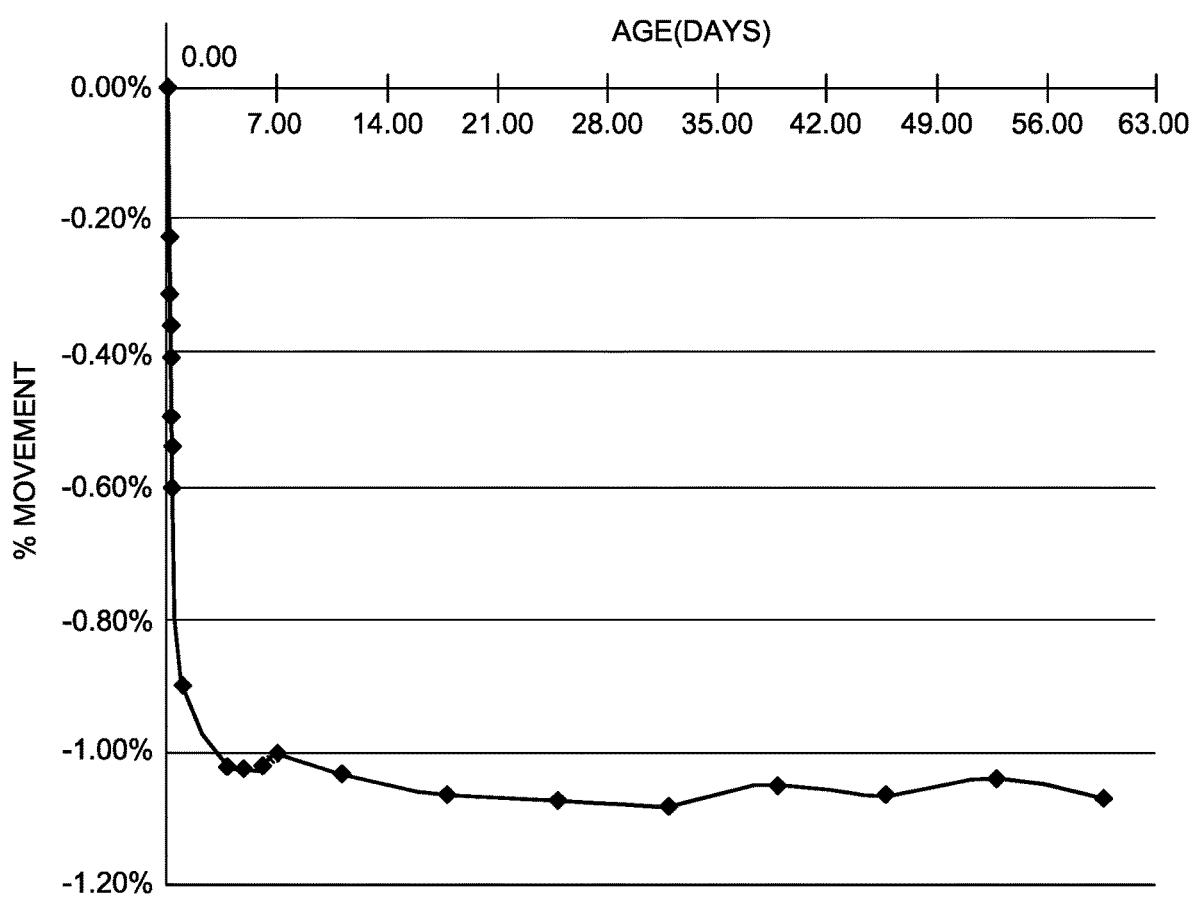
FIG. 3B is a graph of time of shrinkage results of Comparative Example 3

FIG. 3B shows the very early age shrinkage behavior of the cementitious composition in Comparative Example 3.

The very early age shrinkage measurements were initiated at an age of 1-hour from the time the raw materials were mixed together and cast. The fly ash composition activated with an alkali metal citrate demonstrated extremely high amount of shrinkage. The measured maximum shrinkage was found to be in excess of about 1% after 8-weeks of curing at about 75° F./50% RH. Such high levels of material shrinkage render the material unsatisfactory for most construction applications. In most construction applications, shrinkage in excess of about 0.10% is considered to be undesirably high.

Example 4: Addition of Pure Calcium Aluminate Cement to Fly Ash—Comparative Example This example shows physical properties of the cementitious compositions comprising fly ash, calcium aluminate cement and alkali citrate. This studied the influence of incorporation of calcium aluminate cement on shrinkage and cracking resistance of the investigated cementitious compositions comprising fly ash and alkali citrate.

TABLEs 6 and 7 show the raw material compositions of the various cementitious mixtures 1-4 investigated in this Example. Ciment Fondu (HAC Fondu), a calcium aluminate cement, available from Kerneos was utilized as a component of cementitious reactive powder in this investigation. The amount of calcium aluminate cement used in the various mixture compositions investigated in this Example was varied and was equal to 10 wt % and 30 wt % of the weight of fly ash. Potassium citrate was added as a source of alkali citrate in the cementitious compositions investigated in this Example. The calcium sulfate used was USG Landplaster Calcium sulfate dihydrate. QUIKRETE Commercial Grade Fine Sand No. 1961 was used along with AdvaCast 500, WR Grace superplasticizer.

TABLE 6

Cementitious Reactive Powder Compositions in Parts by Weight for Comparative Example 4 (Mix 1 and Mix 2) and Example 5 (Mix 3 and Mix 4)

| Raw Material | Comparative Mix 1 Parts by wt. | Comparative Mix 2 Parts by wt. | Mix 3 Parts by wt | Mix 4 Parts by wt |
|---|---|---|---|---|
| Fly Ash Class C | 100 | 100 | 100 | 100 |
| Calcium Sulfate | 0 | 0 | 3.3 | 10 |
| Calcium Aluminate Cement | 10 | 30 | 10 | 30 |
| Total Cementitious Materials | 110 | 130 | 113 | 140 |

TABLE 7

Cementitious Reactive Powder Compositions in Parts by Weight for Comparative Example 4 (Mix 1 and Mix 2) and Example 5 (Mix 3 and Mix 4)

| Raw Material | Comparative Mix 1 | Comparative Mix 2 | Mix 3 | Mix 4 |
|---|---|---|---|---|
| Fly Ash Class C (grams) | 2727 | 2308 | 2647 | 2143 |
| Calcium Sulfate Dihydrate (grams) | 0 | 0 | 88 | 214 |

TABLE 7-continued

Cementitious Reactive Powder Compositions in Parts by Weight for Comparative Example 4 (Mix 1 and Mix 2) and Example 5 (Mix 3 and Mix 4)

| Raw Material | Comparative Mix 1 | Comparative Mix 2 | Mix 3 | Mix 4 |
|---|---|---|---|---|
| Calcium Aluminate Cement (grams) | 273 | 692 | 265 | 643 |
| Total Cementitious Materials (grams) | 3000 | 3000 | 3000 | 3000 |
| Sand (grams) | 2250 | 2250 | 2250 | 2250 |
| Potassium Citrate (grams) | 120 | 120 | 120 | 120 |
| Superplasticizer (grams) | 30 | 30 | 30 | 30 |
| Water (grams) | 750 | 750 | 750 | 750 |
| Water/Cementitious Materials Ratio | 0.25 | 0.25 | 0.25 | 0.25 |
| Sand/Cementitious Materials Ratio | 0.75 | 0.75 | 0.75 | 0.75 |
| Superplasticizer/Cementitious Materials, wt % | 1% | 1% | 1% | 1% |
| Potassium Citrate/Cementitious Materials, wt % | 4% | 4% | 4% | 4% |
| Calcium Aluminate Cement/Fly ash, wt % | 10% | 10% | 10% | 30% |
| Calcium Sulfate/Calcium Aluminate Cement, wt % | 0% | 0% | 33.3% | 33.3% |

Initial Flow Behavior, Slump, and Early Age Cracking Behavior of Material

TABLE 8 shows the initial flow behavior and slump of the binary blends of fly ash and calcium aluminate cement investigated in Example 4. Both mixes investigated had good flow behavior and high patty diameter as observed in the slump test.

TABLE 8

Flow and Slump of compositions investigated in Example 4 (Mix 1 and Mix 2) and Example 5 (Mix 3 and Mix 4)

| | Flow | Slump (inches) |
|---|---|---|
| Mix 1 | 9 | 9 |
| Mix 2 | 9 | 9 |
| Mix 3 | 8 | 8.5 |
| Mix 4 | 7 | 7 |

Figure 4B:
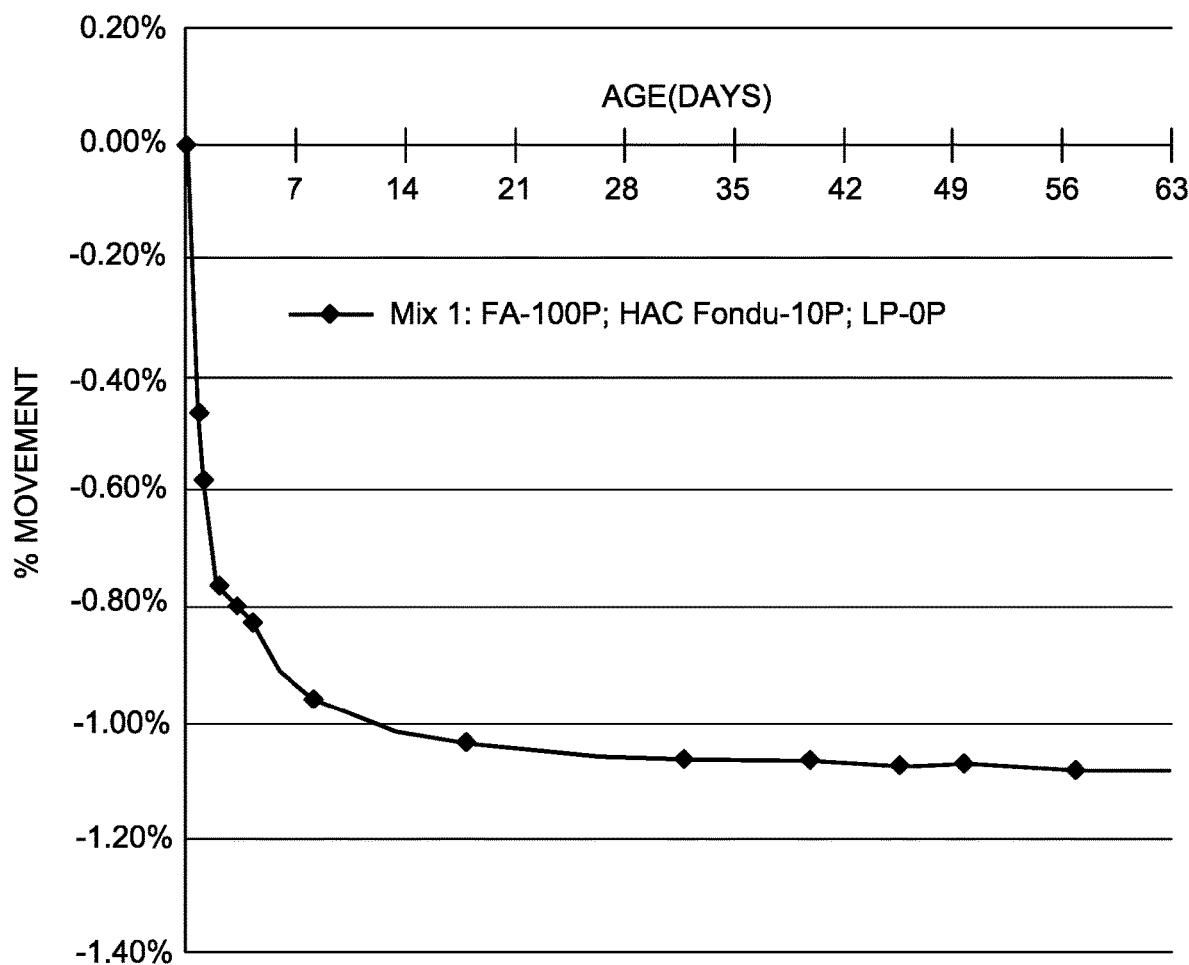
FIG. 4B is a graph of shrinkage behavior of Mix 1 in comparative Example 4 for mixture comprising high alumina cement, fly ash and alkali metal citrate.
Figure 4A:
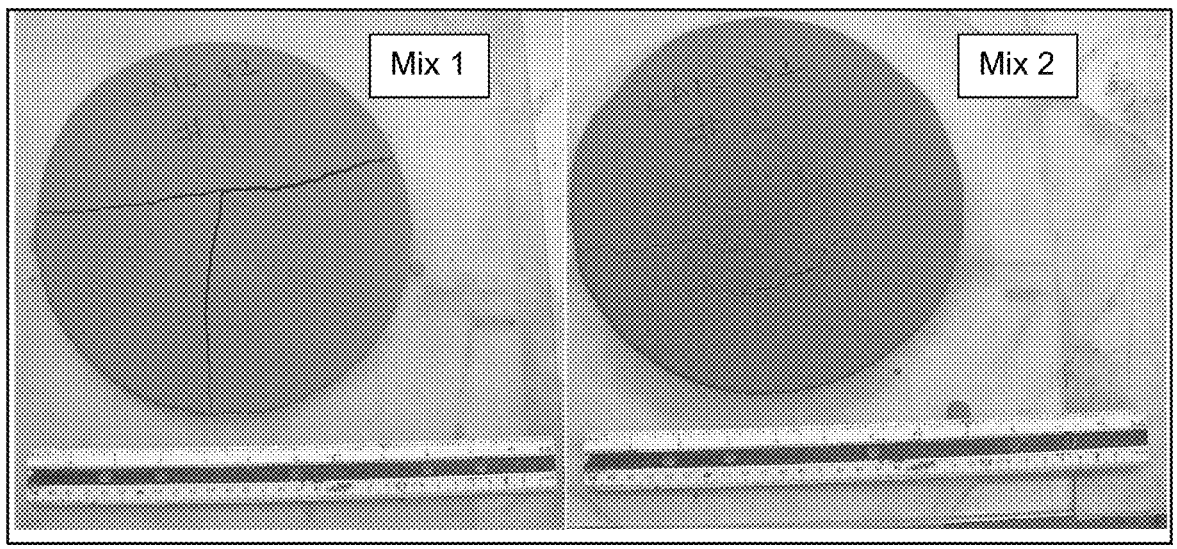
FIG. 4A is a photograph of slump of comparative Example 4 for Mixes 1 and 2.

FIG. 4A shows photographs of slump patties for the comparative Mixes 1 and 2 investigated in Example 4. Both slump patties developed significant cracking upon drying. The initiation of cracks in the patties began to occur as soon as 5 minutes after the raw materials were mixed together. The number of cracks and the size of cracks grew significantly with subsequent material drying and hardening. It can be concluded that addition of calcium aluminate cement to fly ash compositions activated with alkali citrates leads to a dimensionally unstable material prone to excessive cracking upon drying and hardening.

Shrinkage Behavior

Rectangular prism specimens were cast for characterization of shrinkage behavior of the mixes investigated. Prism specimens for Mix 2 cracked in the mold (prior to demolding) in less than 1 hour after the cast due to excessive material shrinkage.

FIG. 4B shows the shrinkage behavior for Mix 1. The shrinkage measurements were initiated at an age of 4-hours from the time the raw materials were mixed together to form an aqueous slurry. The material shrinkage was measured for a total duration of about 8-weeks while curing the material at 75° F./50% RH. It can be observed that prisms for Mix 1 containing a mixture of fly ash, high alumina cement, and an alkali metal citrate shrank very significantly. The measured shrinkage of the prism specimen for Mix 1 at the end of 8 weeks is about 1.08%.

Example 5

TABLES 6 and 7 show the raw material compositions of the two geopolymer cementitious mixtures (Mix 3 and Mix 4 in Tables 6 and 7) of this invention investigated in Example 5. The amount of calcium aluminate cement used in the mixture compositions of this example was equal to 10 wt % (Mix 3) and 30 wt % (Mix 4) of the weight of fly ash. Fine-grained Landplaster was added at different amount level of 33.33 wt % based on the weight of calcium aluminate cement).

Initial Flow Behavior, Slump, and Early Age Cracking Behavior of Material

TABLE 8 shows the initial flow behavior and slump characteristics of the geopolymeric cementitious compositions of the invention (Mix 3 and Mix 4 in TABLE 8) comprising fly ash, calcium aluminate cement, fine-grain landplaster, and alkali citrate investigated in Example 5. It can be clearly observed that all mixture compositions investigated had good flow behavior. It is particularly noteworthy that such good flow properties were obtainable even at a water/cementitious materials ratio as low as 0.25.

Figure 5A:
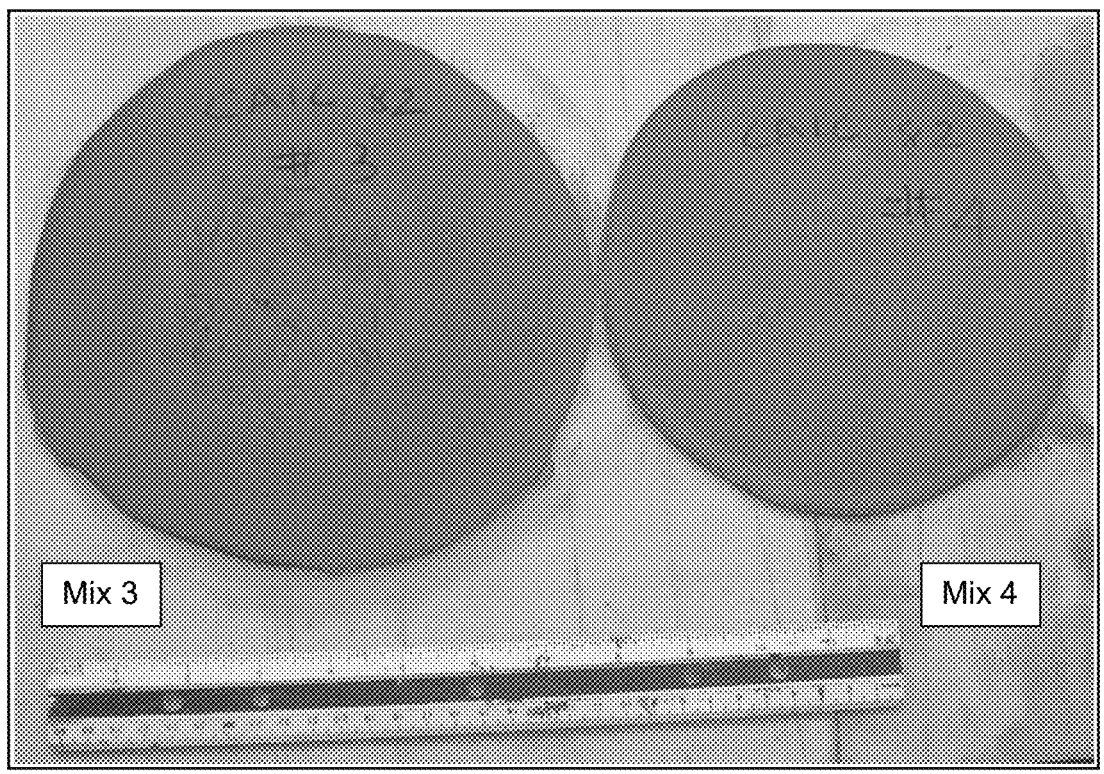
FIG. 5A is a photograph of slump patty of the two mixture compositions in Example 5

FIG. 5A shows photograph of slump patties for the geopolymeric cementitious compositions of the invention investigated in Example 5. The slump patties of this Example did not develop any cracking upon drying as was the case for the cementitious mixtures of Comparative Example 4 containing no landplaster. Thus, incorporating a source of calcium sulfate (fine-grained landplaster) to the cementitious mixture comprising fly ash, calcium aluminate cement, and alkali citrate leads to dimensionally stable geopolymeric cementitious compositions possessing superior resistance to cracking upon drying.

Shrinkage Behavior

Figure 5B:
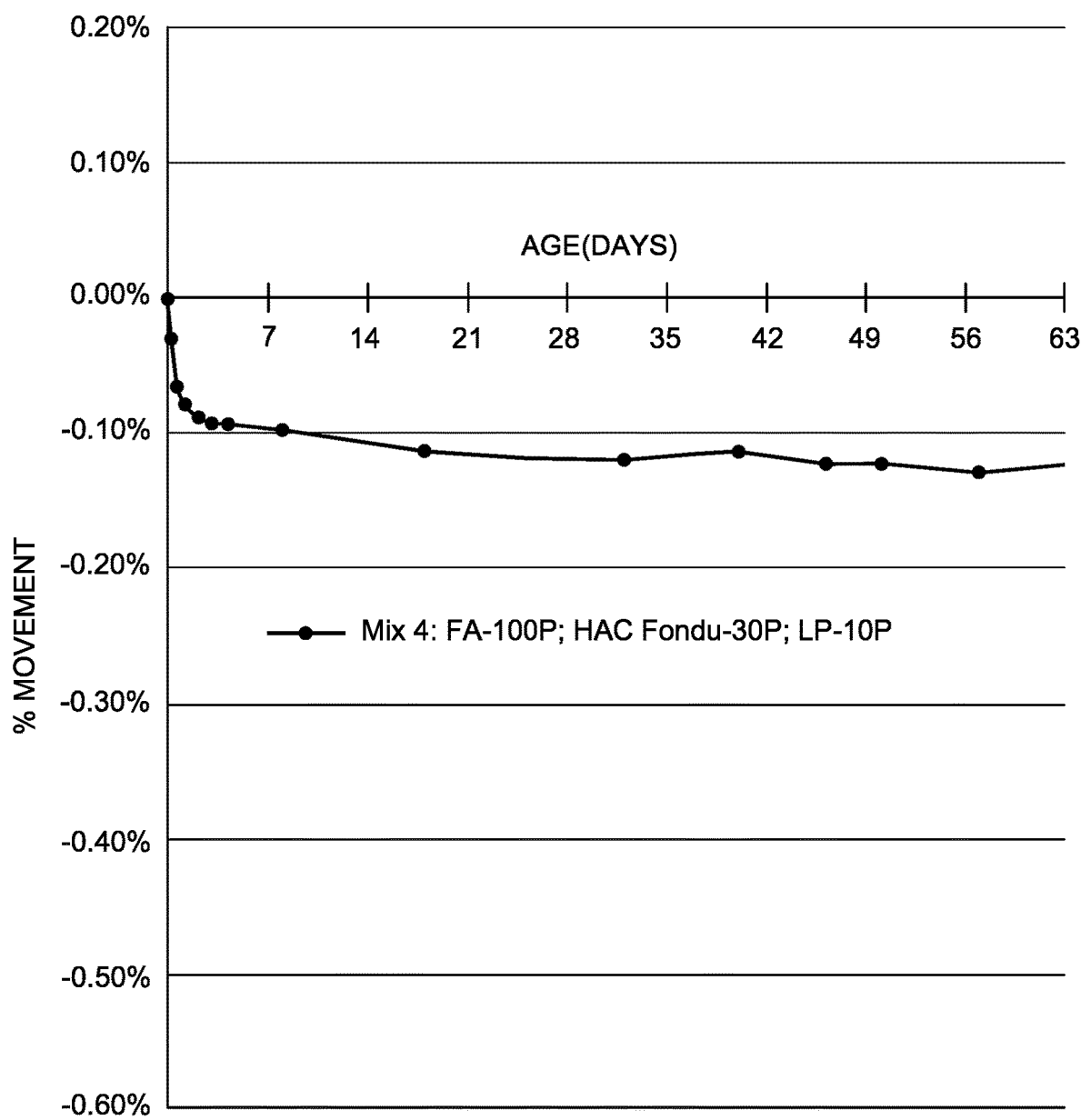
FIG. 5B is a graph of shrinkage of cementitious compositions of Example 5.

FIG. 5B shows a graph of shrinkage behavior of geopolymeric cementitious compositions of the invention investigated in Example 5. The main objective of this investigation was to study the influence of incorporation of calcium aluminate cement in combination with calcium sulfate (landplaster) and alkali metal citrate on shrinkage behavior of the developed geopolymeric cementitious compositions of the invention.

The shrinkage measurements were initiated at an age of 4-hours from the time the raw materials were mixed together to form an aqueous slurry. The material shrinkage was measured for a total duration of about 8-weeks while curing the material at 75° F./50% RH.

The following conclusions can be drawn from this investigation and FIG. 5B:

The incorporation of calcium sulfate (landplaster) had a significant impact on improving cracking resistance and dimensional stability of geopolymeric cementitious compositions of the invention comprising of fly ash, calcium aluminate cement and an alkali metal citrate. Contrary to the comparative Mix 1 shrinkage bars of comparative Example 4 (with no landplaster) which cracked even before de-molding, the shrinkage bars of Example 5 comprising calcium sulfate (landplaster) were completely stable and did not result in any cracks either prior to or after de-molding.

The measured maximum shrinkage of the geopolymeric cementitious compositions of the invention comprising of fly ash, calcium aluminate cement, calcium sulfate (landplaster), and alkali citrate was significantly lower than that of the cementitious compositions containing fly ash and alkali citrate only (Example 1). For example, the geopolymeric cementitious compositions of the invention comprising of fly ash, calcium aluminate cement, calcium sulfate (landplaster) and alkali citrate had maximum measured shrinkage 0.14% in comparison to the maximum shrinkage of about 0.75% for the comparative mixture containing fly ash and alkali citrate only (Example 1). Thus, it can be concluded that addition of calcium sulfate to cementitious compositions comprising of fly ash, calcium aluminate cement, and alkali citrate helps to very significantly reduce the material shrinkage.

Time of Setting

TABLE 9 shows time of setting of geopolymeric cementitious compositions of the invention investigated in Example 5.

TABLE 9

Setting Times of Example 5 (Mix 3 and Mix 4)

|  | Initial Setting Time (hr:min) | Final Setting Time (hr:min) |
|---|---|---|
| Mix 3 | 00:19 | 00:24 |
| Mix 4 | 00:24 | 00:33 |

Cementitious compositions investigated in Example 5 had rapid setting behavior with final setting times ranging between 20 to 40 minutes. The developed cementitious compositions of the invention comprising fly ash, calcium aluminate cement, calcium sulfate (landplaster), and alkali citrate had relatively longer setting times than the cementitious compositions comprising only fly ash and alkali citrate as seen in Example 1. For the cementitious composition comprising of fly ash and alkali citrate of Example 1, the time of final setting was about 15 minutes. An extremely short setting time is a problem for most practical applications since a short material working life (pot life) causes significant difficulties with processing of rapid setting material using the equipment and tools involved in the actual field application.

Compressive Strength

TABLE 10 shows the compressive strength behavior of the developed geopolymeric cementitious compositions of the invention comprising of fly ash, calcium aluminate cement, calcium sulfate (landplaster), and alkali citrate investigated in Example 5.

TABLE 10

Compressive Strength of Example 5 (Mix 3 and Mix 4) - (psi)

|  | 4 hour | 24 hour | 8 day | 28 day |
|---|---|---|---|---|
| Mix 3 | 1543 | 4164 | 6883 | 7836 |
| Mix 4 | 1461 | 2075 | 3974 | 4146 |

This studied the influence of incorporation of calcium aluminate cement in combination with calcium sulfate dihydrate (fine-grained landplaster) on both the early age and ultimate compressive strength behavior of the developed geopolymeric cementitious compositions of the invention. The data indicates the following:

The compressive strength of the geopolymeric cementitious compositions of the invention investigated in this example continued to increase as a function of time.

The early age (4-hour and 24-hour) strength of mixes increased with increase in landplaster amount in the cementitious composition.

The early age 4-hour compressive strengths of the material were in excess of 1400 psi with the use of landplaster as a component of the investigated geopolymeric cementitious compositions of the invention.

The early age 24-hour compressive strengths of the material were in excess of 2000 psi with the use of landplaster as a component of the investigated geopolymeric cementitious compositions of the invention. It is noteworthy that the 24-hour compressive strength for Mix 3 with 30 parts calcium aluminate cement and 10 parts calcium sulfate was very high at about 4150 psi.

The 28-day compressive strength of the geopolymeric cementitious compositions of the invention investigated in this example was very high, about 6900 psi for Mix 3 and about 4000 psi for Mix 4.

In the embodiments of present invention shown in this example it was unexpectedly found that when the aluminosilicate mineral, alkali metal activator, calcium aluminate cement and calcium sulfate were mixed together, the resulting reaction was less exothermic than the two separate reactions and the time of gelation and hardening times were significantly extended.

It has also been found that there is a significant reduction in material shrinkage when the aluminosilicate mineral and alkali metal activator were reacted together with calcium aluminate cement and calcium sulfate as discussed above in paragraph of the description.

Example 6

TABLE 11 shows the raw material compositions of the geopolymeric cementitious mixtures investigated in this Example, as shown in TABLE 6. The amount of calcium aluminate cement used in the mixture compositions of this example was equal to 30 wt % of the weight of fly ash. Calcium sulfate dihydrate (landplaster) was added at different amount levels (5 wt %, 10 wt %, 20 wt %, and 30 wt % of the weight of the fly ash calcium aluminate cement) in the various mixture compositions investigated. The fly ash is Class C Fly Ash, Campbell Power Plant, West Olive, Mich., the calcium sulfate dihydrate is USG Landplaster, the calcium aluminate cement is Ciment Fondu (HAC Fondu), Kerneos Inc, the sand is QUIKRETE Commercial Grade Fine Sand No. 1961 and the superplasticizer is AdvaCast 500, from WR Grace.

TABLE 11

Compositions investigated in Example 6

| Raw Material | Mix 1 | Mix 2 | Mix 3 | Mix 4 |
|---|---|---|---|---|
| Fly Ash Class C (grams) | 2222 | 2143 | 2000 | 1875 |
| Calcium Sulfate Dihydrate (grams) | 111 | 214 | 400 | 562.5 |
| Calcium Aluminate Cement (grams) | 667 | 643 | 600 | 563 |
| Total Cementitious Materials (grams) | 3000 | 3000 | 3000 | 3000 |
| Sand (grams) | 2250 | 2250 | 2250 | 2250 |
| Potassium Citrate (grams) | 120 | 120 | 120 | 120 |
| Superplasticizer (grams) | 45 | 45 | 45 | 45 |

TABLE 11-continued

Compositions investigated in Example 6

| Raw Material | Mix 1 | Mix 2 | Mix 3 | Mix 4 |
|---|---|---|---|---|
| Water (grams) | 825 | 825 | 825 | 825 |
| Water/Cementitious Materials Ratio | 0.275 | 0.275 | 0.275 | 0.275 |
| Sand/Cementitious Materials Ratio | 0.75 | 0.75 | 0.75 | 0.75 |
| Superplasticizer/Cementitious Materials, wt % | 1.5% | 1.5% | 1.5% | 1.5% |
| Potassium Citrate/Cementitious Materials, wt % | 4% | 4% | 4% | 4% |
| Calcium Aluminate Cement/Fly ash, wt % | 30% | 30% | 30% | 30% |
| Calcium Sulfate/Calcium Aluminate Cement, wt % | 16.7% | 33.3% | 66.7% | 100% |

Initial Flow Behavior, Slump, and Early Age Cracking Behavior of Material

TABLE 12 shows the initial flow behavior and slump characteristics of the geopolymeric cementitious compositions of the invention comprising of fly ash, calcium aluminate cement, calcium sulfate (last plaster), and alkali citrate investigated in Example 6.

TABLE 12

Flow and Slump of Example 6

| | Flow | Slump (inches) |
|---|---|---|
| Mix 1 | 9 | 9 |
| Mix 2 | 9 | 9 |
| Mix 3 | 9 | 8.75 |
| Mix 4 | 9 | 9 |

All mixture compositions investigated had good self-leveling, flow behavior and high patty diameter as observed in the slump test. The high slump and self-leveling behavior was obtainable at a water/cementitious materials ratio as low as 0.275.

Figure 6A:
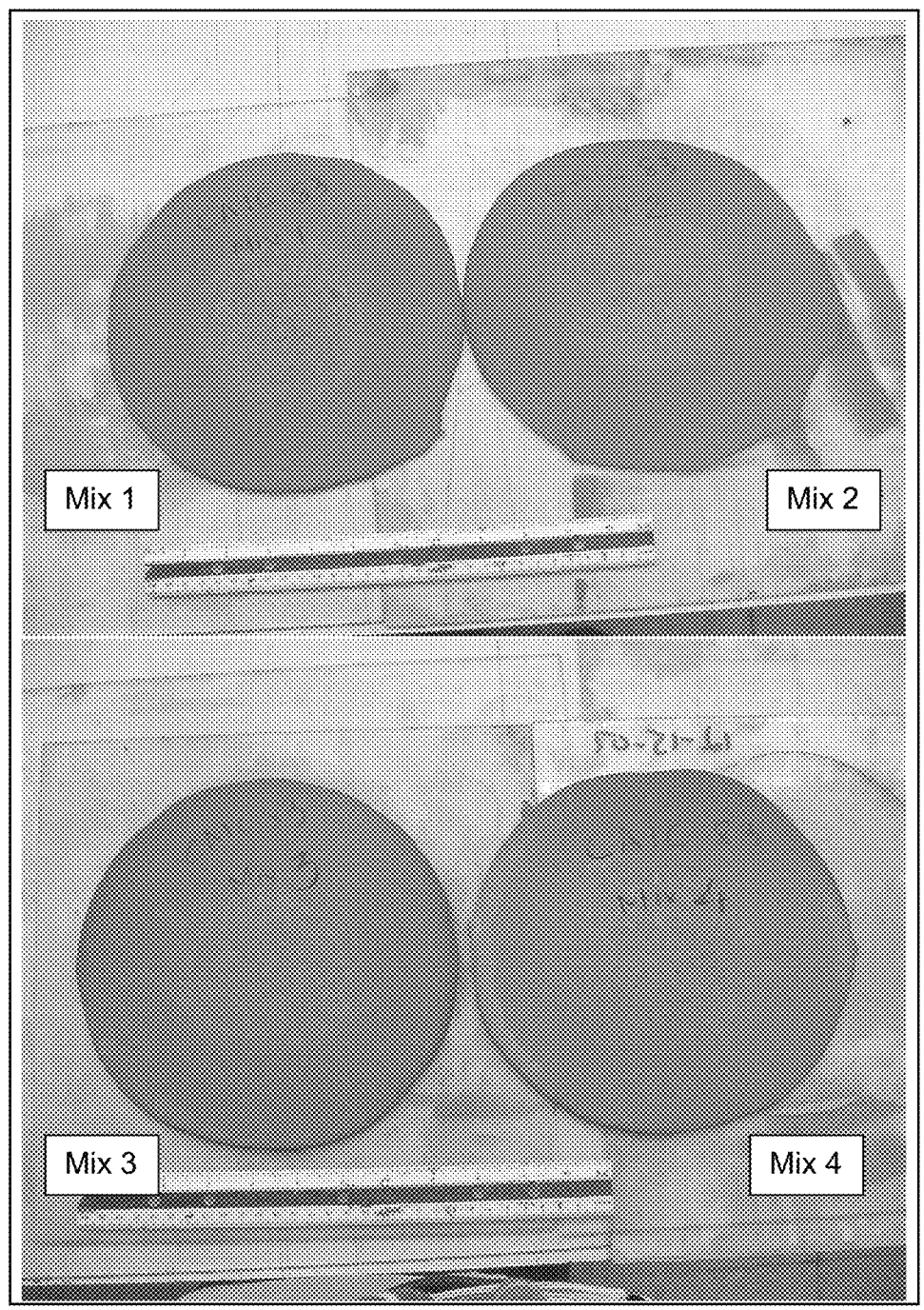
FIG. 6A is a photograph of slump patty of the mixture compositions in Example 6.

FIG. 6A shows photographs of slump patties for the geopolymeric cementitious compositions of the invention in Example 6. The slump patties of this example did not develop any cracking upon drying in contrast to the cementitious mixtures of comparative Example 4 containing no calcium sulfate (landplaster). Thus, it can be concluded incorporation of calcium sulfate (landplaster) to the cementitious mixture comprising of fly ash, calcium aluminate cement, and alkali citrate leads to dimensionally stable geopolymeric cementitious compositions possessing superior resistance to cracking upon drying.

Shrinkage Behavior

Figure 6B:
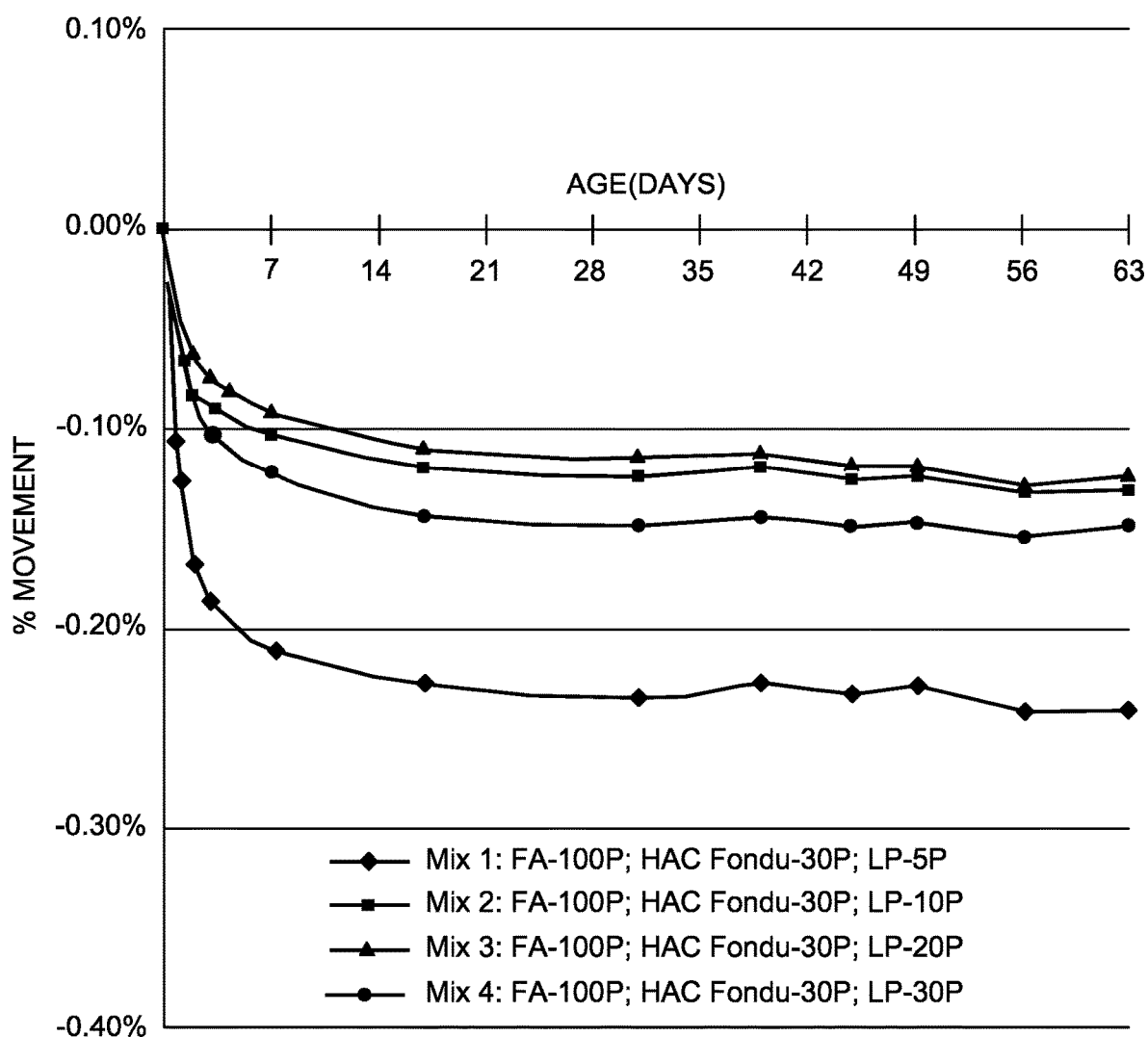
FIG. 6B is a graph of shrinkage behavior of geopolymer compositions of the invention in Example 6.

FIG. 6B shows shrinkage behavior of geopolymeric cementitious compositions of the invention investigated in Example 6. This shows the influence of incorporation of calcium aluminate cement in combination with a calcium sulfate (calcium sulfate dihydrate or landplaster) on shrinkage behavior of the developed geopolymeric cementitious compositions of the invention.

The shrinkage measurements were initiated at an age of 4-hours from the time the raw materials were mixed together to form an aqueous slurry. The material shrinkage was measured for a total duration of 8-weeks while curing the material at 75° F./50% RH.

The following important conclusions can be drawn from this investigation and FIG. 6B:

The incorporation of calcium sulfate (landplaster) had a significant impact on improving the cracking resistance and dimensional stability of geopolymeric cementitious compositions of the invention comprising of fly ash, calcium aluminate cement and alkali citrate. Contrary to the shrinkage bars of comparative Example 4 (with no landplaster) which cracked even before de-molding, the shrinkage bars of Example 6 comprising calcium sulfate (fine-grained landplaster) were completely stable and did not result in any cracks either prior to or after de-molding.

The measured maximum shrinkage of the geopolymeric cementitious compositions of the invention comprising of fly ash, calcium aluminate cement, calcium sulfate (fine-grained landplaster), and alkali citrate was significantly lower than that of the cementitious compositions comprising of fly ash and alkali citrate only (Example 1). For example, the geopolymeric cementitious compositions of the invention comprising of fly ash, calcium aluminate cement, calcium sulfate (fine-grained landplaster), and alkali citrate had a maximum shrinkage of about 0.13% to 0.24% in comparison to a maximum shrinkage of about 0.75% for the comparative mixture comprising of fly ash and alkali citrate only (Example 1). Thus, addition of fine-grained landplaster to cementitious compositions comprising of fly ash, calcium aluminate cement, and alkali citrate helps to significantly reduce the material shrinkage.

Increase in calcium sulfate (landplaster) amount at levels used in this Example resulted in an overall decrease in the maximum shrinkage of the material. It can be observed that at a calcium sulfate (landplaster) amount of 16.7 wt %, the material shrinkage was 0.24% (Mix 1). Increase in calcium sulfate (landplaster) amount to 33.3 wt % and 66.7 wt % resulted in a decrease in material shrinkage to a value of about 0.13% (Mix 2 and Mix 3). A further increase in calcium sulfate (landplaster) amount to 100 wt % resulted in a slight increase in shrinkage to a value of about 0.15%

Heat Evolution and Slurry Temperate Rise Behavior

Figure 6C:
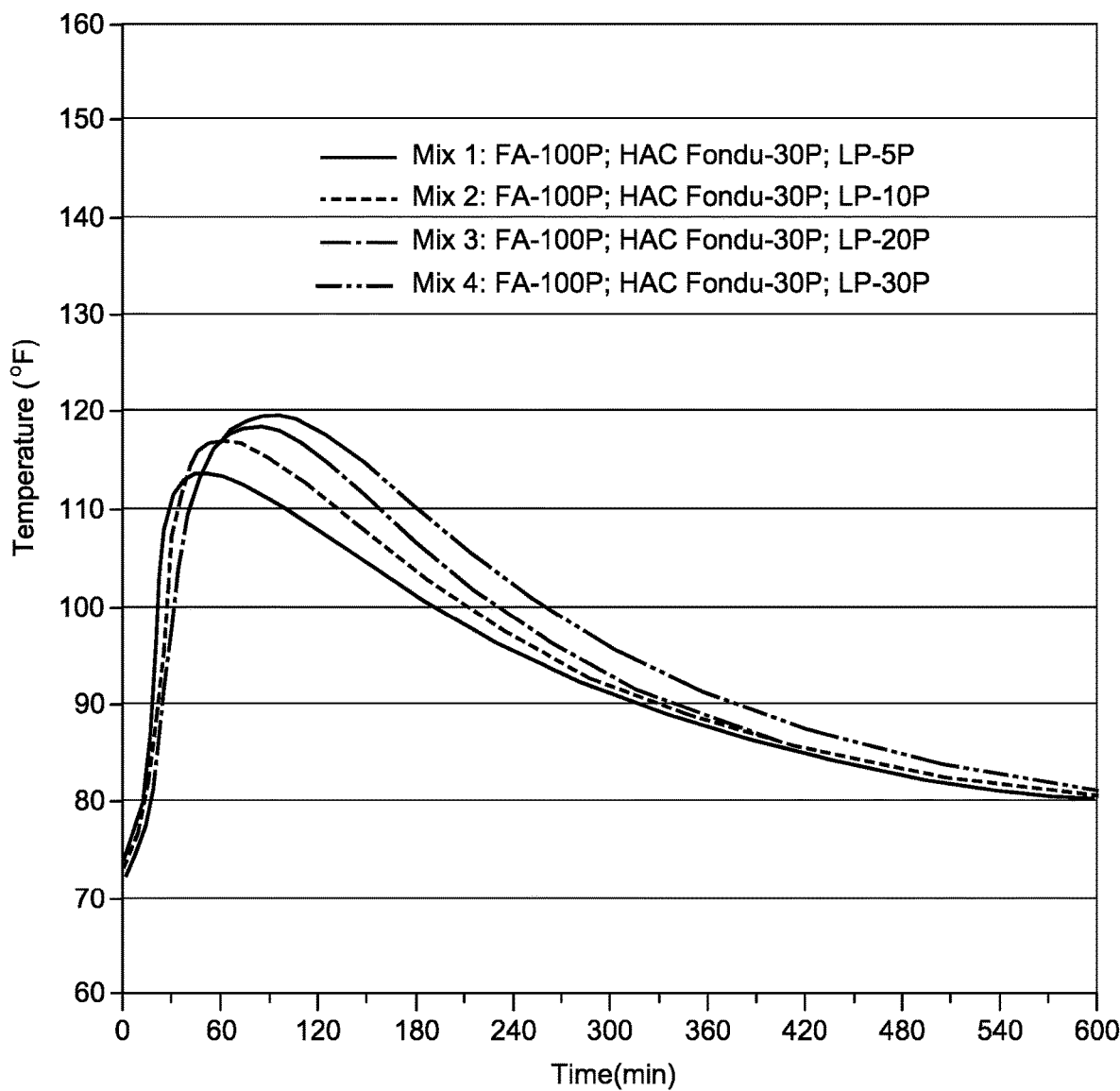
FIG. 6C is a graph of slurry temperature rise of geopolymer compositions in Example 6.

FIG. 6C shows the exothermic and slurry temperature rise behavior of geopolymeric cementitious compositions of the invention investigated in Example 6. The cementitious compositions of Example 6 comprising of fly ash, calcium aluminate cement, calcium sulfate (fine-grained landplaster), and alkali citrate demonstrated only a very moderate temperature rise behavior. Moderate heat evolution and low temperature rise within the material during curing stage are crucial to prevent excessive thermal expansion and consequent cracking and disruption of material. This aspect becomes even more crucial when the material is used in a manner where large thicknesses of material pours are involved in the actual field application. The geopolymeric cementitious compositions of the invention investigated in this Example are disclosed to be highly beneficial in this particular aspect as they would lead to a lower thermal expansion and enhanced resistance to thermal cracking in actual field applications.

Time of Setting

TABLE 13 shows the time of setting of geopolymeric cementitious compositions of the invention investigated in Example 6 comprising fly ash, calcium aluminate cement, calcium sulfate (fine-grained landplaster), and alkali citrate.

TABLE 13

Setting Times of Example 6

|  | Initial Setting Time (hr:min) | Final Setting Time (hr:min) |
| --- | --- | --- |
| Mix 1 | 00:24 | 00:30 |
| Mix 2 | 00:27 | 00:31 |
| Mix 3 | 00:30 | 00:48 |
| Mix 4 | 00:34 | 00:48 |

All cementitious compositions investigated in this example showed final setting times ranging between 30 to 50 minutes. In contrast, the cementitious composition comprising fly ash and alkali citrate of Example 1 had a time of final setting of about 15 minutes.

Compressive Strength

TABLE 14 shows the early age and ultimate compressive strength behavior of the developed geopolymeric cementitious compositions of the invention comprising of fly ash, calcium aluminate cement, calcium sulfate (fine-grained landplaster), and alkali citrate of Example 6.

TABLE 14

Compressive Strength of Example 6 - (psi)

|  | 4 hour | 24 hour | 7 day | 28 day |
| --- | --- | --- | --- | --- |
| Mix 1 | 871 | 1601 | 3996 | 5221 |
| Mix 2 | 1042 | 1770 | 3693 | 4108 |
| Mix 3 | 1027 | 1711 | 2851 | 3248 |
| Mix 4 | 1076 | 1768 | 2765 | 2855 |

The following observations can be drawn from this study:

The compressive strength of the geopolymeric cementitious compositions of the invention investigated in this Example continued to increase as a function of time.

The early age 4-hour compressive strengths of the material were in excess of 750 psi with the use of calcium sulfate (landplaster) as a component of the investigated geopolymeric cementitious compositions of the invention.

The early age 24-hour compressive strengths of the material were in excess of 1500 psi with the use of calcium sulfate (landplaster) as a component of the investigated geopolymeric cementitious compositions of the invention.

The 28-day compressive strength of all geopolymeric cementitious compositions of the invention investigated in this example was very high at lower amounts of calcium sulfate (landplaster) and decreased with increase in the amount of calcium sulfate. For instance, the 28-day compressive strength of Mix 1 with 16.7% calcium sulfate and Mix 2 with 33.3% calcium sulfate, were 5221 psi and 4108 psi, respectively. On the other hand, for Mix #4 with 100% calcium sulfate, the 28-day compressive strength dropped to 2855 psi.

Example 7

This example compares compositions of invention comprising calcium aluminate cement at different amount levels in the mixtures containing fly ash, calcium sulfate (fine-grained calcium sulfate dihydrate or landplaster), and alkali citrate.

TABLE 15 shows the raw material compositions of the geopolymeric cementitious mixtures investigated in this example. The amount of calcium aluminate cement used in the mixture compositions of this example was equal to 40 wt %, 60 wt % and 80 wt % of the weight of the Class C fly ash. Calcium sulfate in the form of fine-grained USG landplaster was added at the amount level of 30 wt % of the weight of calcium aluminate cement and 13.3, 20 and 26.7 wt % of the fly ash. The calcium aluminate cement was Ciment Fondu (HAC Fondu), Kerneos, Inc., the sand is QUIKRETE Commercial Grade Fine Sand No. 1961 and the superplasticizer is AdvaCast 500, WR Grace.

TABLE 15

Example 7 Compositions

| Raw Material | Mix 1 | Mix 2 | Mix 3 |
| --- | --- | --- | --- |
| Fly Ash Class C (grams) | 1957 | 1667 | 1452 |
| Calcium Sulfate Dihydrate (grams) | 261 | 333 | 387 |
| Calcium Aluminate Cement (grams) | 783 | 1000 | 1161 |
| Total Cementitious Materials (grams) | 3000 | 3000 | 3000 |
| Sand (grams) | 2250 | 2250 | 2250 |
| Potassium Citrate (grams) | 120 | 120 | 120 |
| Superplasticizer (grams) | 12 | 30 | 30 |
| Water (grams) | 825 | 825 | 825 |
| Water/Cementitious Materials Ratio | 0.275 | 0.275 | 0.275 |
| Sand/Cementitious Materials Ratio | 0.75 | 0.75 | 0.75 |
| Superplasticizer/Cementitious Materials, wt % | 0.4% | 1% | 1% |
| Potassium Citrate/Cementitious Materials, wt % | 4% | 4% | 4% |
| Calcium Aluminate Cement/Fly ash, wt % | 40% | 60% | 80% |
| Calcium Sulfate/Calcium Aluminate Cement, wt % | 33.3% | 33.3% | 33.3% |

Initial Flow Behavior, Slump, and Early Age Cracking Behavior of Material

TABLE 16 shows the initial flow behavior and slump characteristics of the geopolymeric cementitious compositions of the invention comprising fly ash, calcium aluminate cement, calcium sulfate dihydrate (fine-grained last plaster), and alkali citrate investigated in Example 7.

TABLE 16

Flow and Slump of Example 7

|  | Flow | Slump (inches) |
| --- | --- | --- |
| Mix 1 | 9 | 9 |
| Mix 2 | 7 | 8 |
| Mix 3 | 7 | 8 |

All mixture compositions investigated had good flow behavior as observed in the slump test.

Shrinkage Behavior

Figure 7:
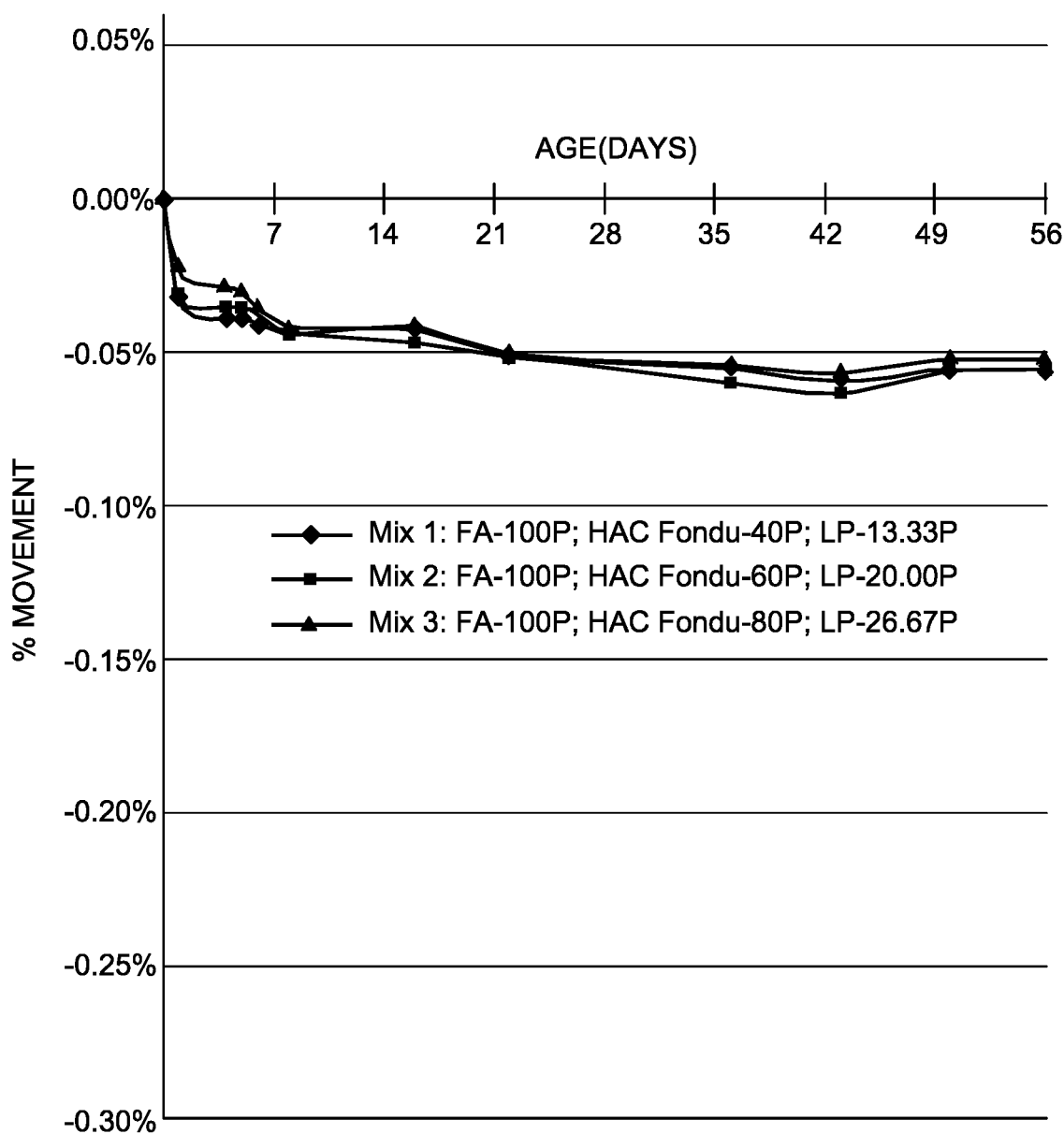
FIG. 7 is a graph of shrinkage of compositions in Example 7.

FIG. 7 shows data for shrinkage behavior of geopolymeric cementitious compositions 7 of the invention in this example.

The shrinkage measurements were initiated at an age of 4-hours from the time the raw materials were mixed together to form an aqueous slurry. The material shrinkage was measured for a total duration of about 8-weeks while curing the material at 75° F./50% RH.

This example showed the following:

Contrary to the shrinkage bars of comparative Example 4 (with no calcium sulfate) which cracked even before de-molding, the shrinkage bars of Example 7 comprising calcium sulfate (fine-grained landplaster) were completely stable and did not result in any cracks prior to or after de-molding.

The geopolymeric cementitious compositions of the invention comprising fly ash, calcium aluminate cement, calcium sulfate (fine-grained landplaster), and alkali citrate had a maximum shrinkage was extremely low at about less than 0.06% in comparison to a maximum shrinkage of about 0.75% for the comparative mixture composition containing only fly ash and alkali citrate (Example 1).

Time of Setting

TABLE 17 shows the time of setting of geopolymeric cementitious compositions of invention of Example 7.

TABLE 17

Setting Times of Example 7

|  | Initial Setting Time (hr:min) | Final Setting Time (hr:min) |
|---|---|---|
| Mix 1 | 00:22 | 00:30 |
| Mix 2 | 00:29 | 00:37 |
| Mix 3 | 00:30 | 00:40 |

All geopolymer cementitious compositions of the invention demonstrated rapid setting behavior. However, the mixture composition of invention investigated in this example comprising fly ash, calcium aluminate cement, calcium sulfate (fine-grained landplaster), and alkali citrate had a relatively longer setting time than the prior art cementitious composition comprising fly ash and alkali citrate only (Example 1). The final setting times of the geopolymeric cementitious composition Mixes 1, 2, and 3 of the invention comprising fly ash, calcium aluminate cement, calcium sulfate dihydrate (landplaster), and potassium citrate was from about 30 to about 45 minutes compared to an extremely rapid final setting time of about 15 minutes for the mixture composition containing only fly ash and potassium citrate (Example 1).

Compressive Strength

TABLE 18 show the compressive strength behavior of the developed geopolymeric cementitious compositions of the invention comprising fly ash, calcium aluminate cement, calcium sulfate (fine-grained landplaster), and alkali citrate investigated in Example 7.

TABLE 18

Compressive Strength of Example 7 - (psi)

|  | 4 hour | 24 hour | 7 day |
|---|---|---|---|
| Mix 1 | 1511 | 1958 | 2679 |
| Mix 2 | 1579 | 1924 | 3051 |
| Mix 3 | 1883 | 2026 | 3128 |

The following observations can be drawn:

The compressive strength of the geopolymeric cementitious compositions of the invention investigated in this example continued to increase with time.

The early age 4-hour compressive strength of the material was in excess of 1500 psi with the use of calcium aluminate cement, calcium sulfate (fine-grained landplaster) and alkali citrate as part of the geopolymeric cementitious compositions of invention. Similarly, the 24-hour compressive strengths of the compositions of invention were in excess of 1900 psi.

Example 8

This example depicts physical properties of the developed geopolymeric cementitious compositions of the invention comprising of fly ash, calcium aluminate cement, calcium sulfate in the form of fine-grained anhydrous calcium sulfate (i.e., anhydrite) and alkali citrate, mixed as shown in TABLE 6. TABLE 19 shows the raw material compositions of the geopolymeric cementitious mixtures investigated in this Example. Mix 1 represents a comparative composition investigated in Example 8. The amount of calcium aluminate cement used in the mixture compositions of this example was equal to 0 wt %, 30 wt %, 60 wt % and 90 wt % of the weight of fly ash. Anhydrite (USG SNOW WHITE Filler) was added at a amount of 33.33 wt % of the weight of calcium aluminate cement (CIMENT Fondu HAC Fondu) and 0, 10, 20 and 30 wt. % of the fly ash in the mixture compositions investigated. QUIKRETE Commercial Grade Fine Sand No. 1961 and BASF CASTAMENT FS20 superplasticizer was used.

TABLE 19

Geopolymeric compositions of Example 8

| Raw Material | Mix 1 Comparative Composition | Mix 2 | Mix 3 | Mix 4 |
|---|---|---|---|---|
| Fly Ash Class C (grams) | 3000 | 2143 | 1667 | 1364 |
| Anhydrous Calcium Sulfate (Anhydrite) (grams) | 0 | 214 | 333 | 409 |
| Calcium Aluminate Cement (grams) | 0 | 643 | 1000 | 1227 |
| Total Cementitious Materials (grams) | 3000 | 3000 | 3000 | 3000 |
| Sand (grams) | 2250 | 2250 | 2250 | 2250 |
| Potassium Citrate (grams) | 120 | 120 | 120 | 120 |
| Superplasticizer (grams) | 15 | 15 | 15 | 15 |
| Water (grams) | 750 | 750 | 750 | 750 |
| Water/Cementitious Materials Ratio | 0.25 | 0.25 | 0.25 | 0.25 |
| Sand/Cementitious Materials Ratio | 0.75 | 0.75 | 0.75 | 0.75 |
| Superplasticizer/Cementitious Materials, wt % | 0.5% | 0.5% | 0.5% | 0.5% |
| Potassium Citrate/Cementitious Materials, wt % | 4% | 4% | 4% | 4% |

TABLE 19-continued

Geopolymeric compositions of Example 8

| Raw Material | Mix 1 Comparative Composition | Mix 2 | Mix 3 | Mix 4 |
|---|---|---|---|---|
| Calcium Aluminate Cement/Fly ash, wt % | 0% | 30% | 60% | 90% |
| Calcium Sulfate/Calcium Aluminate Cement, wt % | 0% | 33.3% | 33.3% | 33.3% |

Initial Flow Behavior, Slump, and Early Ace Cracking Behavior of Material

TABLE 20 shows the initial flow behavior and slump characteristics of the geopolymeric cementitious compositions of the invention comprising of fly ash, calcium aluminate cement, calcium sulfate in the form of anhydrite, and alkali citrate investigated in Example 8.

TABLE 20

Flow and Slump of Example 8

| | Flow | Slump (inches) |
|---|---|---|
| Mix 1 - Comparative Composition | 10 | 11 |
| Mix 2 | 10 | 10 |
| Mix 3 | 10 | 10 |
| Mix 4 | 9 | 9.5 |

All mixture compositions investigated had good self-leveling, flow behavior and high patty diameter as observed in the slump test. It is particularly noteworthy that such high slump and self-leveling behavior was obtainable at a water/cementitious materials ratio as low as 0.25.

The slump patties for all four mixes comprising of calcium sulfate in the form of anhydrite were in excellent condition and developed no cracking.

Shrinkage Behavior

Figure 8:
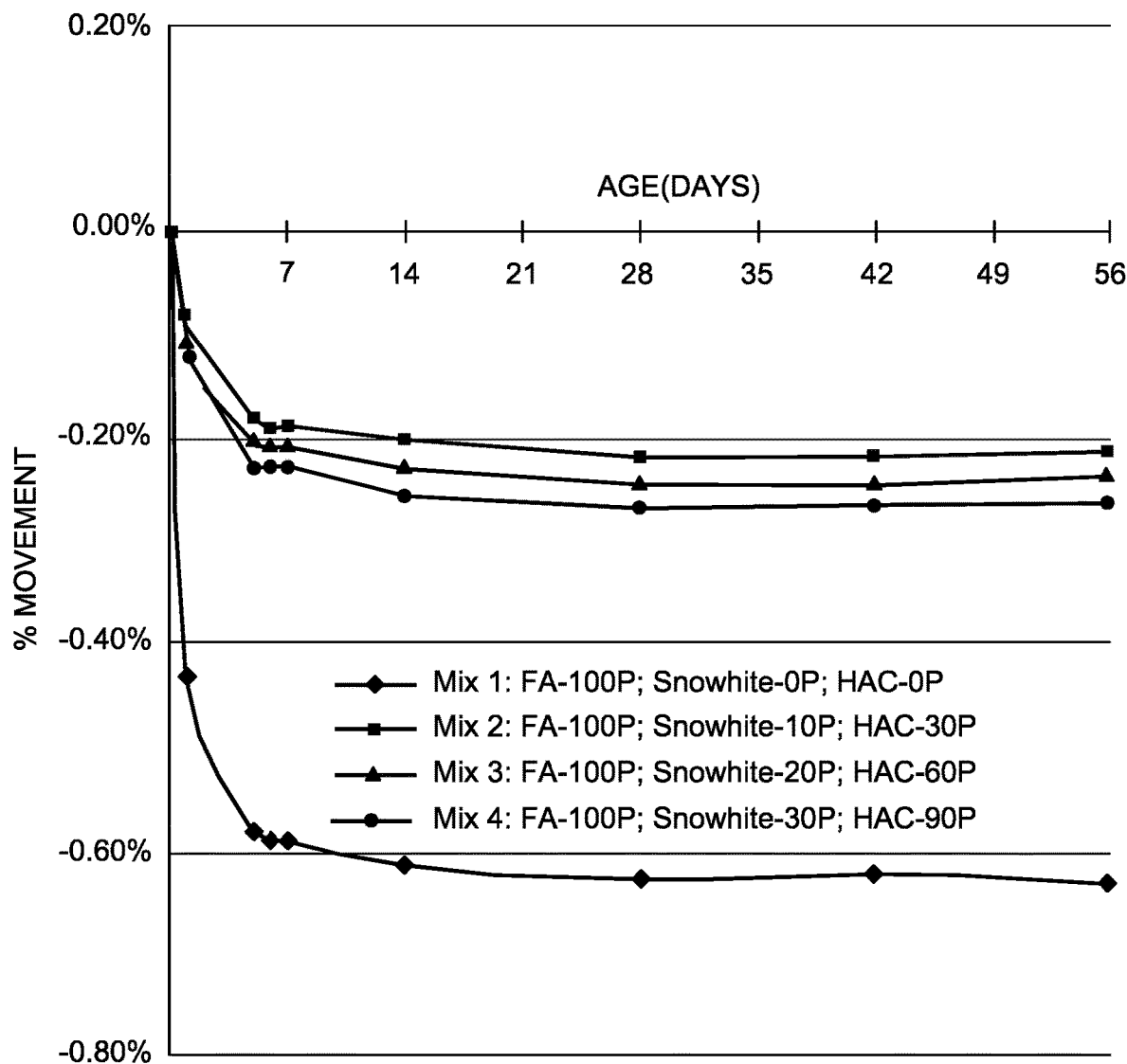
FIG. 8 is a graph of shrinkage of compositions of invention (Mixes 2 to 4) in Example 8.

FIG. 8 shows shrinkage behavior of geopolymeric cementitious compositions of the invention investigated in Example 8. The shrinkage measurements were initiated at an age of 4-hours from the time the raw materials were mixed together to form an aqueous slurry. The material shrinkage was measured for a total duration of about 8-weeks while curing the material at 75° F./50% Relative Humidity (RH).

The following important conclusions can be drawn from this investigation:

Contrary to the shrinkage bars of comparative Example 4 (with no calcium sulfate) which cracked even before de-molding, the shrinkage bars of Example 8 comprising calcium aluminate cement, anhydrous calcium sulfate (anhydrite), and alkali citrate were completely stable and did not result in any cracks either prior to or after de-molding.

The geopolymeric cementitious compositions of some embodiments of the invention comprising of fly ash, calcium aluminate cement, calcium sulfate (anhydrite), and alkali citrate has a maximum shrinkage between 0.21% to 0.26% in comparison to a maximum shrinkage of about 0.75% for the comparative mixture composition containing fly ash and alkali citrate only (Example 1) and about 0.62% for comparative Mix 1 of the present example which also contains fly ash and alkali citrate only.

The lowest shrinkage was obtained for Mix 2 comprising calcium aluminate cement at 30 wt % of fly ash amount and calcium sulfate (anhydrite) at 33.3 wt % of calcium aluminate amount.

Compressive Strength

TABLE 21 shows the compressive strength behavior of the developed geopolymeric cementitious compositions of the invention comprising of fly ash, calcium aluminate cement, calcium sulfate (anhydrite), and alkali citrate investigated in Example 8.

TABLE 21

Compressive Strength of Example 8 - (psi)

| | 4 hour | 24 hour | 7 day | 28 day |
|---|---|---|---|---|
| Mix 1 - Comparative Composition | 3031 | 5028 | 8339 | 10051 |
| Mix 2 | 2831 | 4715 | 8431 | 12454 |
| Mix 3 | 5032 | 6789 | 8462 | 10804 |
| Mix 4 | 6173 | 8183 | 10461 | 12628 |

The example studied the influence of incorporation of calcium aluminate cement in combination with calcium sulfate in the form of anhydrite on both the early age and ultimate compressive strength behavior of the developed geopolymeric cementitious compositions of the invention. The following important observations can be drawn from this study:

The compressive strength of the geopolymer cementitious compositions of the invention investigated in this example continued to increase as a function of time.

Both the early age compressive strength and the ultimate compressive strength of the mixture composition without calcium sulfate (Comparative Mix 1) were lower in comparison to those for the cementitious compositions of the invention comprising calcium sulfate (Mixes 2 through 4).

The early age (4-hour and 24-hour) compressive strengths of geopolymeric cementitious compositions of the invention comprising calcium aluminate cement and calcium sulfate in the form of anhydrite were exceptionally high. For example, Mix 3 comprising calcium aluminate cement at a amount of 60 wt % of fly ash and anhydrite at a amount of 33.33 wt % of calcium aluminate cement achieved a compressive strength of 5032 psi in just 4 hours and 6789 psi in 24 hours. Similarly, Mix 4 comprising calcium aluminate cement at a amount of 80 wt % of fly ash and anhydrite at a amount of 33.33 wt % of calcium aluminate cement achieved a compressive strength of 6173 psi in just 4 hours and 8183 psi in 24 hours.

The 28-day compressive strengths of all geopolymeric cementitious compositions of the invention comprising fly ash, calcium aluminate, calcium sulfate in the form of anhydrite, and potassium citrate were exceptionally high and in excess of 10000 psi.

Thus it has been very surprisingly found that the use of insoluble anhydrous calcium sulfate (anhydrite or dead burnt anhydrite) provided a faster set, a superior rate of compressive strength development, and a higher ultimate compressive strength than those obtained with the use of a relatively higher soluble calcium sulfate dihydrate (see Example 7).

Another unexpected feature of embodiments of this invention is the dependence of setting behavior and compressive strength on the type of calcium sulfate used in the compositions of the invention.

Example 9

TABLE 22 shows the raw material compositions of the geopolymeric cementitious mixtures investigated in this Example, as shown in TABLE 6.

The amount of calcium aluminate cement used in the mixture compositions of this example was equal to 40 wt % of the weight of fly ash. Landplaster was added at an amount of 33.3 wt % of the weight of calcium aluminate cement and 13.3 wt % of the Class C fly ash. Sodium citrate dihydrate was used as the alkali metal chemical activator in all mixture compositions investigated. The water to cementitious materials ratio utilized in this investigation was equal to 0.30. QUIKRETE Commercial Grade Fine Sand No. 1961 and BASF CASTAMENT FS20 superplasticizer.

TABLE 22

Compositions investigated in Example 9

| Raw Material | Mix #1 | Mix 2 | Mix 3 | Mix 4 |
| --- | --- | --- | --- | --- |
| Fly Ash Class C (grams) | 1957 | 1957 | 1957 | 1957 |
| Calcium Sulfate Dihydrate (grams) | 261 | 261 | 261 | 261 |
| Calcium Aluminate Cement (grams) | 783 | 783 | 783 | 783 |
| Total Cementitious Materials (grams) | 3000 | 3000 | 3000 | 3000 |
| Sand (grams) | 2250 | 3150 | 4550 | 7500 |
| Sodium Citrate Dihydrate | 60 | 60 | 60 | 60 |
| Superplasticizer (grams) | 15 | 15 | 15 | 15 |
| Water (grams) | 900 | 900 | 900 | 900 |
| Water/Cementitious Materials Ratio | 0.30 | 0.30 | 0.30 | 0.30 |
| Sand/Cementitious Materials Ratio | 0.75 | 1.05 | 1.50 | 2.5 |
| Superplasticizer/Cementitious Materials, wt % | 0.5% | 0.5% | 0.5% | 0.5% |
| Sodium Citrate/Cementitious Materials, wt % | 2% | 2% | 2% | 2% |
| Calcium Aluminate Cement/Fly ash, wt % | 40% | 40% | 40% | 40% |
| Calcium Sulfate/Calcium Aluminate Cement, wt % | 33.3% | 33.3% | 33.3% | 33.3% |

Slump and Early Age Cracking Behavior of Material

TABLE 23 shows the initial flow behavior and slump characteristics of the geopolymeric cementitious compositions of an embodiment of the invention comprising of fly ash, calcium aluminate cement, calcium sulfate dihydrate (fine-grained last plaster), and alkali citrate investigated in Example 9.

TABLE 23

Flow and Slump of Example 9

|  | Flow | Slump (inches) |
| --- | --- | --- |
| Mix 1 | 10 | 10 |
| Mix 2 | 10 | 10 |
| Mix 3 | 8 | 8 |
| Mix 4 | 1 | 2 |

Mixture compositions with sand/cementitious materials ratio ranging from 0.75 to 1.50 (Mixes 1, 2 and 3) had good flow behavior as observed in the slump test. On the other hand, the mixture composition with sand/cementitious materials ratio of 2.5 (Mix 4) was very stiff with poor flow properties.

Shrinkage Behavior

Figure 9A:
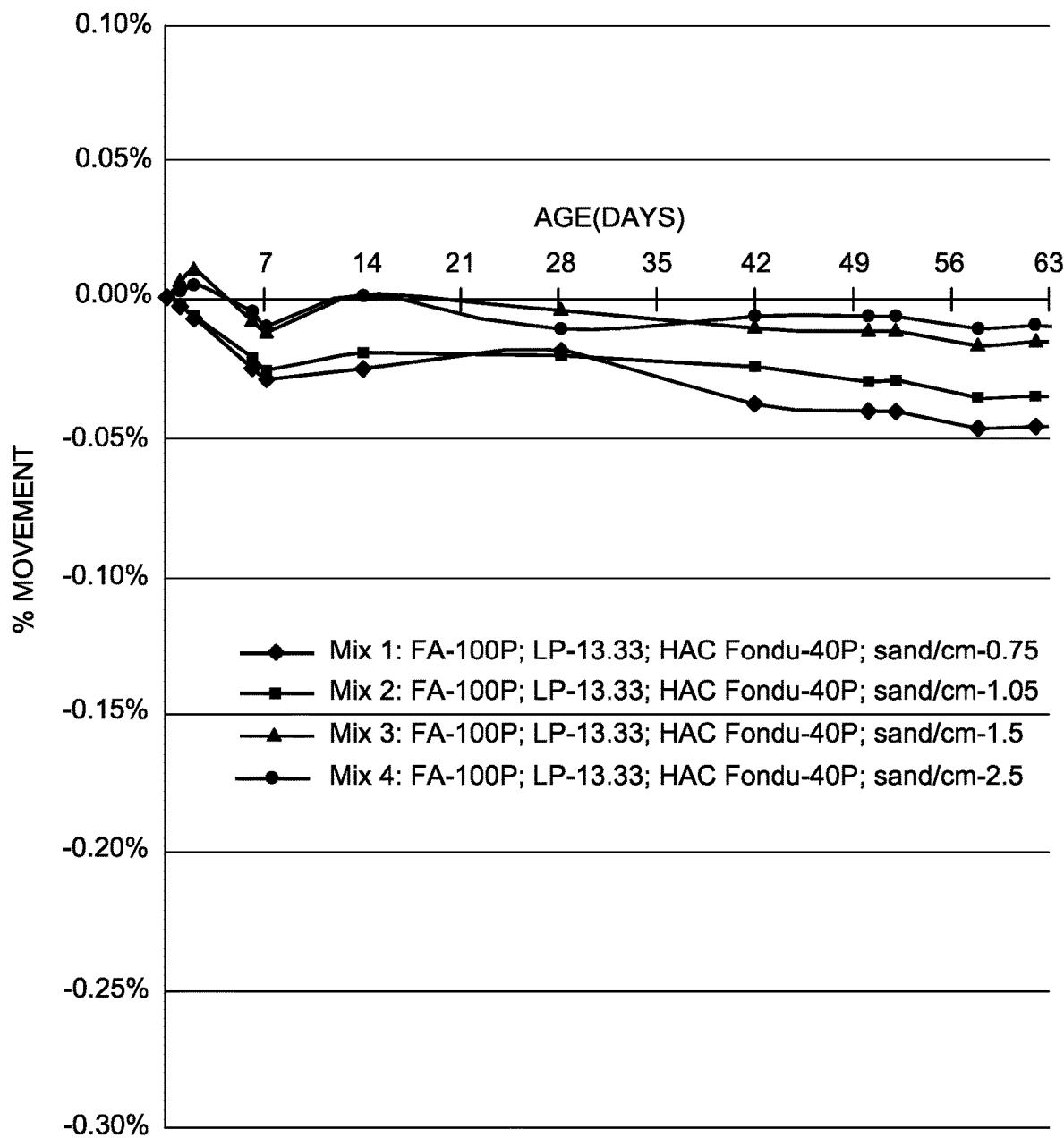
FIG. 9A is a graph of shrinkage of compositions in Example 9

FIG. 9A shows shrinkage behavior of geopolymeric cementitious compositions of the invention investigated in Example 9. The main objective of this investigation was to study the influence of incorporation of calcium aluminate cement in combination with a fine-grained calcium sulfate dihydrate (landplaster) and an alkali citrate on shrinkage behavior of the developed geopolymeric cementitious compositions of the invention containing different amount of sand in the mixture.

The shrinkage measurements were initiated at an age of 4-hours from the time the raw materials were mixed together to form an aqueous slurry. The material shrinkage was measured for a total duration of about 8-weeks while curing the material at 75° F./50% RH.

The following conclusions are drawn from this example and FIG. 9A:

Unlike the shrinkage bars of comparative Example 4 (Mix 2 with no calcium sulfate), which cracked before de-molding, the shrinkage bars of Example 9 comprising calcium sulfate dihydrate in the form of fine-grained landplaster were completely stable and did not crack prior to or after de-molding.

The geopolymeric cementitious compositions of the invention (Example 9) comprising fly ash, calcium aluminate cement, calcium sulfate dihydrate (fine-grained landplaster), and alkali citrate demonstrated very low shrinkage with a maximum shrinkage of less than 0.05% in comparison to a maximum shrinkage of about 0.75% for the comparative mixture composition containing fly ash and alkali citrate in Example 1.

Heat Evolution and Slurry Temperate Rise Behavior

Figure 9B:
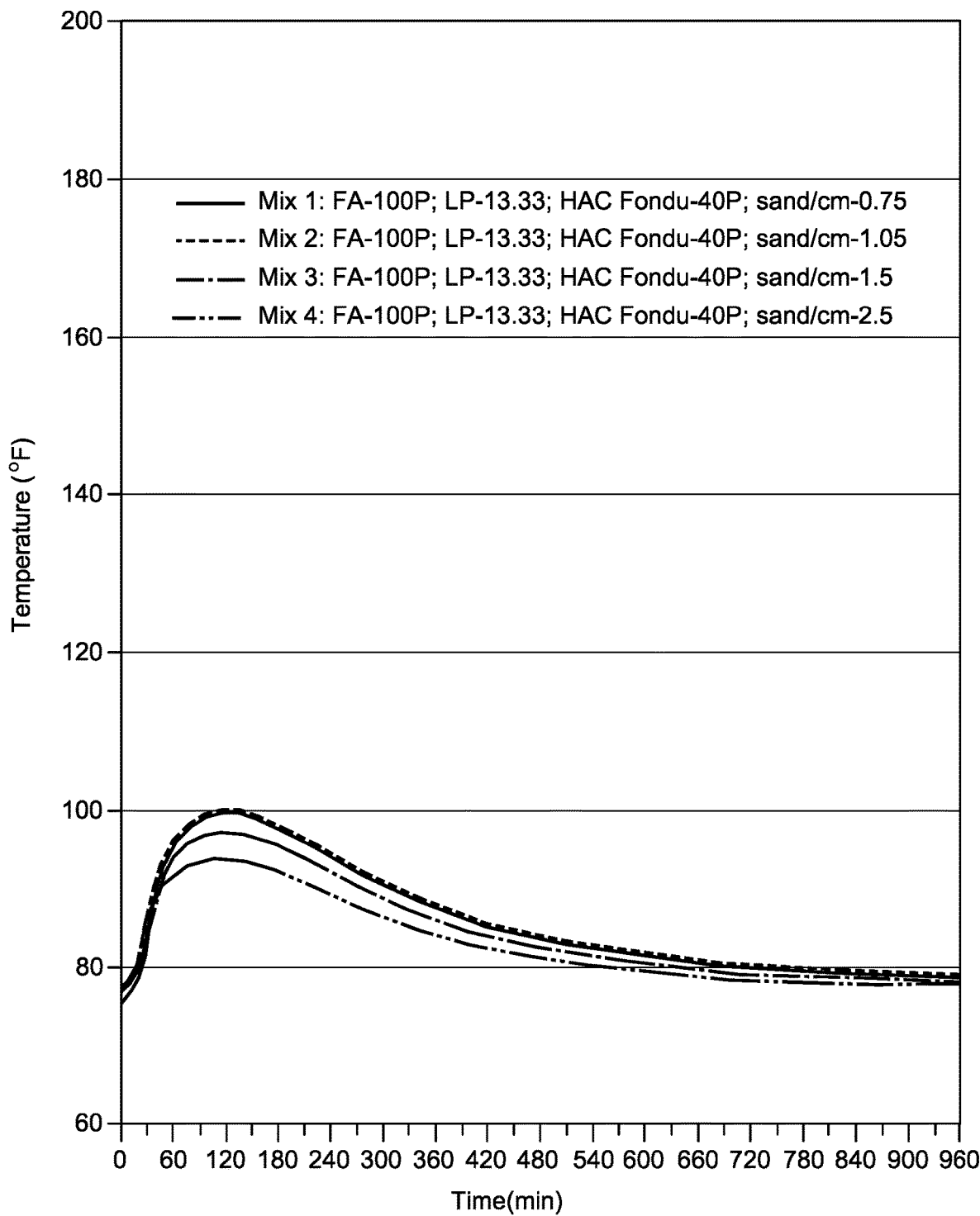
FIG. 9B is a graph of slurry temperature rise of compositions of Example 9.

FIG. 9B shows the exothermic and slurry temperature rise behavior of geopolymeric cementitious compositions of the invention investigated in Example 9. The cementitious compositions of this Example comprising fly ash, calcium aluminate cement, calcium sulfate (fine-grained landplaster), and alkali citrate demonstrated only a very moderate temperature rise behavior. The maximum temperature rise was only about 100° F. with a net temperature rise of less than 30° F. A lower degree of temperature rise is beneficial in most applications as it provides superior thermal stability and reduced potential for thermal movement and thermal cracking particularly when the material is weak during the very early stages of curing.

Time of Setting

TABLE 24 shows the time of setting of geopolymeric cementitious compositions of the invention investigated in Example 9.

TABLE 24

Setting Times of Example 9

|  | Initial Setting Time (hr:min) | Final Setting Time (hr:min) |
| --- | --- | --- |
| Mix 1 | 00:37 | 1:01 |
| Mix 2 | 00:34 | 00:56 |
| Mix 3 | 00:33 | 01:00 |
| Mix 4 | 00:30 | 00:55 |

All cementitious compositions investigated in this example had rapid setting behavior. The final setting times of the geopolymeric cementitious compositions of the invention of this example comprising fly ash, calcium aluminate cement, calcium sulfate (landplaster), and sodium citrate ranged from about 55 minutes to about 65 minutes compared to an extremely rapid final setting time of about 15 minutes for the mixture composition containing fly ash and sodium citrate only (Example 1). An extremely short setting time is problematic for some applications.

Compressive Strength

TABLE 25 shows the compressive strength behavior of the developed geopolymeric cementitious compositions of the invention comprising of fly ash, calcium aluminate cement, calcium sulfate (fine-grained landplaster), and alkali citrate investigated in Example 9.

TABLE 25

Compressive Strength of Example 9 - (psi)

|  | 4 hour | 24 hour | 7 day | 28 day |
|---|---|---|---|---|
| Mix 1 | 497 | 1307 | 1972 | 3663 |
| Mix 2 | 583 | 1256 | 2450 | 4211 |
| Mix 3 | 577 | 1343 | 2262 | 4123 |
| Mix 4 | 578 | 1114 | 2066 | 2735 |

The following observations can be drawn from this study:

The compressive strength of the geopolymeric cementitious compositions of the invention in this example continued to increase as a function of time. It can be observed that the various geopolymer compositions of the invention investigated in this example attained satisfactory early age and ultimate strength development.

Example 10

TABLE 26 shows the raw material compositions of the geopolymeric cementitious mixtures, which are the same as in Example 9.

The amount of calcium aluminate cement used in the mixture compositions of this example was equal to 40 wt % of the weight of fly ash. Calcium sulfate dihydrate (Landplaster) was added at a amount of 33.3 wt % of the weight of calcium aluminate cement and 13.3 wt % of the Class C fly ash. Potassium citrate was used as the alkali metal chemical activator in all mixture compositions in this example. The water to cementitious materials ratio utilized in this investigation was equal to 0.25. Influence of superplasticizer amount on performance of the cementitious compositions of the invention was investigated in the Example.

TABLE 26

Compositions investigated in Example 10

| Raw Material | Mix #1 | Mix 2 | Mix 3 | Mix 4 |
|---|---|---|---|---|
| Fly Ash Class C (grams) | 1957 | 1957 | 1957 | 1957 |
| Calcium Sulfate Dihydrate (grams) | 261 | 261 | 261 | 261 |
| Calcium Aluminate Cement (grams) | 783 | 783 | 783 | 783 |
| Total Cementitious Materials (grams) | 3000 | 3000 | 3000 | 3000 |
| Sand (grams) | 2250 | 3150 | 4550 | 7500 |
| Potassium Citrate | 120 | 120 | 120 | 120 |
| Superplasticizer (grams) | 0 | 15 | 15 | 15 |
| Water (grams) | 750 | 900 | 900 | 900 |
| Water/Cementitious Materials Ratio | 0.25 | 0.25 | 0.25 | 0.25 |
| Sand/Cementitious Materials Ratio | 0.75 | 0.75 | 0.75 | 0.75 |
| Superplasticizer/Cementitious Materials, wt % | 0% | 0.4% | 0.8% | 1.2% |
| Potassium Citrate/Cementitious Materials, wt % | 4% | 4% | 4% | 4% |
| Calcium Aluminate Cement/Fly ash, wt % | 40% | 40% | 40% | 40% |
| Calcium Sulfate/Calcium Aluminate Cement, wt % | 33.3% | 33.3% | 33.3% | 33.3% |

Slump and Early Age Cracking Behavior of Material

TABLE 27 shows the initial flow behavior and slump characteristics of the geopolymeric cementitious compositions of the invention comprising of fly ash, calcium aluminate cement, calcium sulfate (fine-grained last plaster), and alkali citrate investigated in Example 10.

TABLE 27

Flow and Slump of Example 10

|  | Flow | Slump (inches) |
|---|---|---|
| Mix 1 | 7 | 7 |
| Mix 2 | 8 | 9 |
| Mix 3 | 9 | 10 |
| Mix 4 | 9 | 9.5 |

It can be observed that all mixture compositions of the invention investigated in this example had good flow behavior. The flow behavior of the compositions improved with incorporation of superplasticizer in the mixture compositions. No improvement in flow and slump was observed with increase in superplasticizer amount beyond 0.80%.

Shrinkage Behavior

Figure 10:
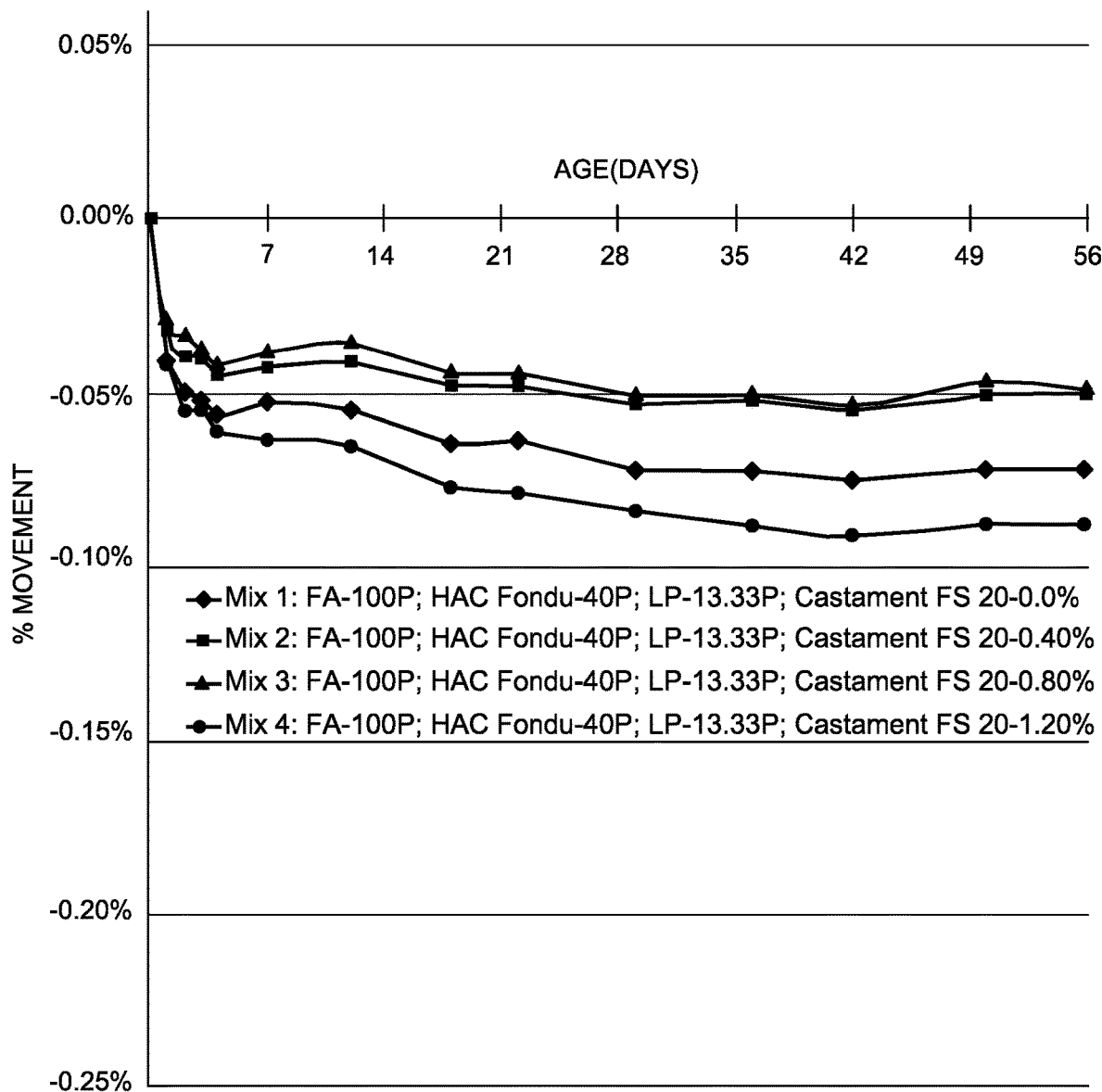
FIG. 10 is a graph of shrinkage of compositions in Example 10.

FIG. 10 shows shrinkage behavior of geopolymeric cementitious compositions of the invention investigated in Example 10. The main objective of this investigation was to study the influence of incorporation of calcium aluminate cement in combination with a fine-grained calcium sulfate dihydrate (landplaster) and an alkali citrate on shrinkage behavior of the developed geopolymeric cementitious compositions of the invention containing different amounts of superplasticizer in the mixture.

The shrinkage measurements were initiated at an age of 4-hours from the time the raw materials were mixed together to form an aqueous slurry. The material shrinkage was measured for a total duration of about 8-weeks while curing the material at 75° F./50% RH.

The following conclusions can be drawn from this investigation and FIG. 10:

Unlike the shrinkage bars of comparative Example 4 (Mix 2 with no calcium sulfate), which cracked before de-molding, the shrinkage bars of Example 10 comprising calcium sulfate in the form of fine-grained landplaster were completely stable and did not crack, either prior to or after de-molding.

The geopolymeric cementitious compositions of one embodiment of the invention (Example 10) comprising fly ash, calcium aluminate cement, calcium sulfate dihydrate (fine-grained landplaster), and alkali citrate demonstrated very low shrinkage with a maximum shrinkage of less than 0.1% in comparison to a maximum shrinkage of about 0.75% for the comparative mixture composition containing fly ash and alkali citrate (Example 1).

The amount of shrinkage increased slightly with an increase in the amount of superplasticizer. It can be observed that for Mix 2 with a superplasticizer amount of 0.4%, the maximum shrinkage was about 0.05%; on the other hand, for Mix 4 with a superplasticizer amount of 1.2%, the maximum shrinkage had increased by a small amount to a value of about 0.08%.

Compressive Strength

TABLE 28 shows the compressive strength behavior of the developed geopolymeric cementitious compositions of the invention comprising of fly ash, calcium aluminate cement, calcium sulfate (fine-grained landplaster), and alkali citrate investigated in Example 10.

TABLE 28

Compressive Strength of Example 10 - (psi)

|  | 4 hour | 24 hour | 7 day | 28 day |
| --- | --- | --- | --- | --- |
| Mix 1 | 2213 | 3362 | 4611 | 6732 |
| Mix 2 | 2280 | 3768 | 5533 | 5890 |
| Mix 3 | 2186 | 3187 | 5363 | 5819 |
| Mix 4 | 2040 | 2841 | 4902 | 4897 |

The following observations can be drawn from this study:

The compressive strength of the geopolymeric cementitious compositions of this embodiment of the invention continued to increase as a function of time. The various compositions investigated attained satisfactory early age and ultimate strength.

The early age (4-hour and 24-hour) compressive strengths of geopolymeric cementitious compositions of the invention comprising fly ash, calcium aluminate cement, calcium sulfate dihydrate (landplaster), and alkali citrate were exceptionally high and in excess of 2000 psi at the age of 4-hours and in excess of 3000 psi at the age of 24-hours.

The 28-day compressive strengths of all geopolymeric cementitious compositions of the invention comprising fly ash, calcium aluminate, calcium sulfate dihydrate (landplaster), and alkali citrate were exceptionally high ranging from about 4750 psi to about 6750 psi.

Example 11

TABLES 29 and 30 show the raw material compositions of the cementitious mixtures investigated in this Example.

The amount of calcium aluminate cement used in the mixture compositions of this example was equal to 40 wt % of the weight of fly ash. Landplaster used in this investigation added at a amount level of 33.33 wt % of the weight of calcium aluminate cement. Portland cement was added to Mix #1 through Mix #3 at amount rates of 6.1 wt %, 14 wt %, and 24.6 wt % of the total cementitious materials, respectively. The water to cementitious materials ratio was equal to 0.275 for all mixes investigated. Class C Fly Ash, Campbell Power Plant, West Olive, Mich., USG Landplaster, Ciment Fondu (HAC Fondu), Kerneos, Inc. calcium aluminate cement, Holcim Portland Cement Type I, Mason City, Iowa, QUIKRETE Commercial Grade Fine Sand No. 1961 and AdvaCast 500, WR Grace.

TABLE 29

Geopolymeric cementitious reactive powder mixture compositions of Example 11 in parts by weight

| Raw Material | Mix 1 | Mix 2 | Mix 3 |
| --- | --- | --- | --- |
| Fly Ash Class C | 100 | 100 | 100 |
| Calcium Sulfate Dihydrate | 13.3 | 13.3 | 13.3 |
| Calcium Aluminate Cement | 40 | 40 | 40 |
| Portland Cement Type I | 10 | 25 | 50 |
| Total Cementitious Materials | 163.3 | 178.3 | 203.3 |

TABLE 30

Geopolymeric cementitious compositions of Example 11

| Raw Material | Mix 1 | Mix 2 | Mix 3 |
| --- | --- | --- | --- |
| Fly Ash Class C (grams) | 1837 | 1682 | 1475 |
| Calcium Sulfate Dihydrate (grams) | 245 | 224 | 197 |
| Calcium Aluminate Cement (grams) | 735 | 673 | 590 |
| Portland Cement Type I (grams) | 184 | 421 | 738 |
| Total Cementitious Materials (grams) | 3000 | 3000 | 3000 |
| Sand (grams) | 2250 | 2250 | 2250 |
| Potassium Citrate (grams) | 120 | 120 | 120 |
| Superplasticizer (grams) | 12 | 12 | 12 |
| Water (grams) | 825 | 825 | 825 |
| Water/Cementitious Materials Ratio | 0.275 | 0.275 | 0.275 |
| Sand/Cementitious Materials Ratio | 0.75 | 0.75 | 0.75 |
| Superplasticizer/Cementitious Materials, wt % | 0.4% | 1% | 1% |
| Potassium Citrate/Fly Ash, wt % | 4% | 4% | 4% |
| Calcium Aluminate Cement/Fly ash, wt % | 40% | 40% | 40% |
| Calcium Sulfate/Calcium Aluminate Cement, wt % | 33.3% | 33.3% | 33.3% |
| Portland Cement/Cementitious Materials, wt % | 6.1% | 14% | 24.6% |

Initial Flow Behavior and Slump

TABLE 31 shows the initial flow behavior and slump characteristics of the cementitious compositions comprising of fly ash, calcium aluminate cement, calcium sulfate (landplaster), Portland cement, and alkali citrate investigated in Example 11.

TABLE 31

Flow and Slump of Example 11

|  | Flow | Slump (inches) |
| --- | --- | --- |
| Mix 1 | 9 | 9 |
| Mix 2 | 9 | 8 |
| Mix 3 | 5 | 6.75 |

The flow and slump behavior of the compositions was negatively influenced with an increase in the amount of Portland cement in the composition.

Shrinkage Behavior

Figure 11:
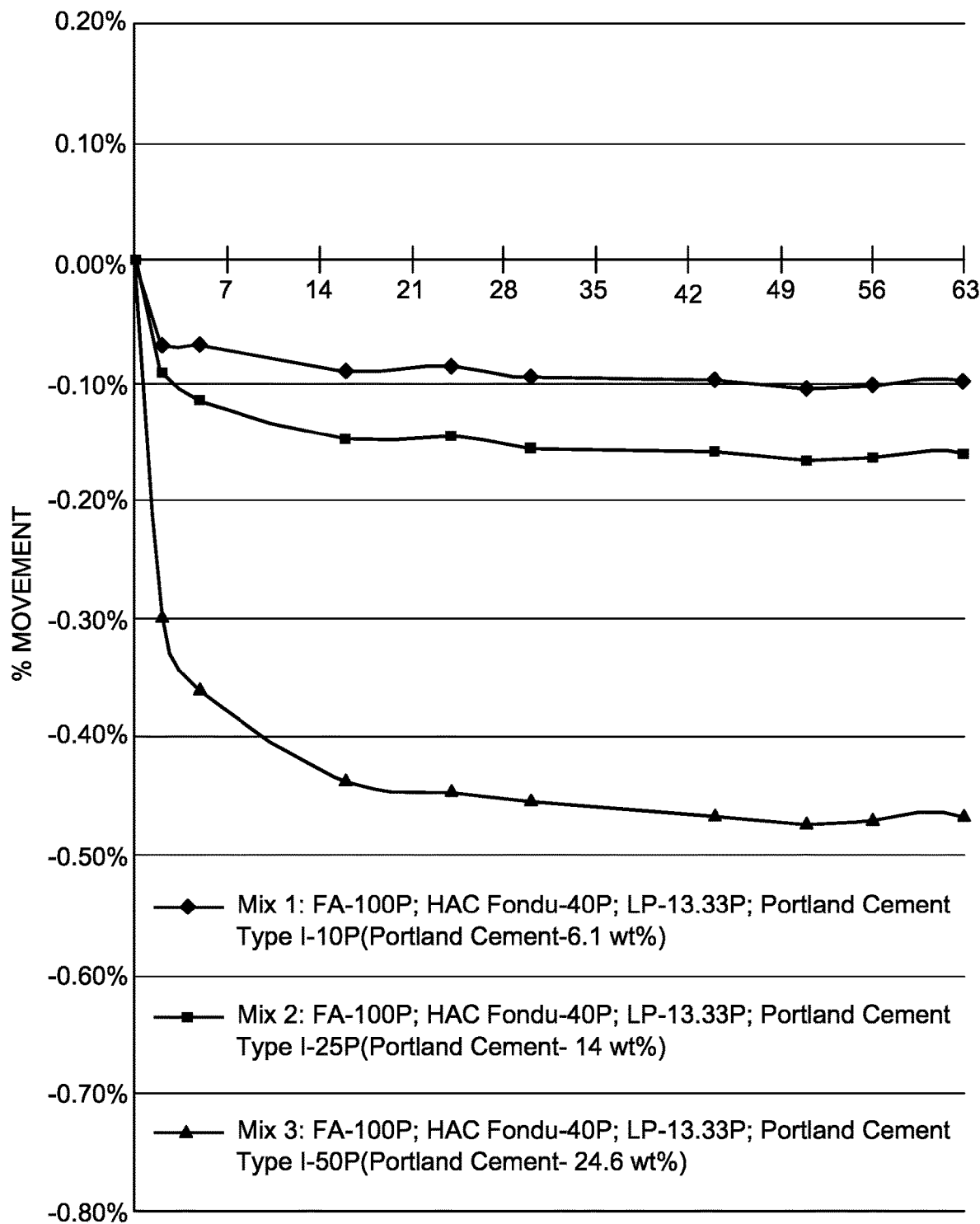
FIG. 11 is a graph of shrinkage of compositions in Example 11.

FIG. 11 shows shrinkage behavior of geopolymeric cementitious compositions of the invention investigated in Example 11. The shrinkage measurements were initiated at an age of 4 hours from the time the raw materials were mixed together to form an aqueous slurry. The material shrinkage was measured for a total duration of about 8-weeks while curing the material at 75° F./50% RH.

The following important conclusions can be drawn from this example and FIG. 11:

Incorporation of Portland cement significantly increased the shrinkage of the cementitious compositions investigated. The ultimate shrinkage values for the various mixes investigated are tabulated in TABLE 37.

TABLE 32

Ultimate shrinkage values for the mixture compositions investigated at the age of 8 weeks

| Mix Identification | Ultimate shrinkage at the age of 8 weeks (%) |
|---|---|
| Mix 1 | 0.10% |
| Mix 2 | 0.16% |
| Mix 3 | 0.47% |

As discussed in detail on the above description, this example shows the unexpected result obtained with addition of Portland cement to embodiments of the present invention were the Portland cement has a negative influence on the shrinkage behavior of the compositions. The magnitude of shrinkage is shown by this example to increase proportionately with increase in the amount of Portland cement in the compositions.

Addition of Portland cement to cementitious compositions of the invention comprising of fly ash, calcium aluminate cement, calcium sulfate, and alkali citrate significantly increasing the material shrinkage.

Based on the testing of this embodiment, addition of Portland cement in the dimensionally stable geopolymer compositions of the invention is not recommended and should be limited to very small amount, preferably not exceeding 15 wt % of the total weight of cementitious materials.

Example 12

TABLE 33 shows the raw material composition of the geopolymeric cementitious mixture investigated in this Example 12.

This example investigated incorporation of both sand and lightweight ceramic microspheres as fillers in the composition. Sodium citrate was added at an amount 2 wt % of the weight of the total cementitious materials. Calcium sulfate dihydrate as added at 13.3 wt % of the fly ash and calcium aluminate was added at 40 wt % of the Class C fly ash. Class C Fly Ash (Campbell Power Plant, West Olive, Mich.,) USG Landplaster, calcium aluminate cement (Ciment Fondu (HAC Fondu), Kerneos, Inc), QUIKRETE Commercial Grade Fine Sand No. 1961, Ceramic Microspheres (Kish Company) and BASF CASTAMENT FS20 superplasticizer.

TABLE 33 compositions of Example 12

| Raw Material | Mix A |
|---|---|
| Fly Ash Class C (grams) | 1957 |
| Calcium Sulfate Dihydrate (grams) | 261 |
| Calcium Aluminate Cement (grams) | 783 |
| Total Cementitious Materials (grams) | 3000 |
| Sand (grams) | 3150 |
| Ceramic Microspheres (grams) | 300 |
| Sodium Citrate Dihydrate (grams) | 60 |
| Superplasticizer (grams) | 15 |
| Water (grams) | 900 |
| Water/Cementitious Materials Ratio | 0.30 |
| Sand/Cementitious Materials Ratio | 1.05 |
| Ceramic Microspheres/Cementitious Materials Ratio | 0.10 |
| Superplasticizer/Cementitious Materials, wt % | 0.5% |
| Sodium Citrate/Cementitious Materials, wt % | 2% |
| Calcium Aluminate Cement/Fly ash, wt % | 40% |
| Calcium Sulfate/Fly Ash wt % | 13.3% |

Initial Flow Behavior, Slump, and Early Age Cracking Behavior of Material

TABLE 34 shows the initial flow behavior and slump of the geopolymeric cementitious composition investigated in this example comprising lightweight filler.

TABLE 34

Flow and Slump of Example 12

| | Flow | Slump (inches) |
|---|---|---|
| Mix A | 7 | 8 |

Based on the results shown in TABLE 34 it can be concluded that the mixture compositions of the invention comprising lightweight fillers have good workability and self-leveling properties.

Shrinkage Behavior

Figure 12:
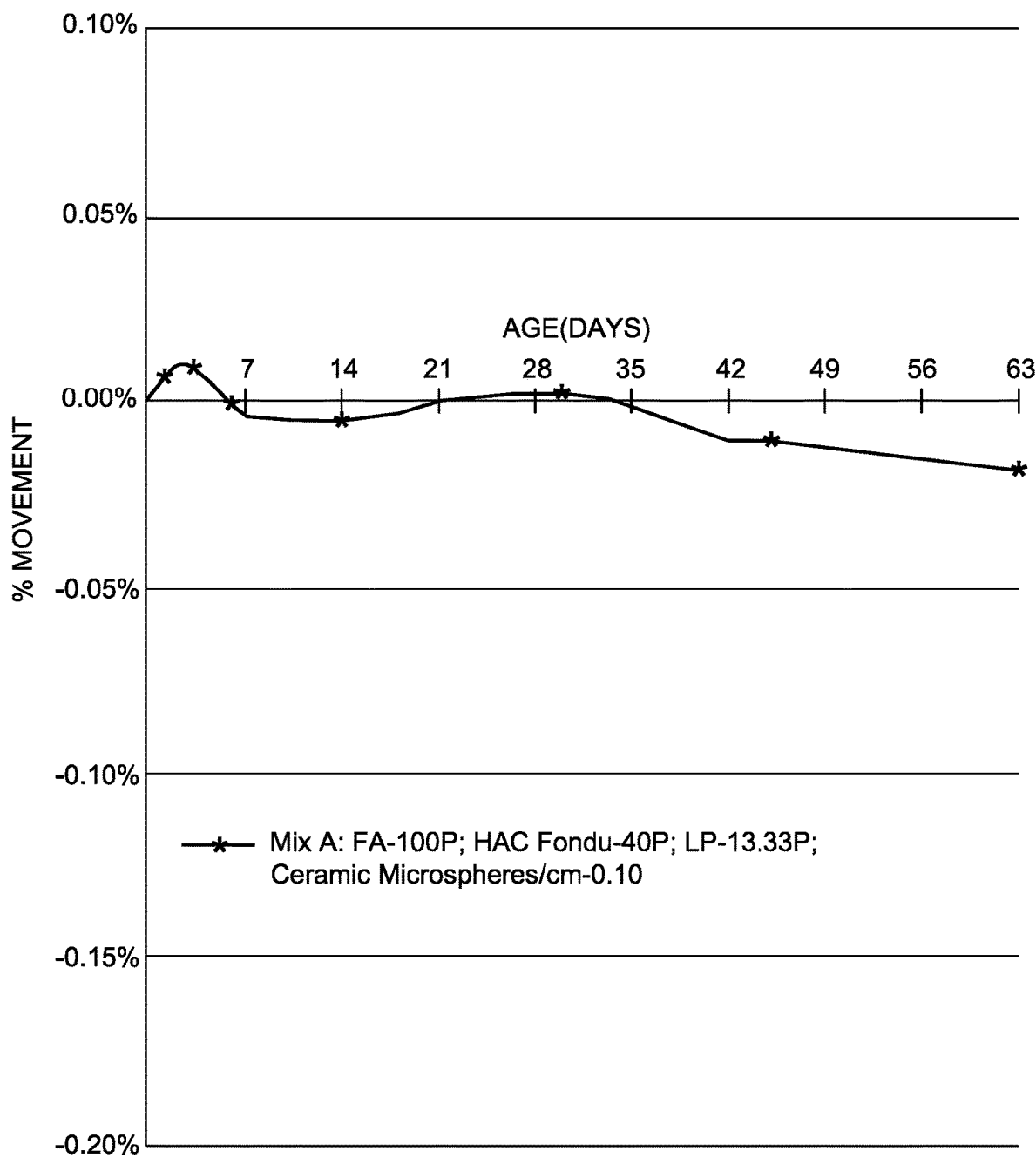
FIG. 12 is a graph of shrinkage of compositions of Example 12.

FIG. 12 shows the shrinkage behavior of geopolymeric cementitious composition of the invention investigated in Example 12.

The shrinkage measurements were initiated at an age of 4-hours from the time the raw materials were mixed together to form an aqueous slurry. The material shrinkage was measured for a total duration of about 8-weeks while curing the material at 75° F./50% RH.

It is observed that the cementitious composition of the invention incorporating lightweight filler exhibited extremely low dimensional movement as a function of time.

pH

The surface pH of the fully cured geopolymer compositions mentioned in TABLE 39 was measured according to the ASTM F710-11 test method and found to be 9.82. The Extech PH150-C Exstick Concrete pH meter was used to conduct the surface pH measurements.

Example 13

TABLE 35 shows the raw material composition of the geopolymeric cementitious mixture investigated in this Example 13. This example incorporates both calcium aluminate cement and calcium sulfoaluminate cement in the composition. Calcium sulfate dihydrate was added at 10 wt % of the Class C fly ash and calcium aluminate was added at 10, 20 and 40 wt % of the fly ash. Calcium sulfoaluminate cement was added at 20 wt % of the fly ash.

The fly ash is Class C Fly Ash, (Campbell Power Plant, West Olive, Mich.), USG Landplaster calcium sulfate dihydrate, (Denka SC1) calcium aluminate cement, FASTROCK 500 (CTS Company) calcium sulfoaluminate, QUIKRETE Commercial Grade Fine Sand No. 1961 and BASF Castament FS 20 superplasticizer were employed. Sodium citrate was added at an amount 2 wt % of the weight of the cementitious materials.

TABLE 35

Geopolymeric cementitious compositions of Example 13

| Raw Material | Mix 1 | Mix 2 | Mix 3 |
|---|---|---|---|
| Fly Ash Class C (grams) | 2857 | 3000 | 2353 |
| Calcium Sulfate Dihydrate (grams) | 286 | 300 | 235 |
| Calcium Aluminate Cement (grams) | 286 | 600 | 941 |
| Calcium Sulfoaluminate Cement (grams) | 571 | 300 | 476 |
| Total Cementitious Materials (grams) | 4000 | 4500 | 4000 |
| Sand (grams) | 4200 | 4725 | 4200 |
| Sodium Citrate dihydrate (grams) | 80 | 90 | 80 |
| Superplasticizer (grams) | 20 | 23 | 20 |
| Water (grams) | 880 | 990 | 880 |
| Water/Cementitious Materials Ratio | 0.22 | 0.22 | 0.22 |
| Sand/Cementitious Materials Ratio | 1.05 | 1.05 | 1.05 |
| Superplasticizer/Cementitious Materials, wt % | 0.5% | 0.5% | 0.5% |
| Sodium Citrate/Fly Ash, wt % | 2% | 2% | 2% |
| Calcium Aluminate Cement/Fly ash, wt % | 10% | 20% | 40% |
| Calcium Sulfoaluminate Cement/Fly ash, wt % | 20% | 20% | 20% |
| Calcium Sulfate/Calcium Sulfoaluminate Cement, wt % | 10% | 10% | 10% |

Initial Flow Behavior and Slump

TABLE 36 shows the initial flow behavior and slump characteristics of the cementitious compositions of some embodiments of the invention comprising of fly ash, calcium aluminate cement, calcium sulfoaluminate cement, calcium sulfate (landplaster), and alkali citrate investigated in Example 13.

TABLE 36

Flow and Slump of Example 13

| | Flow | Slump (inches) |
|---|---|---|
| Mix 1 | 8 | 8.5 |
| Mix 2 | 8 | 8.25 |
| Mix 3 | 5 | 7.75 |

Based on the results shown inTABLE 36, the mixture compositions of the invention comprising calcium aluminate cement and calcium sulfoaluminate cement have good workability and self-leveling properties.

Compressive Strength

TABLE 37 shows the compressive strength behavior of the developed geopolymeric cementitious compositions of some embodiments of the invention comprising of fly ash, calcium aluminate cement, calcium sulfoaluminate cement, calcium sulfate dihydrate (fine-grained landplaster), and alkali citrate investigated in Example 13.

TABLE 37

Compressive Strength of Example 13 - (psi)

| | 4 hour | 24 hour | 7 day | 28 day |
|---|---|---|---|---|
| Mix 1 | 2662 | 3448 | 4556 | 7039 |
| Mix 2 | 2893 | 3848 | 4889 | 7826 |
| Mix 3 | 2899 | 4827 | 6744 | 9915 |

The following conclusions are drawn from this study:

The compressive strength of the geopolymeric cementitious compositions of some embodiments of the invention comprising both calcium aluminate cement and calcium sulfoaluminate cement continued to increase as a function of time. The various compositions investigated attained satisfactory early age and ultimate strength.

The early age (4-hour and 24-hour) compressive strengths of geopolymeric cementitious compositions of some embodiments of the invention comprising fly ash, calcium aluminate cement, calcium sulfoaluminate cement, calcium sulfate dihydrate (landplaster), and alkali citrate were exceptionally high and in excess of about 2500 psi at the age of 4-hours and in excess of about 3400 psi at the age of 24-hours.

The 28-day compressive strengths of all geopolymeric cementitious compositions of some embodiments of the invention comprising fly ash, calcium aluminate, calcium sulfoaluminate cement, calcium sulfate (landplaster), and alkali citrate were exceptionally high and in excess of about 7000 psi.

Example 14

This example shows the physical properties of the developed geopolymer cementitious compositions of the invention comprising fly ash, calcium aluminate cement, calcium sulfate in the form of fine-grained calcium sulfate dihydrate and alkali citrate. TABLE 38 shows the raw material compositions of the geopolymer cementitious mixtures investigated in this Example. All mixtures contained calcium aluminate cement in which the main calcium aluminate phase was dodecacalcium hepta-aluminate ($12CaO.7Al_2O_3$ or $C_{12}A_7$). This calcium aluminate cement is commercially available with trade name TERNAL EV from Kerneos Inc. The amount of calcium aluminate cement used in the mixture compositions of this example was equal to 10 wt %, 20 wt %, 30 wt % and 40 wt % of the weight of fly ash. The fine grained calcium sulfate dihydrate used in this example had a mean particle size equal to 13 microns available from the USG Company with trade name USG Terra Alba Filler. Calcium sulfate dihydrate was added at a amount of 50 wt % of the weight of calcium aluminate cement and 5, 10, 15 and 20 wt. % of the fly ash in the mixture compositions investigated.

TABLE 38

Geopolymer compositions of Example 14

| Raw Material | Mix 1 | Mix 2 | Mix 3 | Mix 4 |
|---|---|---|---|---|
| Fly Ash Class C (grams)[1] | 5217 | 4615 | 4138 | 3750 |
| Calcium Sulfate Dihydrate[2] (grams) | 261 | 462 | 621 | 750 |
| Calcium Aluminate Cement[3] (grams) | 522 | 923 | 1241 | 1500 |
| Total Cementitious Materials (grams) | 6000 | 6000 | 6000 | 6000 |
| Sand (grams)[4] | 6900 | 6900 | 6900 | 6900 |

TABLE 38-continued

Geopolymer compositions of Example 14

| Raw Material | Mix 1 | Mix 2 | Mix 3 | Mix 4 |
|---|---|---|---|---|
| Potassium Citrate Tribasic Monohydrate (grams) | 120 | 120 | 120 | 120 |
| Superplasticizer (grams)[5] | 30 | 30 | 30 | 30 |
| Citric Acid Anhydrous | 30 | 30 | 30 | 30 |
| Sodium Gluconate | 15 | 15 | 15 | 15 |
| Defoamer and Wetting Agent[6] | 12 | 12 | 12 | 12 |
| Rheology Modifier[7] | 0.36 | 0.36 | 0.36 | 0.36 |
| Smectite Clay[8] | 0.60 | 0.60 | 0.60 | 0.60 |
| Colorant[9] | 4.5 | 4.5 | 4.5 | 4.5 |
| Water (grams) | 1800 | 1800 | 1800 | 1800 |
| Water/Cementitious Materials Ratio | 0.30 | 0.30 | 0.30 | 0.30 |
| Sand/Cementitious Materials Ratio | 1.15 | 1.15 | 1.15 | 1.15 |
| Superplasticizer/ Cementitious Materials, wt % | 0.5% | 0.5% | 0.5% | 0.5% |
| Potassium Citrate/ Cementitious Materials, wt % | 2% | 2% | 2% | 2% |
| Calcium Aluminate Cement/Fly ash, wt % | 10% | 20% | 30% | 40% |
| Calcium Sulfate/ Calcium Aluminate Cement, wt % | 50% | 50% | 50% | 50% |

[1]Class C Fly Ash, Campbell Power Plant, West Olive, MI
[2]USG Terra Alba Filler
[3]Ternal EV, Kerneos Inc.
[4]QUIKRETE Commercial Grade Fine Sand No. 1961
[5]BASF CASTAMENT FS20
[6]SURFYNOL 500S
[7]MOMENTIVE AXILAT RH 100 XP
[8]BENTONE CT HECTORITE clay
[9]Yipin Black S350M Iron Oxide Pigment Slump Behavior and Early Age Cracking Behavior of Material TABLE 39 shows the slump behavior of the geopolymer cementitious compositions of the invention comprising fly ash, calcium aluminate cement, calcium sulfate dihydrate, and alkali citrate in Example 14.

TABLE 39

Flow and Slump of Example 14

| | Slump (inches) |
|---|---|
| Mix 1 | 6⅞" |
| Mix 2 | 8⅜" |
| Mix 3 | 8¾" |
| Mix 4 | 8½" |

All mixture compositions investigated had good fluidity as observed in the slump test.

The slump patties for all four mixes comprising fine-grained calcium sulfate dihydrate were in excellent condition and did not develop any cracking.

Shrinkage Behavior

Figure 13:
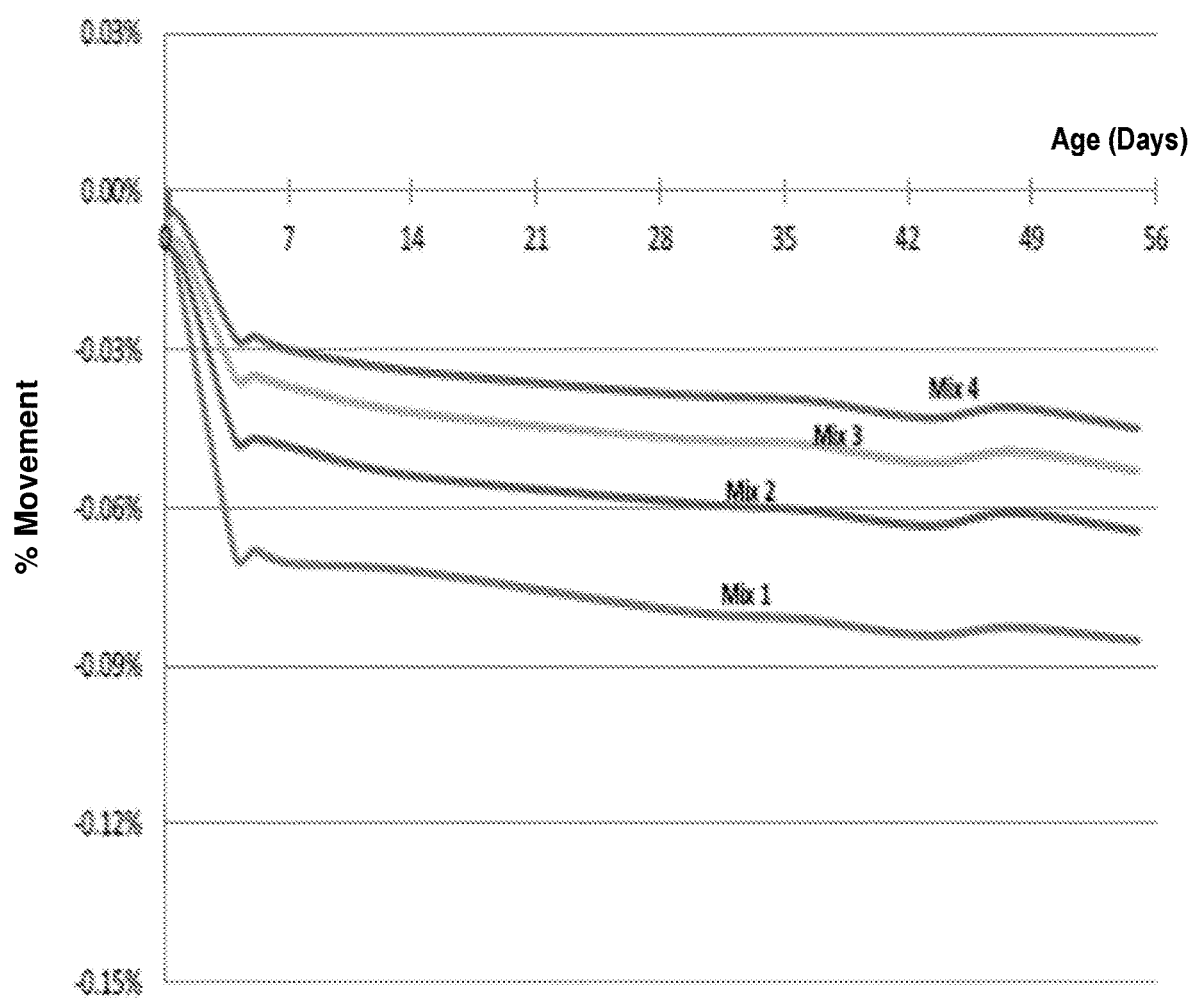
FIG. 13 is a graph of shrinkage of compositions in Example 14

FIG. 13 shows shrinkage behavior of geopolymer cementitious compositions of the invention in Example 14. The shrinkage measurements were initiated at an age of 4-hours from the time the raw materials were mixed together to form an aqueous slurry. The material shrinkage was measured for a total duration of about 8-weeks while curing the material at 75° F./50% Relative Humidity (RH).

The following important conclusions can be drawn from this investigation:

Contrary to the shrinkage bars of comparative Example 4 (with no calcium sulfate) which cracked even before de-molding, the shrinkage bars of Example 14 comprising calcium aluminate cement, calcium sulfate dihydrate, and alkali citrate were completely stable and did not result in any cracks either prior to or after de-molding.

The geopolymer cementitious compositions of some embodiments of the invention comprising fly ash, calcium aluminate cement, calcium sulfate dihydrate, and alkali citrate has a maximum shrinkage between 0.04% to 0.08% in comparison to a maximum shrinkage of about 0.75% for the comparative mixture composition containing fly ash and alkali citrate only (Example 1).

The amount of maximum shrinkage decreased with increase in the amount of calcium aluminate cement in the composition. Mix 1 comprising calcium aluminate cement at 10 wt % of fly ash amount had a maximum shrinkage of about 0.08%; on the other hand, the Mix 3 comprising calcium aluminate cement at 30 wt % of fly ash amount had a maximum shrinkage of only about 0.05% and the Mix 4 comprising calcium aluminate cement at 40 wt % of fly ash amount had a maximum shrinkage of only about 0.04%.

Time of Setting

TABLE 40 shows the time of setting of geopolymer cementitious compositions of the invention investigated in Example 14.

TABLE 40

Setting Times of Example 14

| | Initial Setting Time (hr:min) | Final Setting Time (hr:min) |
|---|---|---|
| Mix 1 | 01:07 | 1:09 |
| Mix 2 | 01:07 | 01:11 |
| Mix 3 | 01:08 | 01:16 |
| Mix 4 | 01:09 | 01:15 |

All geopolymer cementitious compositions investigated in this example had a rapid setting behavior. The final setting times of the geopolymer cementitious compositions of the invention of this example ranged from about 69 minutes to about 76 minutes compared to an extremely rapid final setting time of about 15 minutes for the mixture composition containing fly ash and sodium citrate only (Example 1). It should be noted that an extremely short setting time can be problematic for some applications.

Compressive Strength

TABLE 41 shows the compressive strength behavior of the developed geopolymer cementitious compositions of the invention comprising fly ash, calcium aluminate cement, calcium sulfate dihydrate, and alkali citrate investigated in Example 14.

TABLE 41

Compressive Strength of Example 14 (psi)

| | 4 hour | 24 hour | 7 day | 28 day | 56 day |
|---|---|---|---|---|---|
| Mix 1 | 569 | 910 | 2067 | 7479 | 8318 |
| Mix 2 | 955 | 1527 | 2559 | 7793 | 9691 |
| Mix 3 | 1318 | 2012 | 2704 | 5348 | 8636 |
| Mix 4 | 1733 | 2494 | 2832 | 5239 | 7134 |

The example studied the influence of incorporation of calcium aluminate cement in combination with fine-grained calcium sulfate dihydrate on both the early age and ultimate compressive strength behavior of the developed geopolymer cementitious compositions of the invention. The following important observations can be drawn from this study:

The compressive strength of the geopolymer cementitious compositions of the invention investigated in this example continued to increase as a function of time. The 28-day compressive strengths of all geopolymer cementitious compositions of the invention comprising fly ash, calcium aluminate cement, calcium sulfate dihydrate, and potassium citrate were exceptionally high and in excess of 5000 psi. Moreover, the 56-day compressive strengths of all geopolymer cementitious compositions of the invention were even greater and in excess of 7000 psi.

The Mix 2 comprising calcium aluminate cement at 20 wt % of fly ash amount yielded the highest ultimate compressive strength in excess of 9500 psi at the age of 56 days.

Example 15

This example depicts influence of different forms of calcium sulfates on the physical properties of the developed geopolymer cementitious compositions of the invention comprising fly ash, calcium aluminate cement, calcium sulfate, and an alkali citrate. Three different types of calcium sulfates were compared—calcium sulfate dihydrate, anhydrous calcium sulfate (anhydrite), and calcium sulfate dihydrate. TABLE 42 shows the raw material compositions of the geopolymer cementitious mixtures investigated in this Example. All mixtures contained calcium aluminate cement in which the main calcium aluminate phase was dodecacalcium hepta-aluminate (12CaO.7Al$_2$O$_3$ or C$_{12}$A$_7$). This calcium aluminate cement is commercially available with trade name TERNAL EV from Kerneos Inc. The amount of calcium aluminate cement used in the mixture compositions of this example was equal to 20 wt % of the weight of fly ash. The type of calcium sulfate contained in the various mixture compositions investigated in this example was as follows: calcium sulfate dihydrate in Mix 1, anhydrous calcium sulfate (anhydrite) in Mix 2, and calcium sulfate hemihydrate in Mix 3. All calcium sulfates were added at an amount equal to 50 wt % of the weight of calcium aluminate cement and 10 wt. % of the fly ash in the mixture compositions investigated.

TABLE 42

Geopolymer compositions of Example 15

| Raw Material | Mix 1 | Mix 2 | Mix 3 |
|---|---|---|---|
| Fly Ash Class C (grams)[1] | 4615 | 4615 | 4615 |
| Calcium Sulfate Dihydrate[2] (grams) | 462 | — | — |
| Anhydrous Calcium Sulfate (Anhydrite)[3] (grams) | — | 462 | — |
| Calcium Sulfate Hemihydrate[4] (grams) | — | — | 462 |
| Calcium Aluminate Cement[5] (grams) | 923 | 923 | 923 |
| Total Cementitious Materials (grams) | 6000 | 6000 | 6000 |
| Sand (grams)[6] | 6900 | 6900 | 6900 |
| Potassium Citrate Tribasic Monohydrate (grams) | 120 | 120 | 120 |
| Superplasticizer (grams)[7] | 30 | 30 | 30 |
| Citric Acid Anhydrous | 30 | 30 | 30 |
| Sodium Gluconate | 12 | 12 | 12 |
| Defoamer and Wetting Agent[8] | 15 | 15 | 15 |
| Rheology Modifier[9] | 0.36 | 0.36 | 0.36 |
| Smectite Clay[10] | 0.60 | 0.60 | 0.60 |
| Colorant[11] | 4.5 | 4.5 | 4.5 |
| Water (grams) | 1800 | 1800 | 1800 |
| Water/Cementitious Materials Ratio | 0.30 | 0.30 | 0.30 |
| Sand/Cementitious Materials Ratio | 1.15 | 1.15 | 1.15 |
| Superplasticizer/Cementitious Materials, wt % | 0.5% | 0.5% | 0.5% |
| Potassium Citrate/Cementitious Materials, wt % | 2% | 2% | 2% |
| Calcium Aluminate Cement/Fly ash, wt % | 20% | 20% | 20% |
| Calcium Sulfate/Calcium Aluminate Cement, wt % | 50% | 50% | 50% |

[1]Class C Fly Ash, Campbell Power Plant, West Olive, MI
[2]USG Terra Alba Filler
[3]USG Snow White Filler
[4]USG Hydrocal C-Base
[5]Ternal EV, Kerneos Inc.
[6]QUIKRETE Commercial Grade Fine Sand No. 1961
[7]BASF CASTAMENT FS20
[8]SURFYNOL 500S
[9]MOMENTIVE AXILAT RH 100 XP
[10]BENTONE CT HECTORITE clay
[11]Yipin Black S350M Iron Oxide Pigment Slump Behavior and Early Age Cracking Behavior of Material TABLE 43 shows the slump behavior of the geopolymer cementitious compositions of the invention investigated in Example 15.

TABLE 43

Slump behavior of Example 15

| | Slump (inches) |
|---|---|
| Mix 1 | 8⅜" |
| Mix 2 | 11¼" |
| Mix 3 | 10½" |

All mixture compositions investigated had good fluidity as observed in the slump test. It is noteworthy that the mixture compositions with anhydrous calcium sulfate (Mix 2) and calcium sulfate hemihydrate (Mix 3) yielded better fluidity in comparison to the mix containing calcium sulfate dihydrate (Mix 1).

The slump patties for all three mixes comprising different forms of calcium sulfate were in excellent condition and did not develop any cracking.

Shrinkage Behavior

Figure 14:
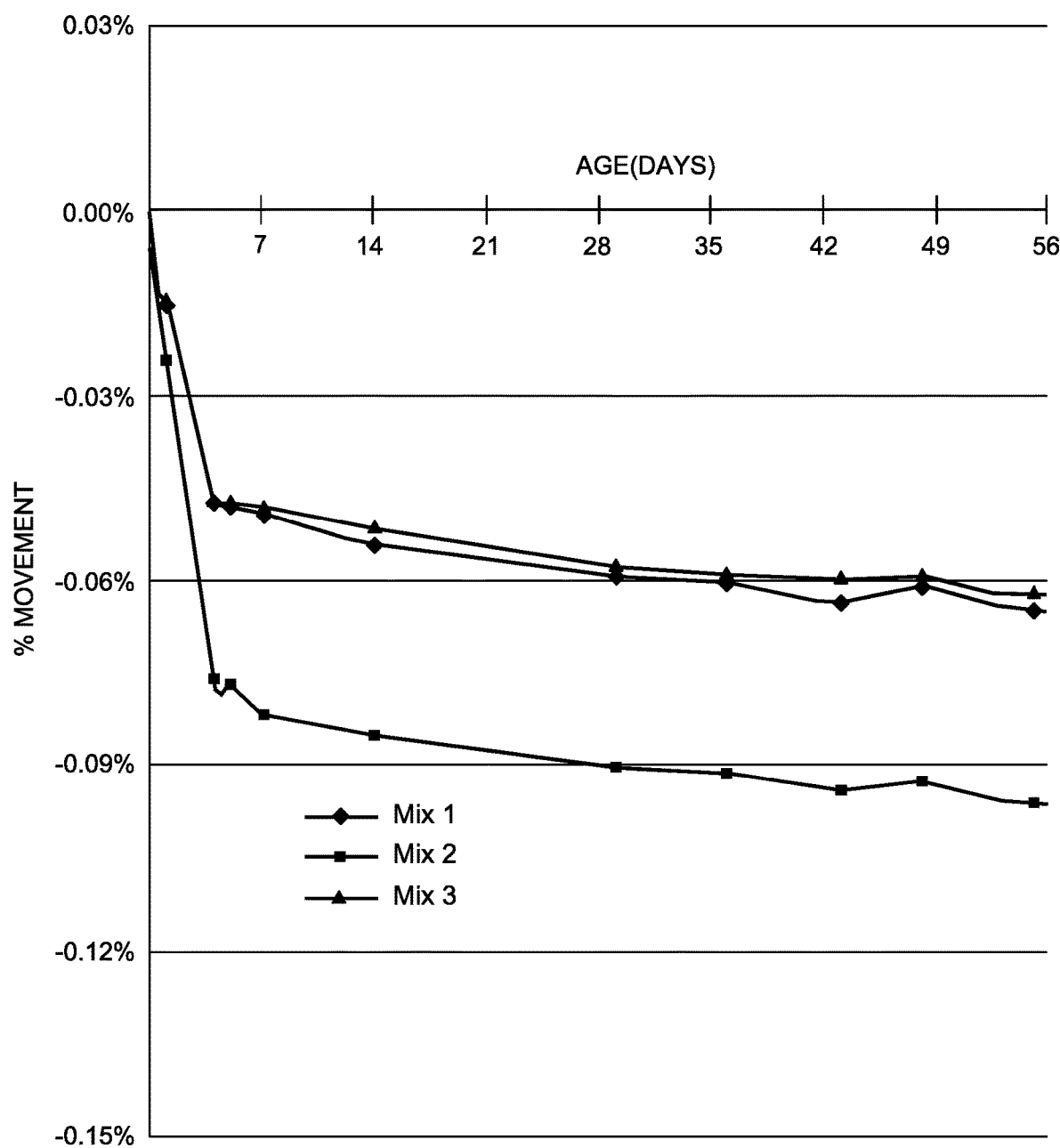
FIG. 14 is a graph of shrinkage of compositions in Example 15

FIG. 14 shows shrinkage behavior of geopolymer cementitious compositions of the invention investigated in Example 15. The shrinkage measurements were initiated at an age of 4-hours from the time the raw materials were mixed together to form an aqueous slurry. The material shrinkage was measured for a total duration of about 8-weeks while curing the material at 75° F./50% Relative Humidity (RH).

The following important conclusions can be drawn from this investigation:

Contrary to the shrinkage bars of comparative Example 4 (with no calcium sulfate) which cracked before de-molding, the shrinkage bars of Example 15 comprising calcium aluminate cement, different forms of calcium sulfate, and alkali citrate were completely stable and did not result in any cracks prior to or after de-molding.

The geopolymer cementitious compositions of some embodiments of the invention comprising fly ash, calcium aluminate cement, different forms of calcium sulfate, and alkali citrate had a maximum shrinkage between 0.06% to 0.10% in comparison to a maximum shrinkage of about 0.75% for the comparative mixture composition containing fly ash and alkali citrate only (Example 1).

The amount of maximum shrinkage varied with the type of calcium sulfate in the composition. Mix 1 comprising calcium sulfate dihydrate and Mix 3 comprising calcium sulfate hemihydrate, had a lower maximum shrinkage of about 0.06% in comparison to Mix 3 comprising anhydrous calcium sulfate (anhydrite) that yielded a maximum shrinkage of about 0.10%

Time of Setting

TABLE 44 shows the time of setting of geopolymer cementitious compositions of the invention investigated in Example 15.

TABLE 44

Setting Times of Example 15

| | Initial Setting Time (hr:min) | Final Setting Time (hr:min) |
|---|---|---|
| Mix 1 | 01:07 | 01:11 |
| Mix 2 | 00:33 | 00:42 |
| Mix 3 | 00:45 | 00:55 |

All geopolymer cementitious compositions investigated in this example demonstrated a rapid setting behavior. The final setting times of the geopolymer cementitious compositions of the invention of this example ranged from about 42 minutes to about 71 minutes compared to an extremely rapid final setting time of about 15 minutes for the mixture composition containing fly ash and sodium citrate only (Example 1). It should be noted that an extremely short setting time can be problematic for some applications.

Time of setting of the geopolymer cementitious compositions of the invention depended upon the type of calcium sulfate employed as part of the mixture composition. The composition comprising anhydrous calcium sulfate (anhydrite) (Mix 2) yielded the fastest time of setting; on the hand, the other inventive composition (Mix 1) comprising calcium sulfate dihydrate provided the longest time of setting.

Compressive Strength

TABLE 45 shows the compressive strength behavior of the developed geopolymer cementitious compositions of the invention comprising different types of calcium sulfate investigated in Example 15.

TABLE 45

Compressive Strength of Example 15 (psi)

| | 4 hour | 24 hour | 7 day | 28 day | 56 day |
|---|---|---|---|---|---|
| Mix 1 | 955 | 1527 | 2559 | 7793 | 9691 |
| Mix 2 | 1538 | 2363 | 3477 | 10522 | 11239 |
| Mix 3 | 1064 | 1661 | 2585 | 7114 | 7605 |

This example studied the influence of incorporation of different types of calcium sulfate on both the early age and ultimate compressive strength behavior of the developed geopolymer cementitious compositions of the invention. The following important observations can be drawn from this study:

The compressive strength of the geopolymer cementitious compositions of the invention continued to increase as a function of time irrespective of the type of calcium sulfate used in the mixture.

Both the 28-day and 56-day compressive strengths of the geopolymer cementitious compositions of the invention comprising different types of calcium sulfate, fly ash, calcium aluminate cement, and potassium citrate were exceptionally high and in excess of 7000 psi.

Mix 2 comprising anhydrous calcium sulfate (anhydrite) had the fastest rate of compresstive strength development and the highest ultimate compressive strength in comparison to the mixes with calcium sulfate dihydrate (Mix 1) and calcium sulfate hemihydrate (Mix 3).

The ultimate compressive strength of the geopolymer composition of the invention comprising anhydrous calcium sulfate (anhydrite) was in excess of 10,000 psi.

Examples 16

This example studies the physical properties of developed geopolymer cementitious compositions of this embodiment of the invention comprising fly ash, calcium aluminate cement, calcium sulfate hemihydrate with either an alkali metal hydroxide (sodium hydroxide) or a mixture of an alkali metal hydroxide (sodium hydroxide) and an alkali metal acid (citric acid).

TABLE 46 shows the raw material compositions of the geopolymer cementitious mixtures investigated in this example. All mixtures contained calcium aluminate cement in which the main calcium aluminate phase was dodecacalcium hepta-aluminate ($12CaO.7Al_2O_3$ or $C_{12}A_7$). This calcium aluminate cement is commercially available with trade name TERNAL EV from Kerneos Inc. The amount of calcium aluminate cement used in the mixture compositions of this example was equal to 20 wt % the weight of fly ash. One mix (Mix 2) investigated contained only sodium hydroxide as the chemical activator and no citric acid. In Mix 3, Mix 4 and Mix 5, a mixture of sodium hydroxide and citric acid was added to the cementitious compositions of the invention to act as a chemical activator. Similarly, one of the mixes (Mix 1) contained only citric acid for chemical activation and no sodium hydroxide.

TABLE 46

Geopolymer compositions of Example 16

| Raw Material | Mix 1 | Mix 2 | Mix 3 | Mix 4 | Mix 5 |
|---|---|---|---|---|---|
| Fly Ash Class C (grams)[1] | 4615 | 4615 | 4615 | 4615 | 4615 |
| Calcium Sulfate Hemihydrate[2] (grams) | 462 | 462 | 462 | 462 | 462 |
| Calcium Aluminate Cement[3] (grams) | 923 | 923 | 923 | 923 | 923 |
| Total Cementitious Materials (grams) | 6000 | 6000 | 6000 | 6000 | 6000 |
| Sand (grams)[4] | 6900 | 6900 | 6900 | 6900 | 6900 |

TABLE 46-continued

Geopolymer compositions of Example 16

| Raw Material | Mix 1 | Mix 2 | Mix 3 | Mix 4 | Mix 5 |
|---|---|---|---|---|---|
| Sodium Hydroxide (grams) | 0 | 60 | 60 | 60 | 60 |
| Superplasticizer (grams)[5] | 30 | 30 | 30 | 30 | 30 |
| Citric Acid Anhydrous (grams) | 60 | 0 | 30 | 60 | 120 |
| Sodium Gluconate (grams) | 15 | 15 | 15 | 15 | 15 |
| Defoamer and Wetting Agent[6] (grams) | 12 | 12 | 12 | 12 | 12 |
| Rheology Modifier[7] (grams) | 0.24 | 0.24 | 0.24 | 0.24 | 0.24 |
| Colorant[8] (grams) | 4.5 | 4.5 | 4.5 | 4.5 | 4.5 |
| Water (grams) | 1800 | 1800 | 1800 | 1800 | 1800 |
| Water/Cementitious Materials Ratio | 0.30 | 0.30 | 0.30 | 0.30 | 0.30 |
| Sand/Cementitious Materials Ratio | 1.15 | 1.15 | 1.15 | 1.15 | 1.15 |
| Superplasticizer/Cementitious Materials, wt % | 0.5% | 0.5% | 0.5% | 0.5% | 0.5% |
| Calcium Aluminate Cement/Fly ash, wt % | 20% | 20% | 20% | 20% | 20% |
| Calcium Sulfate/Calcium Aluminate Cement, wt % | 50% | 50% | 50% | 50% | 50% |

[1]Class C Fly Ash, Campbell Power Plant, West Olive, MI
[2]USG Hydrocal C-Base
[3]Ternal EV, Kerneos Inc.
[4]QUIKRETE Commercial Grade Fine Sand No. 1961
[5]BASF CASTAMENT FS20
[6]SURFYNOL 500S
[7]MOMENTIVE AXILAT RH 100 XP
[8]Yipin Black S350M Iron Oxide Pigment Slump Behavior TABLE 47 shows the slump behavior of the geopolymer cementitious compositions of the invention investigated in Example 16.

TABLE 47

Slump behavior of Example 16

| | Slump (inches) |
|---|---|
| Mix 1 | 2" |
| Mix 2 | 8½" |
| Mix 3 | 9¼" |
| Mix 4 | 9⅜" |
| Mix 5 | 10¾" |

For Mix 1 containing citric acid but no sodium hydroxide, the mixer material was extremely stiff and completely unworkable upon mixing. On the other hand, mixture compositions containing sodium hydroxide (Mix 2) or a blend of sodium hydroxide and citric acid (Mix 3, Mix 4 and Mix 5), were easily workale as also indicated by their relatively large patty diameter in the slump test. This good workability was obtainable even at an extremely low water/cementitious materials ratio of about 0.30. For standard Portland cement based or gypsum based materials, such flow properties and self leveling behavior are only obtainable when the water/cementitious materials ratio is in excess of about 0.45.

Shrinkage Behavior

Figure 15:
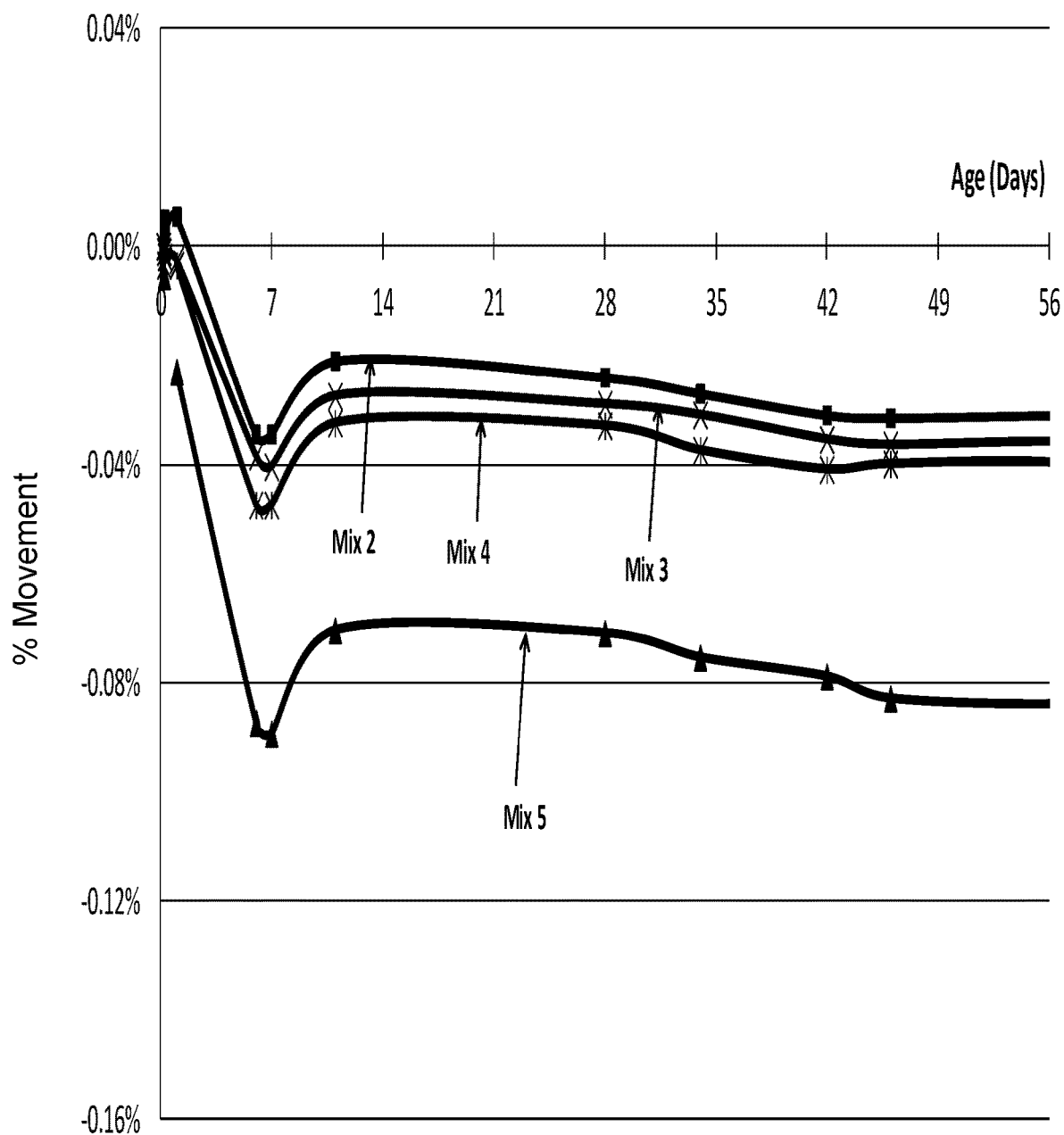
FIG. 15 is a graph of shrinkage of compositions in Example 16.

FIG. 15 shows shrinkage behavior of geopolymer cementitious compositions of the invention investigated in Example 16. The shrinkage measurements were initiated at an age of 4-hours from the time the raw materials were mixed together to form an aqueous slurry. The material shrinkage was measured for a total duration of about 8-weeks while curing the material at 75° F./50% Relative Humidity (RH).

The following important conclusions can be drawn from this investigation and FIG. 15:

Contrary to the shrinkage bars of comparative Example 4 (with no calcium sulfate) which cracked even before de-molding, the shrinkage bars of Example 16 comprising calcium aluminate cement, calcium sulfate hemihydrate, alkali metal hydroxide (with or without citric acid) were completely stable and did not result in any cracks either prior to or after de-molding.

The cementitioius composition of the invention comprising sodium hydroxide only as a chemical activator (Mix 2) demonstrated a very low maximum shrinkage of about less than 0.05%. The cementitious compositions of the invention comprising a blend of sodium hydroxide and citric acid as a chemical activator (Mix 3, Mix 4 and Mix 5) also demonstrated a very low maximum shrinkage of about less than 0.10%. It is noteworthy that the cementitious compositions containing 1% sodium hydroxide and citric acid up to 1% (Mix 3 and Mix 4) had very low maximum shrinkage of about less than 0.05%. For Mix 5 containing 1% sodium hydroxide and 2% citric acid, the maximum shrinkage increased to about 0.08%.

Time of Setting

TABLE 48 shows the time of setting of geopolymer cementitious compositions of the invention investigated in Example 16.

TABLE 48

Setting Times of Example 16

| | Initial Setting Time (hr:min) | Final Setting Time (hr:min) |
|---|---|---|
| Mix 1 | 04:45 | 5:22 |
| Mix 2 | 01:52 | 02:14 |
| Mix 3 | 01:54 | 02:52 |
| Mix 4 | 01:00 | 01:07 |
| Mix 5 | 00:56 | 01:02 |

All geopolymer cementitious compositions investigated in this example (Mix 2 thorough Mix 5) demonstrated a very rapid setting behavior with final setting times ranging from about 62 minutes to 172 minutes. In the case of Mix 1, with no sodium hydroxide, the final setting time was extremely long in excess of 5 hours. On the other hand, the mixes containing a blend of sodium hydroxide and citric acid (Mix 4 and Mix 5) yielded an extremely rapid setting behavior with final setting time of about 1 hour.

Compressive Strength

TABLE 49 shows the compressive strength behavior of the developed geopolymer cementitious compositions of the invention investigated in Example 16.

TABLE 49

Compressive Strength of Example 16 (psi)

|  | 4 hour | 24 hour | 7 day | 28 day | 56 day |
| --- | --- | --- | --- | --- | --- |
| Mix 1 | 92 | 847 | 1171 | 1686 | 1946 |
| Mix 2 | 701 | 1198 | 2440 | 3618 | 3797 |
| Mix 3 | 846 | 1754 | 3952 | 6481 | 8233 |
| Mix 4 | 953 | 1533 | 3480 | 5574 | 7941 |
| Mix 5 | 139 | 1615 | 2943 | 7050 | 8429 |

The following important conclusions can be drawn from this study:

The cementitious composition without alkali metal base (sodium hydroxide) (Mix 1) yielded extremely poor compressive strength behavior. Both the early age and the ultimate compressive strength for this mix (Mix 1) were extremely low and significantly inferior to the geopolymer compositions of the invention comprising either sodium hydroxide (Mix 2) or a mixture of sodium hydroxide and citric acid (Mix 3 through Mix 5).

The 28-day compressive strengths of all geopolymer cementitious compositions of the invention comprising a mixture of sodium hydroxide and citric acid (Mix 3 through Mix 5) were exceptionally high and in excess of 5000 psi. Moreover, the 56-day compressive strengths of all geopolymer cementitious compositions of the invention comprising a mixture of sodium hydroxide and citric acid (Mix 3 through Mix 5) were even greater and in excess of 7500 psi.

Example 17

This example studies the physical properties of the developed geopolymer cementitious compositions of this embodiment of the invention comprising fly ash, calcium aluminate cement, calcium sulfate hemihydrate with either an alkali metal silicate (sodium silicate) or a mixture of an alkali metal silicate (sodium silicate) and an alkali metal acid (citric acid).

TABLE 50 shows the raw material compositions of the geopolymer cementitious mixtures investigated in this example. All mixtures contained calcium aluminate cement in which the main calcium aluminate phase was dodecacalcium hepta-aluminate ($12CaO.7Al_2O_3$ or $C_{12}A_7$). This calcium aluminate cement is commercially available with trade name TERNAL EV from Kerneos Inc. The amount of calcium aluminate cement used in the mixture compositions of this example was equal to 20 wt % the weight of fly ash. Mix 1 through Mix 3 contained only sodium silicate as the chemical activator and no citric acid. In Mix 4 and Mix 5, a mixture of sodium silicate and citric acid was added to the cementitious compositions of the invention to act as a chemical activator.

TABLE 50

Geopolymer compositions of Example 17

| Raw Material | Mix 1 | Mix 2 | Mix 3 | Mix 4 | Mix 5 |
| --- | --- | --- | --- | --- | --- |
| Fly Ash Class C (grams)[1] | 4615 | 4615 | 4615 | 4615 | 4615 |
| Calcium Sulfate Hemihydrate[2] (grams) | 462 | 462 | 462 | 462 | 462 |
| Calcium Aluminate Cement[3] (grams) | 923 | 923 | 923 | 923 | 923 |
| Total Cementitious Materials (grams) | 6000 | 6000 | 6000 | 6000 | 6000 |
| Sand (grams)[4] | 6900 | 6900 | 6900 | 6900 | 6900 |
| Sodium Silicate (grams) | 30 | 60 | 120 | 60 | 60 |
| Superplasticizer (grams)[5] | 30 | 30 | 30 | 30 | 30 |
| Citric Acid Anhydrous (grams) | 0 | 0 | 0 | 30 | 60 |
| Sodium Gluconate (grams) | 15 | 15 | 15 | 15 | 15 |
| Defoamer and Wetting Agent[6] (grams) | 12 | 12 | 12 | 12 | 12 |
| Rheology Modifier[7] (grams) | 0.24 | 0.24 | 0.24 | 0.24 | 0.24 |
| Colorant[8] (grams) | 4.5 | 4.5 | 4.5 | 4.5 | 4.5 |
| Water (grams) | 1800 | 1800 | 1800 | 1800 | 1800 |
| Water/Cementitious Materials Ratio | 0.30 | 0.30 | 0.30 | 0.30 | 0.30 |
| Sand/Cementitious Materials Ratio | 1.15 | 1.15 | 1.15 | 1.15 | 1.15 |
| Superplasticizer/Cementitious Materials, wt % | 0.5% | 0.5% | 0.5% | 0.5% | 0.5% |
| Calcium Aluminate Cement/Fly ash, wt % | 20% | 20% | 20% | 20% | 20% |
| Calcium Sulfate/Calcium Aluminate Cement, wt % | 50% | 50% | 50% | 50% | 50% |

[1]Class C Fly Ash, Campbell Power Plant, West Olive, MI
[2]USG Hydrocal C-Base
[3]Ternal EV, Kerneos Inc.
[4]QUIKRETE Commercial Grade Fine Sand No. 1961
[5]BASF CASTAMENT FS20
[6]SURFYNOL 500S
[7]MOMENTIVE AXILAT RH 100 XP
[8]Yipin Black S350M Iron Oxide Pigment Slump Behavior TABLE 51 shows the slump behavior of the geopolymer cementitious compositions of the invention investigated in Example 17.

TABLE 51

Slump behavior of Example 17

|  | Slump (inches) |
| --- | --- |
| Mix 1 | 11¾" |
| Mix 2 | 11⅝" |
| Mix 3 | 10" |
| Mix 4 | 9⅞" |
| Mix 5 | 7⅞" |

The mixture compositions containing sodium silicate only (Mix 1 through Mix 3) or a blend of sodium silicate and citric acid (Mix 4 and Mix 5) were easily workale as indicated by their relatively large patty diameter in the slump test. Good workability was obtainable even at an extremely low water/cementitious materials ratio of about 0.30. For standard Portland cement based opon gypsum based materials, such flow properties and self leveling behavior are only obtainable when the water/cementitious materials ratio is in excess of about 0.45.

Shrinkage Behavior

Figure 16:
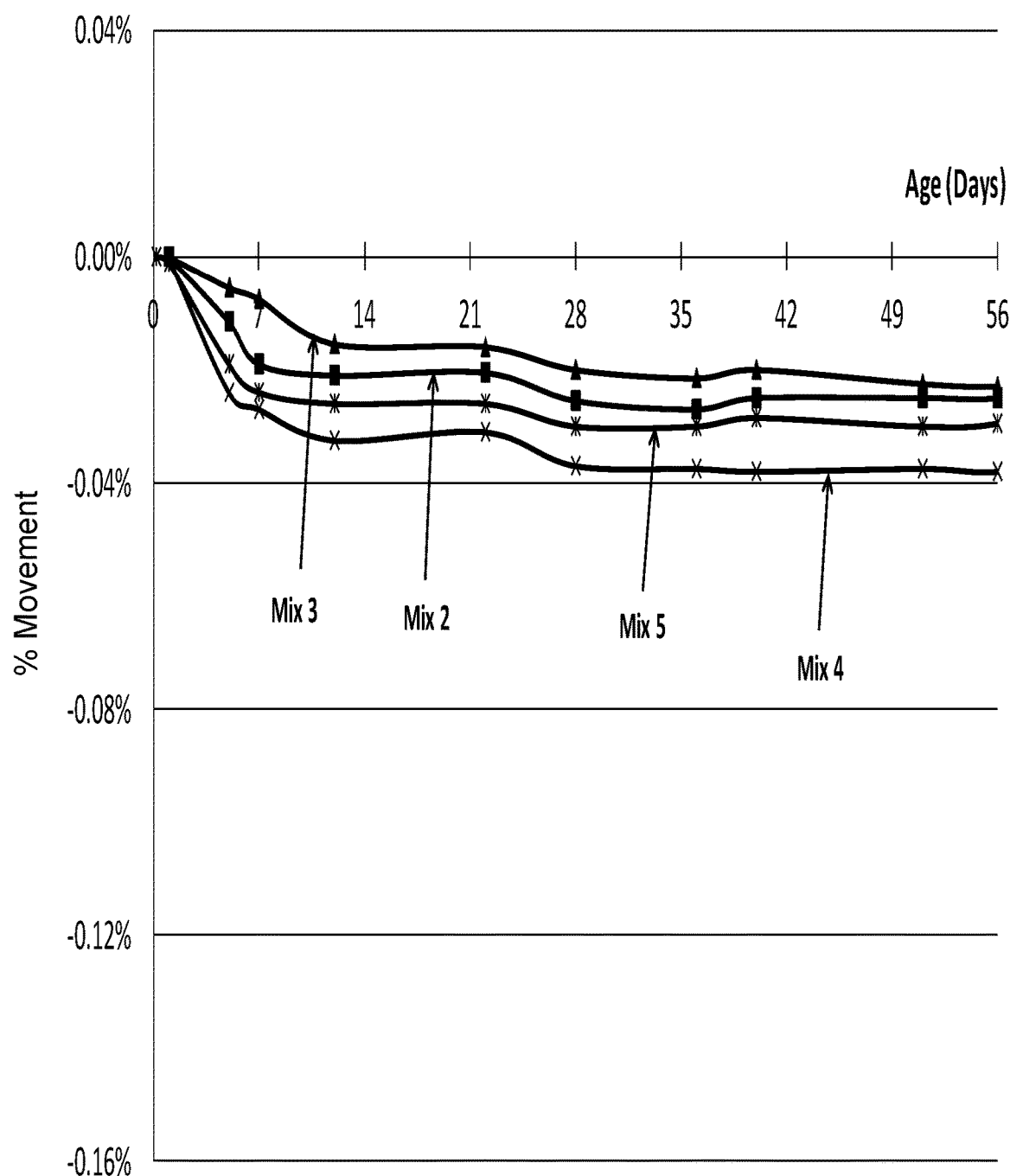
FIG. 16 is a graph of shrinkage of compositions in Example 17.

FIG. 16 shows shrinkage behavior of geopolymer cementitious compositions of the invention investigated in Example 17. The shrinkage measurements were initiated at an age of 4-hours from the time the raw materials were mixed together to form an aqueous slurry. The material shrinkage was measured for a total duration of about 8-weeks while curing the material at 75° F./50% Relative Humidity (RH).

The following important conclusions can be drawn from this investigation and FIG. 16:

Contrary to the shrinkage bars of comparative Example 4 (with no calcium sulfate) which cracked before de-molding, the shrinkage bars of Example 17 comprising calcium aluminate cement, calcium sulfate hemihydrate, alkali metal silicate (with or without citric acid) were completely stable and did not result in any cracks prior to or after de-molding.

All geopolymer cementitioius composition of the invention comprising either sodium silicate or a blend of sodium silicate and citric acid as a chemical activator demonstrated a very low maximum shrinkage of about less than 0.05%.

Time of Setting

TABLE 52 shows the time of setting of geopolymer cementitious compositions of the invention investigated in Example 17.

TABLE 52

Setting Times of Example 17

| | Initial Setting Time (hr:min) | Final Setting Time (hr:min) |
|---|---|---|
| Mix 1 | >05:00 | >05:00 |
| Mix 2 | >05:00 | >05:00 |
| Mix 3 | >05:00 | >05:00 |
| Mix 4 | >05:00 | >05:00 |
| Mix 5 | 03:30 | 03:45 |

All geopolymer cementitious compositions investigated in this example comprising sodium silicate demonstrated a slower setting behavior compared to the geopolymer compositions of the invention investigated in Example 16 comprising sodium hydroxide. Mix 1 through Mix 4 had a final setting time in excess of 5 hours. Mix 5 comprising a blend of sodium silicate and citric acid set fastest with a final setting time of about 3 hours and 45 minutes.

Compressive Strength

TABLE 53 shows the compressive strength behavior of the developed geopolymerementitious compositions of the invention investigated in Example 17.

TABLE 53

Compressive Strength of Example 17 (psi)

| | 24 hour | 7 day | 14 day | 28 day | 56 day |
|---|---|---|---|---|---|
| Mix 1 | 218 | 1733 | 3745 | 4622 | 5314 |
| Mix 2 | 560 | 1326 | 3149 | 4526 | 5463 |
| Mix 3 | 1562 | 2002 | 2895 | 3579 | 4223 |
| Mix 4 | 1223 | 2185 | 2352 | 2587 | 4473 |
| Mix 5 | 1759 | 2120 | 3046 | 3287 | 4303 |

The following important conclusions can be drawn from this study:

The cementitious composition without alkali metal base (sodium silicate) (Mix 1 of Example 16) yielded extremely poor compressive strength behavior. The ultimate compressive strength of the mixture compositions comprising either sodium silicate or a blend of sodium silicate and citric acid s a chemical activator was significantly superior to the compressive strength of the mixture in the absence of sodium silicate (Mix 1 of Example 16).

The ultimate compressive strengths of all geopolymer cementitious compositions of the invention investigated in this example comprising either sodium silicate or a blend of sodium silicate and citric acid were satisfactory and in excess of about 4000 psi.

Example 18

The objective of this example was to study the influence of blends of calcium aluminate cement and calcium sulfoaluminate cement on physical properties of the geopolymer cementitious compositions of the invention. TABLE 54 shows the raw material compositions of the geopolymer cementitious mixtures investigated in this Example. All mixtures contained calcium aluminate cement in which the main calcium aluminate phase was dodecacalcium heptaaluminate (12CaO.7Al$_2$O$_3$ or C$_{12}$A$_7$). This calcium aluminate cement is commercially available with trade name TERNAL EV from Kerneos Inc. The Mix 2 through Mix 5 contained a blend of calcium aluminate cement and calcium sulfoaluminate cement. The calcium sulfoaluminate cement used was Fastrock 500 from the CTS Company. Mix 5 demonstrates the performance of the geopolymer composition of the invention comprising lithium carbonate.

TABLE 54

Geopolymer compositions of Example 18

| Raw Material | Mix 1 | Mix 2 | Mix 3 | Mix 4 | Mix 5 |
|---|---|---|---|---|---|
| Fly Ash Class C[1] (grams) | 4615 | 4615.5 | 4138 | 3750 | 3750 |
| Calcium Sulfate Hemihydrate[2] (grams) | 462 | 461.5 | 620 | 750 | 3750 |
| Calcium Aluminate Cement[3] (grams) | 923 | 461.5 | 414 | 750 | 750 |
| Calcium Sulfoaluminate Cement[4] (grams) | — | 461.5 | 828 | 750 | 750 |
| Total Cementitious Materials (grams) | 6000 | 6000 | 6000 | 6000 | 6000 |
| Sand[5] (grams) | 6900 | 6900 | 6900 | 6900 | 6900 |
| Potassium Citrate Tribasic Monohydrate (grams) | 120 | 120 | 120 | 120 | 120 |

TABLE 54-continued

Geopolymer compositions of Example 18

| Raw Material | Mix 1 | Mix 2 | Mix 3 | Mix 4 | Mix 5 |
|---|---|---|---|---|---|
| Superplasticizer[6] (grams) | 30 | 30 | 30 | 30 | 30 |
| Citric Acid Anhydrous | 30 | 30 | 30 | 30 | 30 |
| Sodium Gluconate | 12 | 12 | 12 | 12 | 12 |
| Defoamer and Wetting Agent[7] (grams) | 15 | 15 | 15 | 15 | 15 |
| Rheology Modifier[8] (grams) | 0.36 | 0.36 | 0.36 | 0.36 | 0.36 |
| Smectite Clay[9] (grams) | 0.60 | 0.60 | 0.60 | 0.60 | 0.60 |
| Colorant[10] (grams) | 4.5 | 4.5 | 4.5 | 4.5 | 4.5 |
| Lithium Carbonate (grams) | — | — | — | — | 30 |
| Water (grams) | 1800 | 1800 | 1800 | 1800 | 1800 |
| Water/Cementitious Materials Ratio | 0.30 | 0.30 | 0.30 | 0.30 | 0.30 |
| Sand/Cementitious Materials Ratio | 1.15 | 1.15 | 1.15 | 1.15 | 1.15 |
| Superplasticizer/Cementitious Materials, wt % | 0.5% | 0.5% | 0.5% | 0.5% | 0.5% |
| Potassium Citrate/Cementitious Materials, wt % | 2% | 2% | 2% | 2% | 2% |

[1] Class C Fly Ash, Campbell Power Plant, West Olive, MI
[2] USG Hydrocal C-Base
[3] Ternal EV, Kerneos Inc.
[4] Fastrock 500, CTS Company
[5] QUIKRETE Commercial Grade Fine Sand No. 1961
[6] BASF CASTAMENT FS20
[7] SURFYNOL 500S
[8] MOMENTIVE AXILAT RH 100 XP
[9] BENTONE CT HECTORITE clay
[10] Yipin Black S350M Iron Oxide Pigment Slump Behavior and Early Age Cracking Behavior of Material TABLE 55 shows the slump behavior of the geopolymer cementitious compositions of the invention investigated in Example 18.

TABLE 55

Flow and Slump of Example 18

| | Slump (inches) |
|---|---|
| Mix 1 | 10½" |
| Mix 2 | 9½" |
| Mix 3 | 8¾" |
| Mix 4 | 8⅝" |
| Mix 5 | 8¾" |

All mixture compositions investigated had good fluidity as observed in the slump test.

The slump patties for all five mixes were in excellent condition and did not develop any cracking.

Shrinkage Behavior

Figure 17:
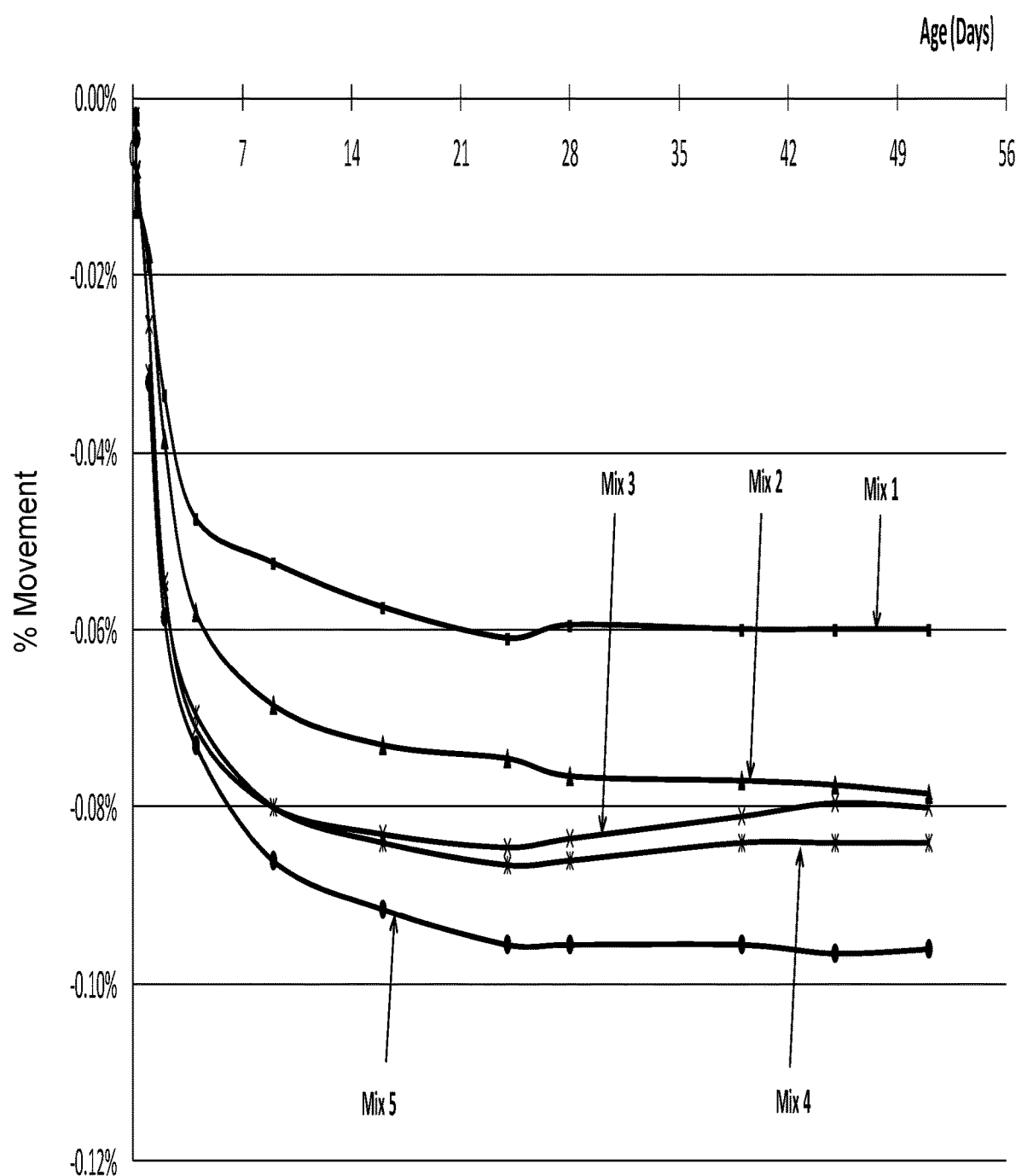
FIG. 17 is a graph of shrinkage of compositions of Example 18.

FIG. 17 shows shrinkage behavior of geopolymer cementitious compositions of the invention investigated in Example 18. The shrinkage measurements were initiated at an age of 4-hours from the time the raw materials were mixed together to form an aqueous slurry. The material shrinkage was measured for a total duration of about 8-weeks while curing the material at 75° F./50% Relative Humidity (RH).

The following important conclusions can be drawn from this investigation:

Contrary to the shrinkage bars of comparative Example 4 (with no calcium sulfate) which cracked even before de-molding, the shrinkage bars of Example 18 were completely stable and did not result in any cracks either prior to or after de-molding.

The geopolymer cementitious compositions of the embodiments of the invention investigated in this example had a maximum shrinkage less than 0.10% in comparison to a maximum shrinkage of about 0.75% for the comparative mixture composition containing fly ash and alkali citrate only (Example 1).

The results from this example also demonstrate that the geopolymer cementitious compositions of the invention comprising different blends of calcium aluminate cement and calcium sulfoaluminate cement are capable of providing excellent dimensional stability with extremely low shrinkage.

Time of Setting

TABLE 56 shows the time of setting of geopolymer cementitious compositions of the invention investigated in Example 18.

TABLE 56

Setting Times of Example 18

| | Initial Setting Time (hr:min) | Final Setting Time (hr:min) |
|---|---|---|
| Mix 1 | 00:52 | 1:06 |
| Mix 2 | 01:33 | 01:45 |
| Mix 3 | 01:35 | 01:53 |
| Mix 4 | 01:36 | 01:46 |
| Mix 5 | 02:04 | 02:30 |

All geopolymer cementitious compositions investigated in this example had a rapid setting behavior. The final setting times of the geopolymer cementitious compositions of the invention of this example ranged from about 66 minutes to about 150 minutes compared to an extremely rapid final setting time of about 15 minutes for the mixture composition containing fly ash and sodium citrate only (Example 1). It must be noted that an extremely short setting time is problematic for most practical applications.

The results from this example also demonstrate that the geopolymer cementitious compositions of the invention comprising different blends of calcium aluminate cement and calcium sulfoaluminate cement are capable of providing a rapid setting behavior while maintaining a sufficiently long open time.

Comparison of results for Mix 4 and Mix 5 clearly demonstrates that addition of lithium carbonate has an effect of increasing the time of setting of some embodiments of the geopolymer compositions of this invention. This result is very surprising and unexpected in that the lithium salt (lithium carbonate) is observed to act as a retarder in some embodiments of this invention. It should be noted that this observed behavior is contrary to what is well known in the art on the effect of lithium salts such as lithium carbonate on the setting behavior of the calcium aluminate cement based binder systems. The present state-of-the-art on calcium aluminate cements teaches that lithium salts such as lithium carbonate act as set accelerators thus reducing the initial and final time of setting of the material. The present finding as shown in this example teaches away from what is well known in the art and establishes that lithium salts such as lithium carbonate have a retarding effect on the early stages of the reaction (the initial and final time of setting) of some embodiments of the geopolymer cementitious compositions of the invention.

Compressive Strength

TABLE 57 shows the compressive strength behavior of the developed geopolymer cementitious compositions of the invention investigated in Example 18.

TABLE 57

Compressive Strength of Example 18 (psi)

|  | 4 hour | 24 hour | 7 day | 28 day |
| --- | --- | --- | --- | --- |
| Mix 1 | 965 | 1521 | 2369 | 6966 |
| Mix 2 | 1158 | 2353 | 2244 | 3388 |
| Mix 3 | 835 | 2590 | 3664 | 5057 |
| Mix 4 | 2149 | 3387 | 4769 | 5935 |
| Mix 5 | 1441 | 5597 | 7757 | 8267 |

The following important observations can be drawn from this study:

The results from this example demonstrate that the geopolymer cementitious compositions of the invention comprising different blends of calcium aluminate cement and calcium sulfoaluminate cement are capable of providing a rapid a rate of compressive strength development. The rate of strength development can be tailored by adjusting the amount of calcium aluminate cement and calcium sulfoaluminate cement and their relative proportion in the geopolymer cementitious compositions of the invention.

The compressive strength of the geopolymer cementitious compositions of the invention investigated in this example continued to increase as a function of time. The 28-day compressive strengths of some embodiments of geopolymer cementitious compositions of the invention were exceptionally high providing results in excess of 5000 psi.

The time of setting and compressive strength results for Mix 5 are again very surprising and unexpected. Comparing the time of setting and compressive strength results for Mix 4 and Mix 5 at various ages, it can be observed and concluded that during the early stages of hydration reaction the lithium carbonate acts as a set retarder thus increasing the initial and final time of setting of some embodiments of geopolymer cementitious compositions of this invention; on the other hand, during the later stages of hydration reaction, the same (lithium carbonate) acts as an accelerator thus increasing the rate of strength development and ultimate strength of some embodiments of geopolymer cementitious compositions of this invention.

Example 19

The objective of this example was to study the influence of addition of a lithium salt on setting behavior of the geopolymer cementitious compositions of the invention. TABLE 58 shows the raw material compositions of the geopolymer cementitious mixtures investigated in this Example. All mixtures contained calcium aluminate cement in which the main calcium aluminate phase was dodecacalcium hepta-aluminate ($12CaO.7Al_2O_3$ or $C_{12}A_7$). This calcium aluminate cement is commercially available with trade name TERNAL EV from Kerneos Inc. The Mix 2 and Mix 3 contained a lithium salt in the form of lithium carbonate.

TABLE 58

Geopolymer compositions of Example 19

| Raw Material | Mix 1 | Mix 2 | Mix 3 |
| --- | --- | --- | --- |
| Fly Ash Class C[1] (grams) | 4615 | 4615 | 4615 |
| Calcium Sulfate Hemihydrate[2] (grams) | 462 | 462 | 462 |
| Calcium Aluminate Cement[3] (grams) | 923 | 923 | 923 |
| Total Cementitious Materials (grams) | 6000 | 6000 | 6000 |
| Sand[4] (grams) | 6900 | 6900 | 6900 |
| Potassium Citrate Tribasic Monohydrate (grams) | 120 | 120 | 120 |
| Superplasticizer[5] (grams) | 30 | 30 | 30 |
| Citric Acid Anhydrous | 30 | 30 | 30 |
| Sodium Gluconate | 12 | 12 | 12 |
| Defoamer and Wetting Agent[6] (grams) | 15 | 15 | 15 |
| Rheology Modifier[7] (grams) | 0.36 | 0.36 | 0.36 |
| Smectite Clay[8] (grams) | 0.60 | 0.60 | 0.60 |
| Colorant[9] (grams) | 4.5 | 4.5 | 4.5 |
| Lithium Carbonate (grams) | — | 30 | 60 |
| Water (grams) | 1800 | 1800 | 1800 |
| Water/Cementitious Materials Ratio | 0.30 | 0.30 | 0.30 |
| Sand/Cementitious Materials Ratio | 1.15 | 1.15 | 1.15 |
| Superplasticizer/Cementitious Materials, wt % | 0.5% | 0.5% | 0.5% |
| Potassium Citrate/Cementitious Materials, wt % | 2% | 2% | 2% |

[1]Class C Fly Ash, Campbell Power Plant, West Olive, MI
[2]USG Hydrocal C-Base
[3]Ternal EV, Kerneos Inc.
[4]QUIKRETE Commercial Grade Fine Sand No. 1961
[5]BASF CASTAMENT FS20
[6]SURFYNOL 500S
[7]MOMENTIVE AXILAT RH 100 XP
[8]BENTONE CT HECTORITE clay
[9]Yipin Black S350M Iron Oxide Pigment Time of Setting TABLE 59 shows the time of setting of geopolymer cementitious compositions of the invention investigated in Example 19.

TABLE 59

Setting Times of Example 19

| | Initial Setting Time (hr:min) | Final Setting Time (hr:min) |
|---|---|---|
| Mix 1 | 00:42 | 1:15 |
| Mix 2 | 01:18 | 01:31 |
| Mix 3 | 02:02 | 02:12 |

All geopolymer cementitious compositions investigated in this example had a rapid setting behavior. The final setting times of the geopolymer cementitious compositions of the invention of this example ranged from about 75 minutes to about 132 minutes compared to an extremely rapid final setting time of about 15 minutes for the mixture composition containing fly ash and sodium citrate only (Example 1). It must be noted that an extremely short setting time is problematic for most practical applications.

The results from this example clearly demonstrate that addition of lithium carbonate has an effect of increasing the time of setting of some embodiments of this invention. This result is very surprising and unexpected in that the lithium salt (lithium carbonate) is observed to act as a retarder in some embodiments of this invention. It should be noted that this observed behavior is contrary to what is well known in the art on the effect of lithium salts such as lithium carbonate on the setting behavior of the calcium aluminate cement based binder systems. The present state-of-the-art on calcium aluminate cements teaches that lithium salts such as lithium carbonate act as set accelerators thus reducing the initial and final time of setting of the material. The present finding as shown in this example teaches away from what is well known in the art and establishes that lithium salts such as lithium carbonate have a retarding effect on the early stages of the reaction (the initial and final time of setting) of some embodiments of the geopolymer cementitious compositions of the invention.

The geopolymer compositions of some preferred embodiments of the invention shown in the examples have application in a number of commercial products. In particular the compositions can be used for; Road repair and road patch products, traffic bearing surfaces and pavements, as shown by some properties disclosed in examples 5, 6, 9, 10, 14, 15, 16, 18 and 19; Bricks and synthetic stones, as shown by some properties disclosed in examples 5, 6, 9, 12 and 14; Repair materials for wall, floors and ceiling and Bonding mortars, plasters and surfacing materials, as shown by some properties disclosed in examples 9, 10, 11, 14, 18, and 19; Roofing materials, as shown by some properties in examples 5, 6, 14 and 18; Shotcrete products which are sprayed cementitious products used for soil and rock stabilization and as lining materials, as shown by some properties disclosed in examples 5, 6, 7, 9 and 15; Weight bearing structures, as shown by some properties disclosed in examples 8, 10, 13, 14, 15, 16, 17, and 18; Statuaries and architectural moldings, as shown by some properties disclosed in examples 5-19; and Self leveling underlayments, as shown by some properties disclosed in examples 9, 10, and 12-19.

Although we have described the preferred embodiments for implementing our invention, it will be understood by those skilled in the art to which this disclosure is directed that modifications and additions may be made to our invention without departing from its scope.

What is claimed is:

1. An aluminosilicate geopolymer cementitious composition comprising a reaction product of:
   a cementitious reactive powder comprising:
      about 35 to about 90% by weight a thermally activated aluminosilicate mineral;
      about 9 to about 45% by weight a calcium aluminate cement in an amount of 1-100 parts by weight per 100 parts by weight of thermally activated aluminosilicate mineral; and
      about 1 to about 45% by weight a calcium sulfate selected from the group consisting of calcium sulfate dihydrate, calcium sulfate hemihydrate, anhydrous calcium sulfate and mixtures thereof, the calcium sulfate in an amount of 2 to 100 parts by weight per 100 parts by weight of calcium aluminate cement; and
   a chemical activator selected from the group consisting of alkali metal salt, alkali metal base, and mixtures thereof in an amount equal to about 1.0 to about 6.0% by weight based on total weight of the cementitious reactive powder; and
   at least one member of the group consisting of superplasticizers, air entraining agents, defoaming agents, organic rheology control agents, and film-forming polymers; and
   water.

2. The composition of claim 1, wherein the cementitious reactive powder contains calcium sulfate dihydrate.

3. The composition of claim 1, wherein the chemical activator is present in an amount equal to about 1.25 to 4.00% by weight based on total weight of the cementitious reactive powder, wherein the chemical activator is selected from at least one member of the group consisting of alkali metal citrate, alkali metal silicate, and alkali metal hydroxide.

4. The composition of claim 1, wherein the cementitious reactive powder contains calcium sulfate hemihydrate.

5. The composition of claim 1, wherein the cementitious reactive powder contains anhydrous calcium sulfate.

6. The composition of claim 1, wherein the reactive powder contains from about 10 to about 40 wt. % lime.

7. The composition of claim 1,
   wherein the cementitious reactive powder comprises about 10% to about 36% by weight calcium aluminate cement,
   wherein the chemical activator is selected from the group consisting of alkali metal citrate, alkali metal silicate, alkali metal hydroxide, and mixtures thereof,
   wherein calcium sulfate dihydrate is present in an amount equal to 5 to 30 wt. % of the total of the fly ash and calcium aluminate cement, and
   wherein the composition comprises said superplasticizer.

8. The composition of claim 1, wherein the thermally activated aluminosilicate mineral comprises Class F fly ash.

9. The composition of claim 1, wherein the reaction product is formed from
   the water;
   the cementitious reactive powder comprising:
      about 40% to about 85% by weight thermally activated aluminosilicate mineral, wherein the thermally activated aluminosilicate mineral comprises about 75 parts to about 100 parts fly ash per 100 parts thermally activated aluminosilicate mineral;

about 9% to about 40% by weight calcium aluminate cement, and about 3.0% to about 24% by weight calcium sulfate; and about 1.25 to 4.00% by weight said chemical activator activator based on weight of the cementitious reactive powder.

10. The composition of claim 1, wherein the reaction product is formed from the water;

the cementitious reactive powder comprising:

about 50% to about 80% by weight thermally activated aluminosilicate mineral, wherein said thermally activated aluminosilicate mineral comprises about 75 parts to about 100 parts fly ash per 100 parts thermally activated aluminosilicate mineral, about 10% to about 36% by weight calcium aluminate cement, and about 5.0% to about 18% by weight calcium sulfate; and about 1.25 to 4.00% by weight said chemical activator activator based on weight of the cementitious reactive powder, said chemical activator selected from at least one member of the group consisting of alkali metal citrate, alkali metal silicate, alkali metal hydroxide and mixtures thereof.

11. The composition of claim 8, wherein the cementitious reactive powder comprises about 10 to about 40 wt. % lime.

12. The composition of claim 1, wherein the weight ratio of water to the cementitious reactive powder is about 0.15 to about 0.4.

13. The composition of claim 1, further comprising calcium sulfoaluminate cement.

14. The composition of claim 1, further comprising lithium carbonate.

15. A method of preparing the aluminosilicate geopolymer cementitious composition of claim 1, comprising:

reacting the cementitious reactive powder comprises thermally activated aluminosilicate mineral, the calcium aluminate cement, the calcium sulfate selected from the group consisting of calcium sulfate dihydrate, calcium sulfate hemihydrate, anhydrous calcium sulfate, and mixtures thereof, the chemical activator selected from the group consisting of the alkali metal citrate, alkali metal silicate, alkali metal hydroxide, and mixtures thereof, the at least one member of the group consisting of superplasticizers, air entraining agents, defoaming agents, organic rheology control agents, and film-forming polymers; and the water.

16. A settable composition for forming an aluminosilicate geopolymer cementitious composition when reacted in water, comprising a settable mixture of:

a cementitious reactive powder comprising:

about 35 to about 90% by weight of a thermally activated aluminosilicate mineral;

about 9 to about 45% by weight of a calcium aluminate cement;

about 1 to about 45% by weight of a calcium sulfate selected from the group consisting of calcium sulfate dihydrate, calcium sulfate hemihydrate, anhydrous calcium sulfate and mixtures thereof; and a chemical activator selected from the group consisting of an alkali metal salt and an alkali metal base, or mixtures thereof in an amount equal to about 1.0 to about 6.0% by weight based on total weight of the cementitious reactive powder; and at least one member of the group consisting of superplasticizers, air entraining agents, defoaming agents, organic rheology control agents, and film-forming polymers.

17. An aluminosilicate geopolymer composition formed from the reaction of the settable composition of claim 16 with water, wherein the weight ratio of the water to cementitious reactive powder is about 0.15 to about 0.4:1, wherein the thermally activated aluminosilicate mineral comprises fly ash, wherein the cementitious reactive powder has at most 5 wt. % Portland cement, wherein the chemical activator is selected from the group consisting of alkali metal citrate, alkali metal silicate, alkali metal hydroxide, and mixtures thereof.

* * * * *